United States Patent
Ferre Herrero

(10) Patent No.: US 7,508,945 B1
(45) Date of Patent: Mar. 24, 2009

(54) SELF-CORRECTOR RANDOMISATION-ENCRYPTION AND METHOD

(76) Inventor: Angel José Ferre Herrero, Avenida Constitucio, 3bis-3°, 43540 Sant Carles De la Rapita (ES)

( * ) Notice: Subject to any disclaimer, the term of this patent is extended or adjusted under 35 U.S.C. 154(b) by 0 days.

(21) Appl. No.: 09/979,229

(22) PCT Filed: Oct. 27, 1999

(86) PCT No.: PCT/ES99/00345

§ 371 (c)(1),
(2), (4) Date: Nov. 19, 2001

(87) PCT Pub. No.: WO00/08907

PCT Pub. Date: Feb. 24, 2000

(30) Foreign Application Priority Data

May 18, 1999  (ES) .................................. 9901142

(51) Int. Cl.
*H04L 9/00* (2006.01)
(52) U.S. Cl. .......................... 380/268; 380/28; 380/46; 380/37; 713/168; 713/181
(58) Field of Classification Search ......... 713/168–200; 705/51; 710/241, 266; 380/268
See application file for complete search history.

(56) References Cited

U.S. PATENT DOCUMENTS

| | | | | |
|---|---|---|---|---|
| 4,157,454 A | | 6/1979 | Becker | 178/22 |
| 4,850,019 A | | 7/1989 | Shimizu et al. | 380/29 |
| 4,853,884 A | * | 8/1989 | Brown et al. | 708/3 |
| 5,214,703 A | * | 5/1993 | Massey et al. | 380/37 |
| 5,675,653 A | | 10/1997 | Nelson, Jr. | 380/28 |
| 5,724,428 A | | 3/1998 | Rivest | 380/37 |
| 6,128,737 A | * | 10/2000 | Jakubowski et al. | 713/181 |
| 6,195,433 B1 | * | 2/2001 | Vanstone et al. | 380/285 |
| 6,490,680 B1 | * | 12/2002 | Scheidt et al. | 713/166 |

OTHER PUBLICATIONS

Alfred J. Menezes et al., "Handbook of Applied Cryptography", 1996, CRC Press, 228-230 and 264.*

* cited by examiner

Primary Examiner—Emmanuel L Moise
Assistant Examiner—Shewaye Gelagay
(74) Attorney, Agent, or Firm—WolfBlock LLP

(57) ABSTRACT

Method and system wherein that once the input data sequence (X) and the control block (K) have been supplied, the method and system generates always a sequence of randomized-encrypted data (A) which is an encrypted sequence of random numbers. The method and system randomize-encrypt the data sequence (X) in a corrective way generating the proposed randomized-encrypted text sequence (AP). The randomness verifier (603) validates the randomization of the proposed randomized-encrypted text sequence (AP). If the proposed randomized-encrypted text sequence (AP) is random, it is supplied as randomized-encrypted text sequence (A); if it is not random, the method and system randomize-encrypt the data sequence (X) in a different corrective way again. The iteration is repeated until it is encrypted and at random the proposed randomized-encrypted text sequence (AP).

46 Claims, 16 Drawing Sheets

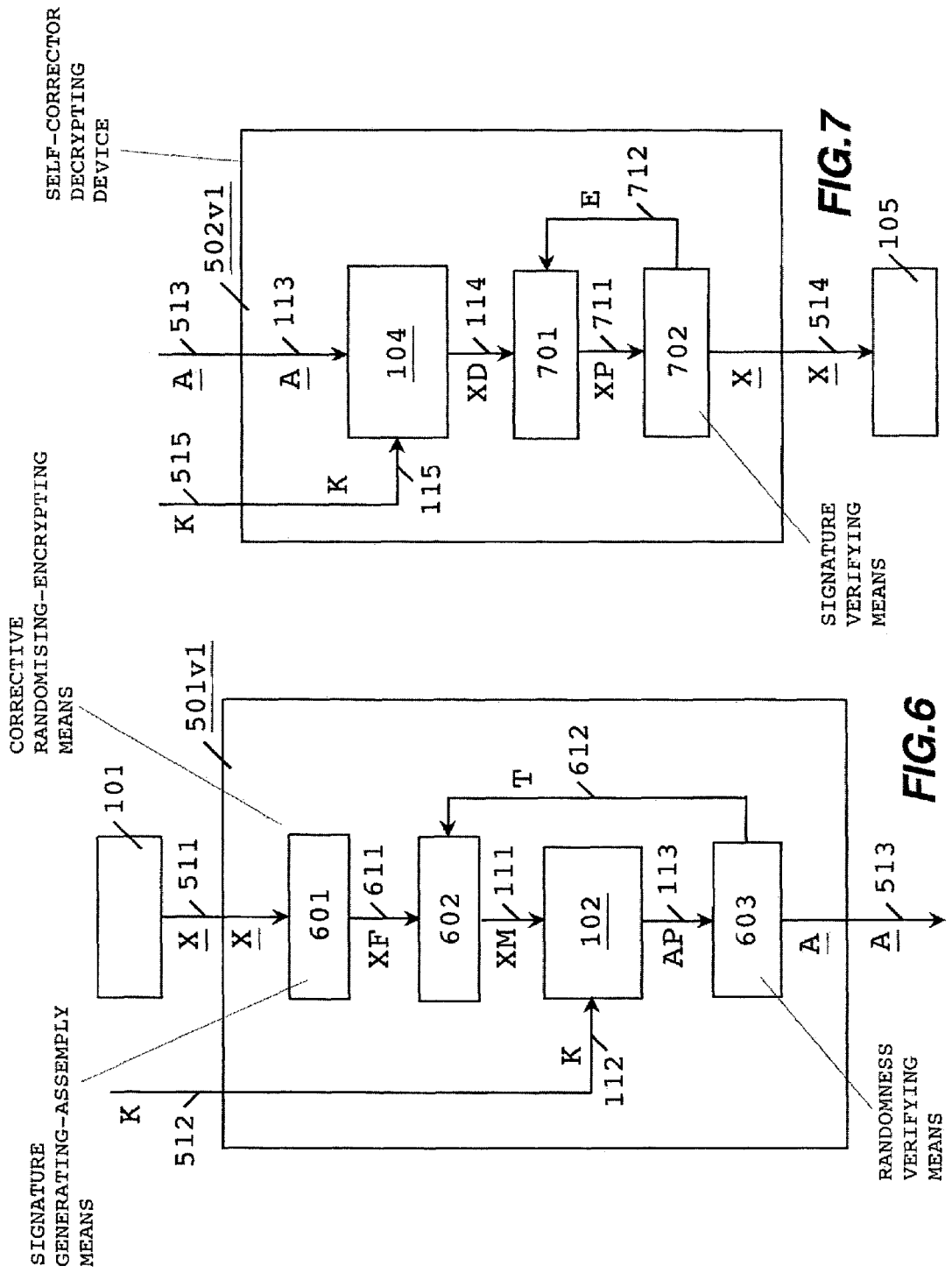

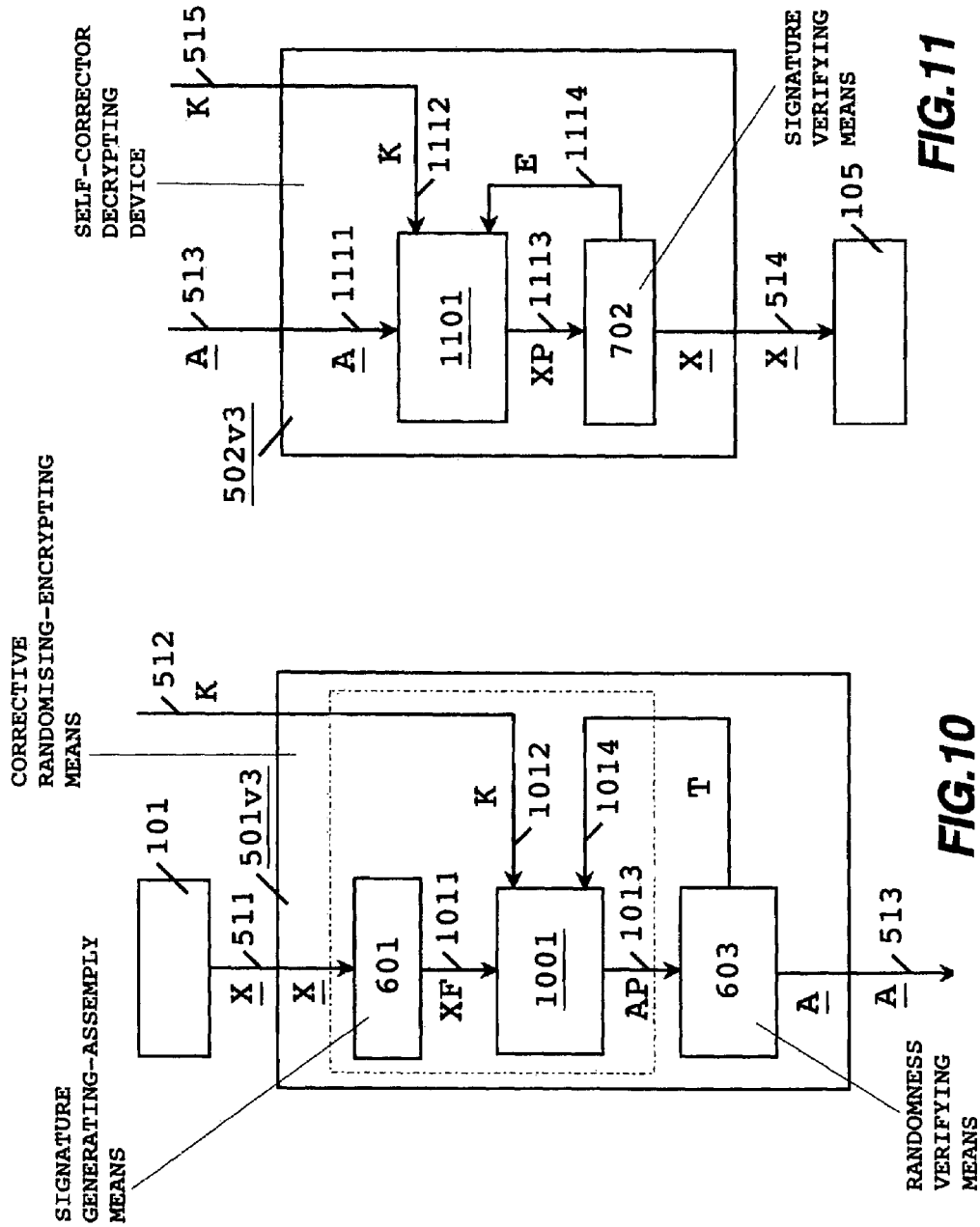

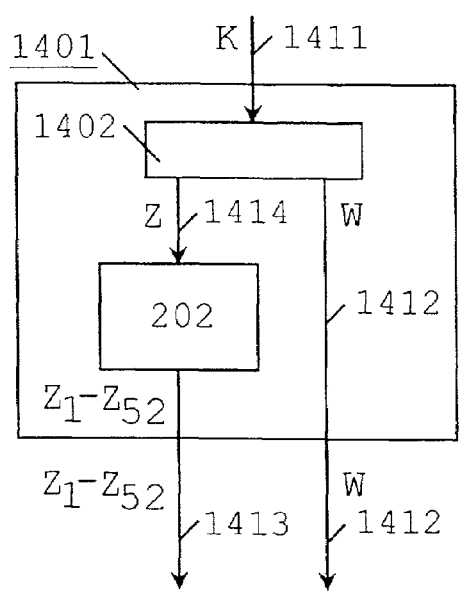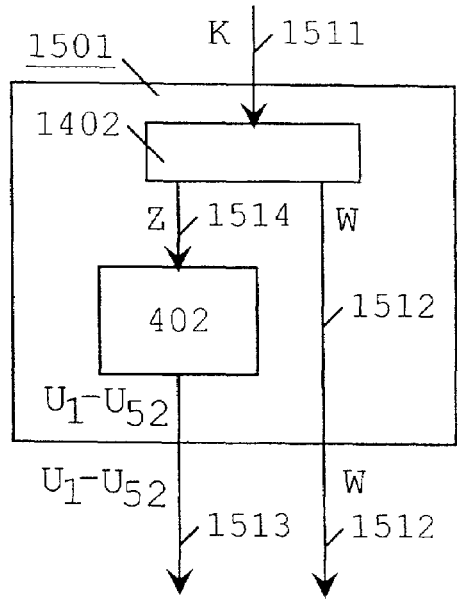
FIG.14  FIG.15
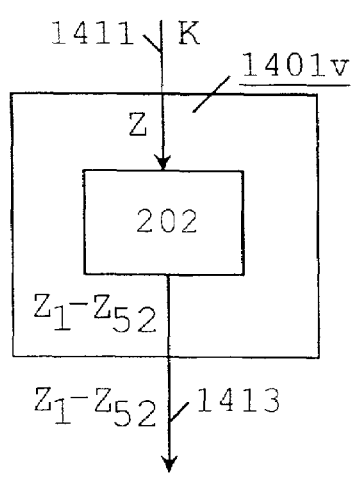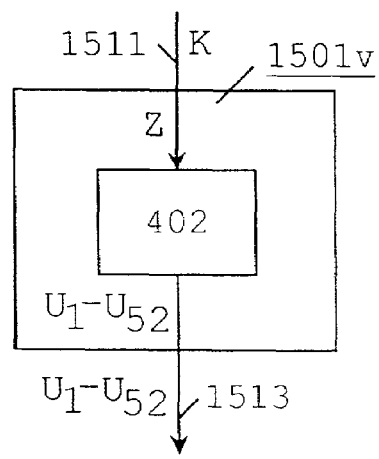
FIG.16  FIG.17

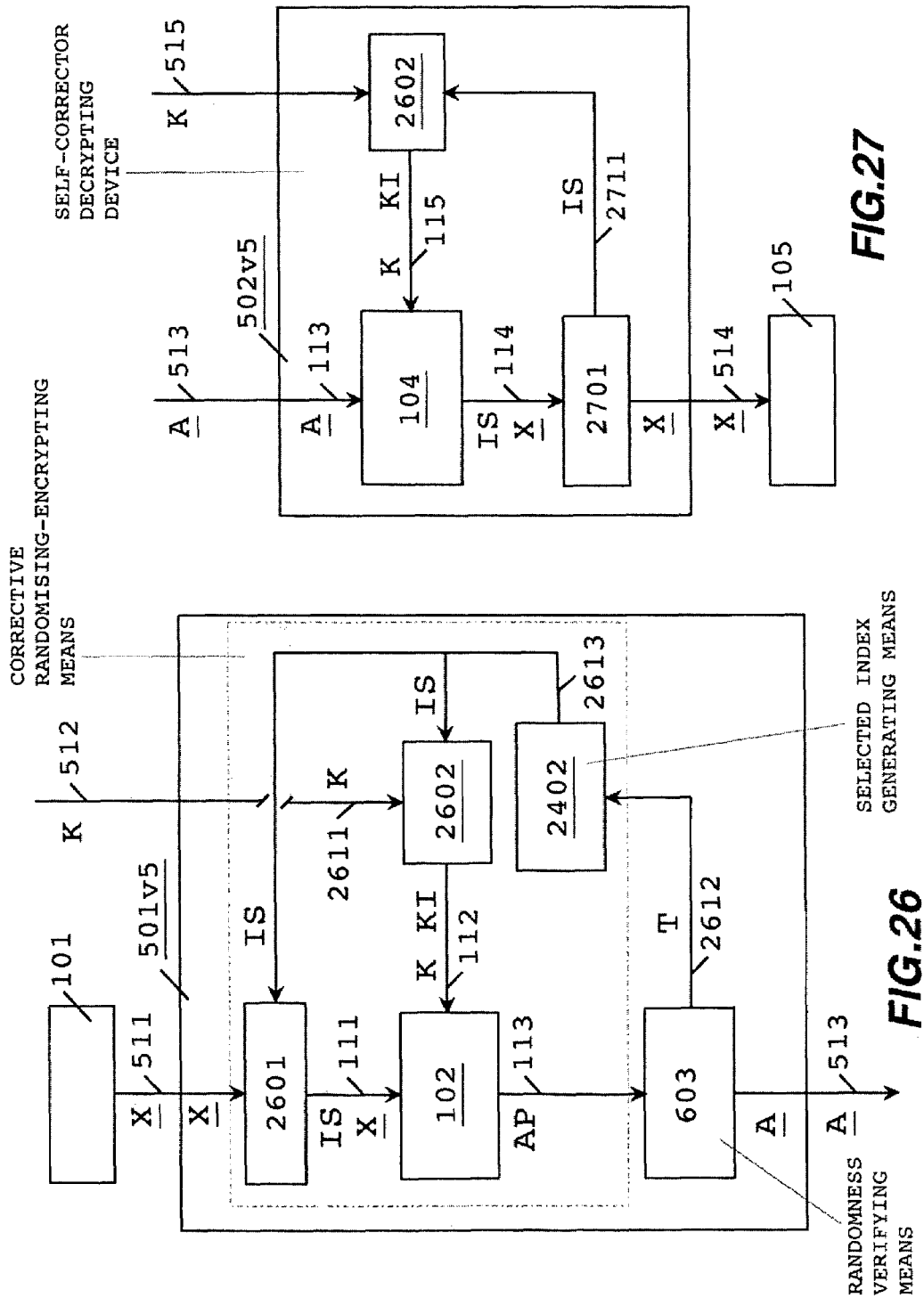

SELF-CORRECTOR RANDOMISATION-ENCRYPTION AND METHOD

TECHNICAL FIELD

This invention, as expressed by the title of the descriptive report, refers to a system and method for randomisation-encryption of digital data sequence with a freely selectable key in which the output encrypted data sequence is always at random, carrying out autonomously the system and method the transformations that are needed to achieve the objective randomisation; as well as the retrieving element of the abovementioned digital data sequence from the randomised-encrypted sequence by making use of the selectable key which has been used for randomisation-encryption.

This invention is specially suitable for application in secret communications, preserving privacy of information, electronic commerce transactions, electronic mail communication and alike.

BACKGROUND ART

As it is known in cryptology, encryption techniques (codification) are used so that data exposed to undesired peeking are usually encrypted so that it is difficult for someone not authorised to see or use them. As it is usual in encryption, the term 'plaintext' refers to a text which has not been coded or encrypted and it is usually directly readable, and the terms 'ciphertext' or 'encrypted text' are used to refer to text which has been coded, encrypted. Experts in this art will also assert that, despite of its name, 'plaintext' tries to include not only textual data but also binary data, both as a file, a computer file for instance, as well as serial data transferred, for example, from a communication system such as a satellite, telephone or electronic mail systems among others. They will also assert that the terms 'encryption' and 'enciphering', 'encrypted' and 'ciphered', 'encrypting device' and 'ciphering device', 'decrypting device' and 'decipher device' have respectively an equivalent meaning within cryptology and can be used without distinction within this report.

It is well known among those with some knowledge in this art that, up to now, a large number of encryption schemes have been used. For the time being, using the encryption devices, among which it can be said some as the "Data Encryption Standard" ("DES"), by the "American National Bureau of Standards", currently "National Institute of Standards and Technology" ("NBS" or "NIST") in the United States; the "Fast data encipherment algorithm FEAL" (FEAL) developed later in Japan, IECEJ Technical Report IT 86-33 (1986) and object of U.S. Pat. No. 4,850,019 entitled "Data Randomisation Equipment"; the encryption device in U.S. Pat. No. 5,214,703 entitled "Device for the conversion of a digital block and use of same"; as well as the encryption device in U.S. Pat. No. 5,675,653 entitled "Method and apparatus for digital encryption", the element or user making use of them, after encryption or enciphering of a plaintext, has always delegated the strength of the invulnerability of the encryption in front of an enemy attack aiming to discover the contents of the ciphertext or the encryption key used, trusting in the organisations, institutions, or experts endorsing its security, as well as the degree of confusion and diffusion of values introduced by the encryption device used in the ciphertext. The user or element encrypting a particular plaintext has no objective security in the degree of confusion and diffusion of values present in a ciphertext that result from the application of the encryption device.

Randomisation of an input block has been previously adduced, as in the device in U.S. Pat. No. 4,850,019 entitled "Data randomisation equipment", invented by Yokosuka Akihiro Shimizu and Yokohama Shoji Miyaguchi, both from Japan, in which two plaintext encrypting devices are presented. In both cases the randomisation of data which they refer to is done according to the individual 64 bits data block provided as input data, as described in the patent description where it is stated that "final channel data obtained after function and transform operations are combined by combining means to produce randomised data corresponding to the input data." Properties and features of said randomisation lie in the input data block, in the encryption key, and in the operations and transformations that the device carries out in the 64 bit data block provided as input data. It can also be said that such invention uses a 64 bit encryption key for the first encrypting device, and a 128 bit encryption key for the second.

The encryption device in U.S. Pat. No. 5,214,703 entitled "Device for the conversion of a digital block and use of same", invented by James L. Massey y Xuejia Lai, both from Switzerland, is another encrypting device that also uses well-known diffusion and confusion techniques, but the ciphertext message that results from its application presents no such properties to allow objective measures, by the user or element using the device, of the degree of confusion and diffusion of values presented in said ciphertext message and, as it happened with the abovementioned device, the confusion and diffusion introduced refer to the 64 bit data block provided as input for encryption. It is said in the description of said patent that "it can be proved that the quantity of four operations is a minimum for meeting the object of diffusion", and therefore relegating to experts, organisations or institutions, the appraisal of the diffusion and confusion introduced in the ciphertext resulting from its application. Such a device makes use of a 128 bit encryption key.

Another example of encrypting device where a good scramble in the resultant ciphertext is adduced is that one in U.S. Pat. No. 5,675,653 entitled "Method and apparatus for digital encryption", invented by Nelson Douglas Valmore, Jr. In said patent it is alluded the fact that the experts, people with good knowledge in cryptology, will recognise that typical digital encryption usually use two well-known techniques such as substitution and transposition; but this device does not yield such a ciphertext that it is possible in a useful way for a layperson in each encryption to verify in an objective way the scramble achieved in the resultant ciphertext.

The device in patent application WO-A-99/57845 entitled "Randomization-encryption system", published the 11 Nov. 1999, occasionally generates as ciphertext randomised text that substantially presents the at random number sequence properties, so that the degree of diffusion and confusion of values in the randomised-encrypted text introduced by the encryption key used can be checked in an objective way. The randomisation of the ciphertext depends on the plaintext that it is encrypted and on the selected encryption key, and such device do not allow to be sure in advance that any encryption key with any plaintext generates such a ciphertext that complies with the at random number sequence properties, and it also forces the person that uses it to the explicit evaluation if he wants to know if there is the maximum degree of diffusion and confusion values. Therefore, in case that the ciphertext does not comply with the at random number sequence properties and later to the explicit evaluation, it is necessary to select a new encryption key to be used and repeat the randomisation-encryption process if he wants the randomised-encrypted text to have the maximum confusion and diffusion properties. This entails the disadvantages inherent in the selection of a different encryption key for a particular plaintext and the increase of different encryption keys with which he can be forced to work. Furthermore, with a large plaintext the probability that the whole resultant encrypted text complies with the at random number sequence properties are lower so that you can have to repeat this process successively.

It is worth mentioning the existence of ciphering devices that operate according to the input data, which can be either the encryption key or the plaintext message data. Some examples of them can be the ciphering device in U.S. Pat. No. 4,157,454 entitled "Method and system for machine enciphering and deciphering", invented by Wolfram Becker, that shows an enciphering algorithm with rotations depending on the used encryption key, as well as the AMENDED SHEET ciphering device in U.S. Pat. No. 5,724,428 entitled "Block encryption algorithm with data-dependent rotations", whose inventor is Ronald L. Rivest, and it makes use of rotations according to the input data and intermediate encryption results in order to determine the quantity of each data rotation being encrypted.

The usage of encryption devices by laypeople is becoming very common, as for example in commercial electronic transactions or electronic mail among others. These laypeople would thank if they could always be sure, in an objective way which could be verified by them, that the maximum degree of the diffusion and confusion of the values is present in the encrypted data. The availability of such an encryption system would allow them to have a stronger security in the degree of confidentiality of the encrypted information and, therefore, to use the encryption systems with more confidence; this would help encryption systems to have a larger acceptance with a consequent increase in usage and a worldwide strengthening of data communications, electronic mail and commercial electronic transactions among others.

DISCLOSURE OF INVENTION

This invention is a self-corrector system and method for randomisation-encryption of the plaintext which is going to be transmitted through a medium, such as a transmission or communication channel, where it can be seen, analysed or intercepted. Without limiting the previous statement, a transmission or communication channel for instance can include a computer network, lines of ground or cellular telephone systems, a satellite transmission, a computer disk, and any other means that can be used for data transference in digital form. As it is used here, the term "transmission channel" simply means the medium used for digital data transportation.

Noticing the questions arisen by the current state of the technique, the purpose of this invention is to supply a data encryption system and method such that the output data sequence is not only encrypted or ciphered, but also at random sequence so that such data sequence randomisation is ensured by the system and method, which, if it is necessary, adapts autonomously and automatically the plaintext sequence or the encryption key until it gets the transmitted resulting encrypted text sequence to comply with the at random number sequence properties. This system and method not only allows the evaluation of the diffusion and confusion present in the encrypted data sequence given as output, but also, because of its own construction, it is assured in advance this diffusion and confusion in an objective way. A completely new aspect of this invention is that the operations of the self-corrector randomising-encrypting device are carried out according to the output data sequence properties; depending on this properties, the system and method makes necessary adjustments to get the output data sequence to comply with the specified randomness requirements.

The system and method of this invention can achieve the purposes of ensuring the randomisation of the transmitted encrypted data sequence by means of the evaluation of this sequence by making use of randomness tests, such as those described in the Federal Information Processing Standards Publication 140-1 or FIPS PUB 140-1, entitled "Security requirements for cryptographic modules", dated on 11 Jan. 1994, of the "National Institute of Standards and Technology" ("NIST") of the Commerce Department of the United States Government, in section 4.11.1 entitled "Power-Up Tests", or the randomness test presented in "The Art of Computer Programming—$2^{nd}$ Edition" Volume 2 "Seminumerical Algorithms", authored by Donald E. Knuth, Addison-Wesley Publishing Company, ISBN 0-201-03822-6(v.2) from page 54 to 65, or the randomness test presented in the article "A Universal Statistical Test for Random Bit Generators" by Ueli M. Maurer, from page 409 to 420 of the publication "Advances in Cryptology—CRYPTO '90 Proceedings", Springer-Verlag, ISBN 3-540-54508-5, among many others. Some of the randomness tests evaluate data sequence of predetermined length, as the randomness test described in the FIPS PUB 140-1 of the NIST that evaluate 20000 bit sequences; people with knowledge in this art will agree with the fact that the plaintext sequence can be divided into blocks of predetermined length; therefore, the self-corrector randomisation-encryption and decryption system and method are able to operate over the blocks that result from the division, or the data sequence dividing means of blocks of predetermined length can be incorporated in the self-corrector randomising-encrypting and decrypting system and method operating individually over each one without affecting the essence of the invention.

If the randomness evaluation of the output encrypted data sequence is positive, this sequence complies with the randomness test that has been implemented in the device and can be transmitted. If the randomness evaluation is negative, the elements susceptible of modification that are involved in the operation such as the plaintext sequence or the encryption key can be modified, and so the randomisation-encryption process is repeated until the output encrypted data sequence complies with the properties required by the randomness tests implemented in the system. Because of the randomising-encrypting system features, there exist a third adaptable element that is the own randomising-encrypting device used in the self-corrector randomising-encrypting device, that is designated as corrector randomising-encrypting device and will be subsequently described. The self-corrector decrypting component for the correct decryption of the randomised-encrypted text sequence with the encryption key has the means to decide if it is necessary to make adjustments in order to achieve the original plaintext sequence; the self-corrector randomising-encrypting device as well as the self-corrector decrypting device are designed in such a way that there exist a correspondence between both about the elements that are adapted and which are those exactly. The system and method of this invention achieve the purposes of randomised-encrypted data sequence generation by making use of the randomising-encrypting device in patent application WO-A-99/57845, entitled "Randomization-encryption system", published the 11 Nov. 1999, as well as the underlying ideas of this invention.

This report focuses mainly on the explanation of the self-corrector randomising-encrypting system because it is considered that this explanation is clear enough for people with some knowledge in this area to be extrapolated to the self-corrector randomising-encrypting method.

According to this invention, the self-corrector randomising-encrypting device has means to receive the plaintext sequence and means to receive control block. Corrective randomising-encrypting means that, correctively randomise-encrypt said plaintext sequence with said control block and result in suggested randomised-encrypted text sequence. Randomness verifying means that evaluate if said suggested randomised-encrypted text sequence complies with the randomness tests properties that implements; and operate according to this alternative: if said suggested randomised-encrypted text sequence is at random, it is supplied to the transmission channel as randomised-encrypted text sequence; if said suggested randomised-encrypted text sequence is not at random, a negative randomness verification result is sent to the abovementioned corrective randomising-encrypting means, which generate a new suggested randomised-encrypted text sequence that is supplied to said randomness verifying means. This process is repeated until a suggested randomised-encrypted text sequence, which complies with the at random number sequence properties, is generated.

This invention includes means for extracting from the randomised-encrypted text sequence the original plaintext sequence by means of self-corrector decrypting device. The way of carrying out said self-corrector decrypting device depends on the particular application of said corrective randomising-encrypting means, and a particular implementation of it will be subsequently described for each particular application of said corrective randomising-encrypting means exposed.

In accordance with this idea multiple ways of carrying out said corrective randomising-AMENDED SHEET encrypting means can be implemented; in this report two ways of carrying out it are explained, having each one of them several particular applications.

According to this invention, the first way of carrying out said corrective randomising-encrypting means, which is characterised by its operative capability according to the signature or summary of the plaintext sequence, has a first application such that said corrective randomising-encrypting means include signature generating-assembly means that, with said plaintext sequence, generate the signature of this and assemble it to said plaintext sequence and result in a signed plaintext sequence. By-trial sequence input corrector means that with the abovementioned signed plaintext sequence generate a modified signed plaintext sequence. Randomising-encrypting means that randomise-cipher said modified signed plaintext sequence with said control block and result in said suggested randomised-encrypted text sequence that is supplied to said randomness verifying means of self-corrector randomising-encrypting device. After randomness verification of said suggested randomised-encrypted text sequence by said randomness verifying means, if said suggested randomised-encrypted text sequence is not at random, a negative randomness verification result is received by the above-mentioned by-trial sequence input corrector means, which supply a new modified signed plaintext sequence to said randomising-encrypting means that, with said control block and said new modified signed plaintext sequence, generate a new suggested randomised-encrypted text sequence.

This invention includes means for extracting from the randomised-encrypted text sequence the original plaintext sequence by means of self-corrector decrypting device that includes means for receiving the randomised-encrypted text sequence and means for receiving the control block. Decrypting means that decipher said randomised-encrypt text sequence with said control block and result in the suggested plaintext sequence. The by-trial sequence output corrector means that supply said suggested plaintext sequence to signature verifying means. Said signature verifying means generate generated signature from the plaintext sequence withheld within said suggested plaintext sequence and compare said generated signature with the deciphered signature withheld within said suggested plaintext sequence; and operate according to this alternative: if said generated signature corresponds to said deciphered signature, said plaintext sequence is supplied to target; if said generated signature does not correspond to said deciphered signature, a negative signature correspondence notification is supplied to said by-trial sequence output corrector means, which supply a new modified suggested plaintext sequence to said signature verifying means that verify the signatures of said new modified suggested plaintext sequence. This process is repeated until the generated signature corresponds to the deciphered one.

In an specific implementation, the signature generating-assembly means and the signature verifying means generate identical signature for the same plaintext sequence and they can also have many specific implementations such as, and without limiting them, the well-known hash function SHA1, published in "Federal Information Processing Standards Publication 180-1" or "FIPS PUB 180-1" dated on the 17 Apr. 1995, that reports the "Secure Hash Standard", of "National Institute of Standards and Technology" ("NIST") from the Commerce Department of the United States Government; or the MD5 function, described in "Request for Comments: 1321" or "rfc1321", authored by R. Rivest, of the MIT Laboratory for Computer Science and RSA Data Security, Inc., U.S.A., dated in April, 1992; or any other hash function such that the signature results from the application of a hash function to the plaintext sequence. In this report, hash functions have other uses, which are generically reported as HASH. Other possible implementations of the self-corrector randomising-encrypting device and of the self-corrector decrypting device are such that the signature is the plaintext sequence on its own, therefore consisting the signed plaintext sequence of twice the plaintext sequence, or being the generated signature a complementary sequence of the plaintext sequence as the people with some knowledge in this area know; another implementation can be, among many others, the reversed plaintext sequence. Other ways of carrying out the invention that do not affect its essence can be implemented without being necessary that the generated signature matches the decrypted signature, but only being necessary some particular correspondences between them; in order to make comprehension easier, this explanation focuses on the coincidence between signatures being these last ways of carrying out also included in the essence of the invention.

Because of the characteristics of the randomising-encrypting device, there can be a second implementation of the first type of carrying out said corrective randomising-encrypting means, such that the corrective randomising-encrypting means include signature generating-assembly means that generate the signature of said plaintext sequence and assemble it together with said plaintext sequence and result in a signed plaintext sequence. Sequence corrector randomising-encrypting means that randomise-cipher said signed plaintext sequence with said control block and result in a suggested randomised-encrypted text sequence that is supplied to said randomness verifying means of self-corrector randomising-encrypting device. After randomness verification of said suggested randomised-encrypted text sequence by said randomness verifying means, if said suggested randomised-encrypted text sequence is not at random, a negative randomness verification result is received by said sequence corrector randomising-encrypting means, which randomise-cipher in a different way said signed plaintext sequence with said control block and result in a new suggested randomised-encrypted text sequence.

The corresponding means to extract the original plaintext sequence from the randomised-encrypted text sequence are by means of self-corrector decrypting device, which includes means to receive the randomised-encrypted text sequence and means to receive control block. Sequence corrector decrypting means that decipher said randomised-encrypted text sequence with said control block and result in a suggested plaintext sequence. Signature verifying means that generate generated signature from the plaintext sequence withheld within said suggested plaintext sequence and verify the correspondence between said generated signature and the deciphered signature withheld within said suggested plaintext sequence; and operate according to this alternative: if said generated signature corresponds to said deciphered signature, said plaintext sequence is supplied to target; if said generated signature does not correspond to said deciphered signature, a negative signature correspondence notification is supplied to said sequence corrector decrypting means, which decipher with said control block said randomised-encrypted text sequence in a different way and result in a new suggested plaintext sequence to said signature verifying means that verify the correspondence of signatures of said new suggested plaintext sequence. This process is repeated until the generated signature corresponds to the deciphered one.

A third implementation of the first type of carrying out said corrective randomising-encrypting means is that they include candidate control block generating means that with said control block generate a candidate control block. Signature generating-assembly means that generate signature of said plaintext sequence and assemble it together with said plaintext sequence and result in a signed plaintext sequence, which is supplied to the randomising-encrypting means. Said randomising-encrypting means that randomise-cipher said signed plaintext sequence with said candidate control block and result ill a suggested randomised-encrypted text sequence that is supplied to said randomness verifying means of self-corrector randomising-encrypting device. After randomness verification of said suggested randomised-encrypted text sequence by said randomness verifying means, if said suggested randomised-encrypted text sequence is not at random, a negative randomness verifying result is received by said candidate control block generating means that generate a new alternative candidate control block; and said randomising-encrypting means randomise-cipher said signed plaintext sequence with said new alternative candidate control block and result in a new suggested randomised-encrypted text sequence.

The corresponding means to extract the original plaintext sequence from the randomised-encrypted text sequence are by means of self-corrector decrypting device, which includes means to receive the randomised-encrypted text sequence and means to receive control block. Candidate control block generating means that together with said control block generate candidate control block. Decrypting means that decipher said randomised-encrypted text sequence with said date control block and result in a suggested plaintext sequence. Signature verifying means that generate generated signature from the plaintext sequence withheld within said suggested plaintext sequence and verify the correspondence between said generated signature and the deciphered signature withheld within said suggested plaintext sequence; and operate according to this alternative: if said generated signature corresponds to said deciphered signature, said plaintext sequence is supplied to target; if said generated signature does not correspond to said deciphered signature, a negative signature correspondence notification is supplied to said candidate control block generating means, which generate a new alternative candidate control block; said decrypting means that decipher said randomised-encrypted text sequence with said new alternative candidate control block and result in a new suggested plaintext sequence to said signature verifying means that verify signatures of said new suggested plaintext sequence. This process is repeated until the generated signature corresponds to the deciphered one.

People with some knowledge in this art will agree in the fact that there can be different ways of carrying out said corrective randomising-encrypting means, which can be implemented so that the means consist at the same time of the three implementations which has been described above: the plaintext modifications and the use of sequence corrector randomising-encrypting means and control block modification or any combination of two of them; or it can also occur the alternation among them in the randomisation-encryption of a plaintext sequence, as well as other implementations.

Variations in which the signature element, presented in the previous implementations, is not used can occur, but these ones do not affect the essence of this invention. In the second implementation of said corrective randomising-encrypting means for instance, the specifications of the modification applied to the plaintext sequence, the corrected randomisation-encryption of sequence or control block, are introduced into the randomised-encrypted text sequence for instance by means of a modification index such that, thanks to the extraction of said index, the self-corrector decrypting device knows directly the modification which must be carried out in order to obtain the original plaintext sequence. This way of carrying out the invention has some advantages over the abovementioned ones such as the speed increase in the self-corrected decryption because an only decryption is always executed thanks to the direct knowledge of the modification that must be used; despite it has the disadvantage that it includes the index in the randomised-encrypted text sequence and this element can be used by enemy criptoanalyst to perform attacks in order to get the randomisation-encryption key and/or the protected plaintext sequence.

According to the invention, a first implementation of the second way of carrying out said corrective randomising-encrypting means is that in which said corrective randomising-encrypting means include selected index generating means that supply a selected index to by-index sequence input corrector means. Said by-index sequence input corrector means together with said plaintext sequence and said selected index supply a by-index modified plaintext sequence to randomising-encrypting means. Said randomising-encrypting means randomise-cipher said by-index modified plaintext sequence with said control block and result in a suggested randomised-encrypted text sequence that is supplied to said randomness verifying means of self-corrector randomising-encrypting device. After randomness verification of said suggested randomised-encrypted text sequence by said randomness verifying means, if said suggested randomised-encrypted text sequence is not at random, a negative randomness verification result is received by said selected index generating means that supply a new selected index to said by-index sequence input corrector means that, with said new selected index and the plaintext sequence, supply the new by-index modified plaintext sequence modified according to said new selected index, said randomising-encrypting means that randomise-encrypt the new by-index modified plaintext sequence with said control block and result in a new suggested randomised-encrypted text sequence.

This invention includes means to extract the original plaintext sequence from the randomised-encrypted text sequence by means of the self-corrector decrypting device that includes means to receive the randomised-encrypted text sequence and means to receive control block. Decrypting means that decipher said randomised-encrypted text sequence with said control block and result in a decrypted text sequence. By-index sequence output corrector means that extract selected index from said decrypted text sequence and supply the plaintext sequence, withheld in said decrypted text sequence, that has been modified according to said extracted selected index and result in the original plaintext sequence in target.

According to this invention, a second way of carrying out the second type of implementation is that in which the corrective randomising-encrypting means include selected index generating means that supply a selected index to by-index sequence corrector randomising-encrypting means. Said by-index sequence corrector randomising-encrypting means that randomise-cipher said selected index and said plaintext sequence, which is randomised-ciphered in a corrected way according to said selected index, with said control block, and result in a suggested randomised-encrypted text sequence that is supplied to said randomness verifying means of self-corrector randomising-encrypting device. After randomness verification of said suggested randomised-encrypted text sequence by said randomness verifying means, if said suggested randomised-encrypted text sequence is not at random, a negative randomness verification result is received by said selected index generating means, which supply a new selected index to said by-index sequence corrector randomising-encrypting means that, with said control block, randomise-cipher said new selected index and said plaintext sequence, which is randomised-ciphered in a corrected way according to said new selected index, and result in a new suggested randomised-encrypted text sequence.

The invention includes means to extract the original plaintext sequence from the randomised-encrypted text sequence by means of the self-corrector decrypting device that includes means to receive the randomised-encrypted text sequence and means to receive control block. By-index sequence corrector decrypting means that with said control block decipher in a corrected way said randomised-encrypted text sequence according to the extracted selected index, which has been decrypted from said randomised-encrypted text sequence, and result in the original plaintext sequence in target.

According to this invention, a third way of carrying out the second type of implementation is that in which said corrective randomising-encrypting means include selected index generating means that generate an initial selected index. By-index control block generating means that with said control block and said initial selected index supply initial by-index control block. Randomising-encrypting means that randomise-cipher said initial selected index and said plaintext sequence with said initial by-index control block and result in the suggested randomised-encrypted text sequence that is supplied to said randomness verifying means of self-corrector randomising-encrypting device. After randomness verification of said suggested randomised-encrypted text sequence by said randomness verifying means, if said suggested randomised-encrypted text sequence is not at random, a negative randomness verification result is received by said selected index generating means, which supply a new alternative selected index to said randomising-encrypting means and said by-index control block generating means that, with said new alternative selected index, supply a new alternative by-index control block to said randomising-encrypting means, which randomise-cipher said new alternative selected index with said initial by-index control block and randomise-cipher said plaintext sequence with said alternative by-index control block and result in a new suggested randomised-encrypted text sequence.

The invention includes means to extract the original plaintext sequence from the randomised-encrypted text sequence by means of the self-corrector decrypting device that includes means to receive the randomised-encrypted text sequence and means to receive control block. By-index control block generating means that with said control block supply an initial by-index control block according to the initial selected index. Decrypting means that extract the selected index from said randomised-encrypted text sequence with said initial by-index control block. Said by-index control block generating means that with said control block and said extracted selected index supply the alternative by-index control block, which corresponds to said extracted selected index, to said decrypting means which decipher the plaintext sequence from the randomised-encrypted text sequence with said alternative by-index control block and result in the original plaintext sequence in target.

People with knowledge in this art will agree in the fact that there can be different implementations such that there can be systems in which the devices consist of the three implementations previously described at the same time: plaintext modification and use of the by-index corrector randomising-encrypting means of sequence and control block modification, or any combination of two of them; or it can also occur the alternation among them in the randomisation-encryption of a plaintext sequence and the applicable modification according to the selected index, as well as other implementations.

In order to make the understanding of this document easier as an integral part or fit, a series of figures is presented below. These figures illustrate, but do not limitate, the object of this invention in different ways of carrying out it.

BRIEF DESCRIPTION OF DRAWINGS

FIG. 6 shows basic block connection diagram of the first variation of the first type of implementation of the self-corrector randomising-encrypting device in FIG. 5.

FIG. 7 shows block connection diagram of the self-corrector decrypting device in FIG. 5; self-corrector decrypting device for the decryption of randomised-encrypted text sequence, which has been generated with the self-corrector randomising-encrypting device in FIG. 6.

FIG. 10 shows block connection diagram of the third variation of the first type of implementation of the self-corrector randomising-encrypting device in FIG. 5.

FIG. 11 shows block connection diagram of the self-corrector decrypting device in FIG. 5; self-corrector decrypting device for the decryption of randomised-encrypted text sequence, which has been generated with the self-corrector randomising-encrypting device in FIG. 10.

FIG. 14 shows block connection diagram of randomisation-encryption control subblock generator belonging to the sequence corrector randomising-encrypting device in FIG. 12, also used in the element of FIG. 30.

FIG. 15 shows block connection diagram of decryption control subblock generator belonging to the sequence corrector decrypting device in FIG. 13, also used in the element of FIG. 31.

FIG. 16 shows block connection diagram of variation of randomisation-encryption control subblock generator in FIG. 14.

FIG. 17 shows block connection diagram of variation of decryption control subblock generator in FIG. 15.

FIG. 26 shows block connection diagram of the second variation of the second type of implementation of the self-corrector randomising-encrypting device in FIG. 5.

FIG. 27 shows block connection diagram of the self-corrector decrypting device in FIG. 5; self-corrector decrypting device for the decryption of the randomised-encrypted text sequence, which has been generated with the self-corrector randomising-encrypting device in FIG. 26.

MODES FOR CARRYING OUT THE INVENTION

Figure 1:
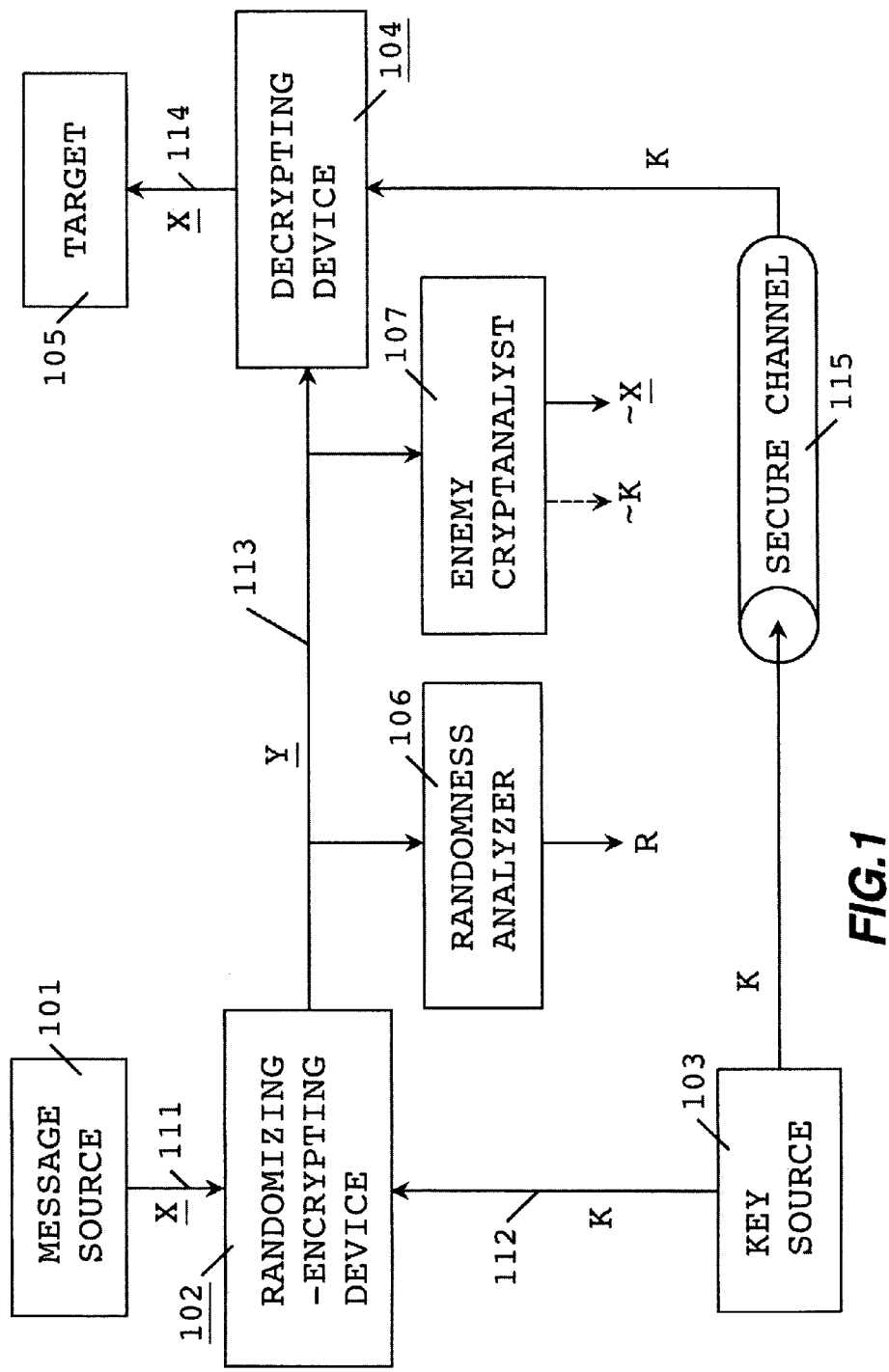
FIG. 1 shows previous art about basic block connection diagram of a system for transmission and treatment of randomised-encrypted data as in patent application WO-A-99/57845, which has been included in order to make subsequent references regarding this invention easier.

FIG. 1 shows previous art about block connection diagram of the system used for the transmission and treatment of randomised-encrypted data such as the one in patent application WO-A-99/57845 entitled "Randomization-encryption system", which has been included in this report for subsequent reference to some elements of it. The plaintext sequence $\underline{X}$ to be transmitted is originated in a message source 101, a computer for instance, supplied through the plaintext sequence supplying channel 111 to the randomising-encrypting device 102, in which it is randomised-encrypted and transmitted as a ciphertext sequence $\underline{Y}$ through a communication transmission line or transmission channel 113. This ciphertext sequence $\underline{Y}$ arrives to the decrypting device 104 at the receiver's side, which feeds the target 105, a second computer for instance, through the decrypted text sequence supplying channel 114 with the plaintext sequence $\underline{X}$.

For randomisation-encryption and decryption of data, the randomising-encrypting device 102 and the decrypting device 104 use the encryption key block or control block K, which is supplied from a key source 103 through the control block supplying channel 112 to the randomising-encrypting device 102 and through the control block secure supplying channel 115, which can be a sealed mail for instance, to the decrypting device 104.

The user can verify the degree of diffusion and confusion of the values that this ciphertext sequence $\underline{Y}$ presents by making use of a randomness analyzer 106 that results in the randomness external test result R. According to this result, the key source 103 is able to know the degree of diffusion and confusion of the values present in the ciphertext sequence $\underline{Y}$.

The ciphertext sequence $\underline{Y}$ in the transmission channel 113 is always exposed to the risk that an enemy cryptanalyst 107 will read the ciphertext sequence $\underline{Y}$ and try to obtain the corresponding plaintext sequence $\underline{X}$ or control block K (results of these attempts are designated by $\sim\underline{X}$ and $\sim$K).

Subsequently we will refer to the elements of the plaintext sequence supplying channel 111, the control block supplying channel 112, the transmission channel 113, the decrypted text sequence supplying channel 114, the control block secure supplying channel 115 as input 111, input 112, output/input 113, output 114 and input 115 in order to make the understanding of the insertion of the randomising-encrypting device 102 and the decrypting device 104 in the devices of this report easier; also we will use these names to design elements of this invention that carry out the same functions.

Figure 2:
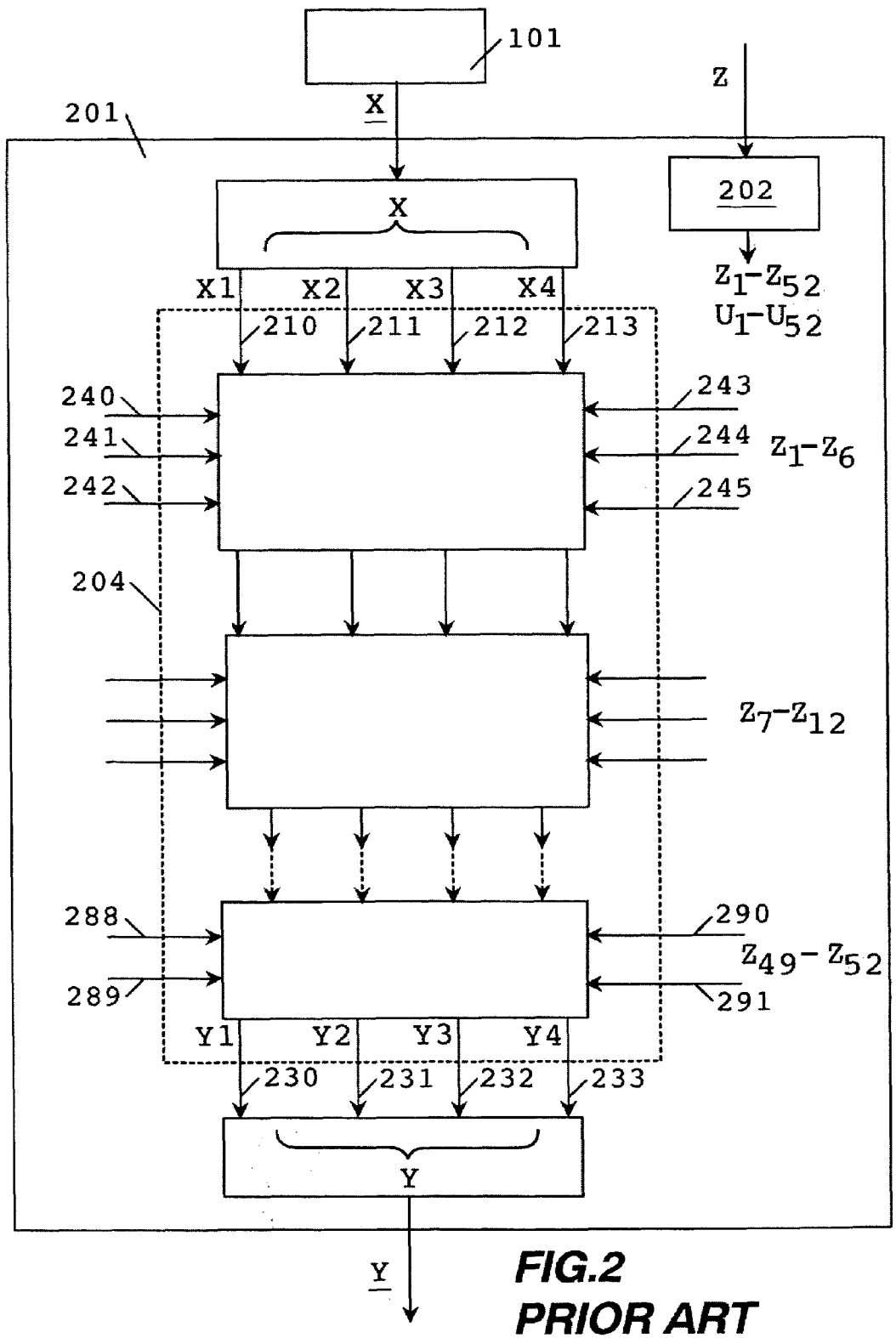
FIG. 2 shows previous art about block interconnection diagram for the block encrypting device in U.S. Pat. No. 5,214,703, which has been included in order to make subsequent references regarding this invention easier.

FIG. 2 shows block connection diagram of block encrypting device, described in U.S. Pat. No. 5,214,703 entitled "Device for the conversion of a digital block and use of same", corresponding to FIG. 2 of said patent, and which has been included for subsequent reference. The alphabetical references used in FIG. 2 are the same as those used in said FIG. 2 and in the description of U.S. Pat. No. 5,214,703, so that it is easier to know the object they refer to. The numerical references have been modified in order to adapt them to this document. The block encrypting device 201 ciphers the plaintext sequence $\underline{X}$ and results in the ciphertext sequence $\underline{Y}$ by making use of control block Z. During the encryption process, the control subblocks are the encryption control subblocks $Z_1$-$Z_{52}$, while during the decryption process, these are the decryption control subblocks $U_1$-$U_{52}$, which are also derived from control block Z.

The method for obtaining said encryption control subblocks $Z_1$-$Z_{52}$, used in the encryption process, from control block Z by the encryption control subblock generator 202 is also explained in the description of said U.S. Pat. No. 5,214,703 by making use of the same alphanumerical references.

The block encrypting-decrypting device 204 needed for the encryption process X->Y is represented by a dashed line in FIG. 2 and will be subsequently referenced in that way.

Figure 3:
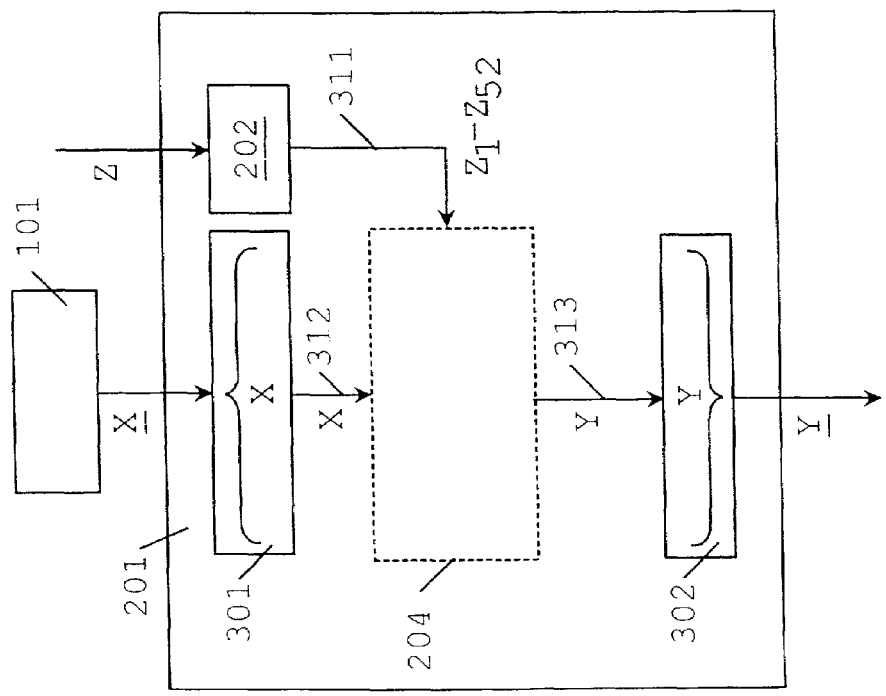
FIG. 3 shows previous art about block interconnection diagram for the block encrypting device in U.S. Pat. No. 5,214,703, schematised with respect to the one represented in FIG. 2, including elements of FIG. 2, which are relevant to the implementation of this invention.

FIG. 3 shows block schematised diagram of block encrypting device 201 of FIG. 2 in case of a block encryption, such as the one described in the abovementioned patent U.S. Pat. No. 5,214,703 entitled "Device for the conversion of a digital block and use of same", and includes relevant elements for the description of this invention that will be referenced below. In FIG. 3 parts corresponding to parts shown in FIG. 2 are designated by the same references. The plaintext sequence $\underline{X}$ to be encrypted arrives continuously from the message source 101 to the assembly input unit of block of length N 301; this device assembles plaintext blocks of length N X where the preferred length is N=64 bits. The plaintext subblocks of length M X1, X2, X3, X4 of FIG. 2 make up the plaintext block of length N X shown in FIG. 3. This plaintext block of length N X arrives to the block encrypting-decrypting device 204 through input 312, consisting of 64 parallel lines. Input 312 is the union of the four inputs 210-213, consisting of 16 parallel lines each one, shown in FIG. 2. During the encryption process, control blocks are the encryption control subblocks $Z_1$ a $Z_{52}$, derived from control block Z in the encryption control subblock generator 202, which arrive to the block encrypting-decrypting device 204 through input 311. Input 311 represents the union of the 52 inputs 240-291 of the block encrypting-decrypting device 204 of FIG. 2. Finally, a ciphertext block of length N Y appears in the output 313 of the block encrypting-decrypting device 204. The ciphertext subblocks of length M Y1, Y2, Y3, Y4 of FIG. 2 make up the ciphertext block of length N Y shown in FIG. 3. Output 313 of the block encrypting-decrypting device 204 consists of 64 parallel lines and is the union of the four outputs 230-233, of 16 parallel lines each one, shown in FIG. 2. This ciphertext block of length N Y is transmitted from an output unit of blocks of length N 302. The succession of ciphertext blocks of length N Y results in the output ciphertext sequence $\underline{Y}$ that corresponds to the plaintext sequence $\underline{X}$.

Figure 4:
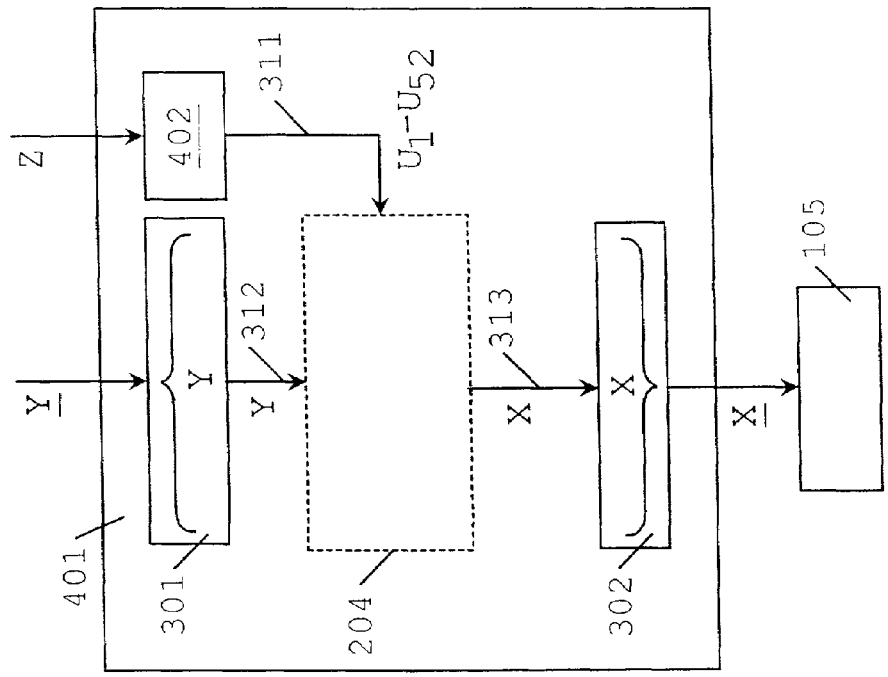
FIG. 4 shows previous art about block interconnection diagram for the block decrypting device in U.S. Pat. No. 5,214,703, schematised with respect to the one represented in FIG. 2, including elements of FIG. 2, which are relevant to the implementation of this invention.

FIG. 4 shows block schematised diagram of block decrypting device 401 in case of a block decryption, such as the one described in U.S. Pat. No. 5,214,703 entitled "Device for the conversion of digital block and use of same", schematized according to the one represented in FIG. 2 of this report, that includes relevant elements for the description of this invention that will be referenced below. In FIG. 4, parts corresponding to parts of FIG. 1, FIG. 2 and FIG. 3 are designated by the same references. The ciphertext sequence $\underline{Y}$ to be decrypted arrives to the assembly input unit of block of length N 301 that, step by step, assembles the ciphertext blocks of length N Y where the preferred length N=64 bits. The ciphertext block of length N Y represents the union of the four plaintext subblocks of length M X1, X2, X3, X4, of length M=16 bits each one, shown in FIG. 2. This ciphertext block of length N Y arrives to the block encrypting-decrypting device 204 through input 312 that consists of 64 parallel lines. Input 312 is the union of the four inputs 210-213, of 16 parallel lines each one, shown in FIG. 2 as it has been mentioned in the description of FIG. 3.

During the decryption process, control blocks are decryption control subblocks $U_1$ a $U_{52}$ derived from control block Z in the decryption control subblock generator 402 as described in said U.S. Pat. No. 5,214,703 by making use of the same alphanumerical references. The decryption control subblocks $U_1$ a $U_{52}$ arrive to the block encrypting-decrypting device 204 through input 311, which is the union of 52 inputs 240-291 of the block encrypting-decrypting device 204 in FIG. 2, as mentioned in the description of FIG. 3. Finally, a plaintext block of length N X, of length N=64 bits, appears in the output 313, which consists of 64 parallel lines, of the block encrypting-decrypting device 204. The plaintext block of length N X represents the union of the four ciphertext subblocks of length M Y1, Y2, Y3, Y4, of length M=16 bits each one, shown in FIG. 2. Output 313 of the block encrypting-decrypting device 204 is the union of the four outputs 230-233, of 16 parallel lines each one, in FIG. 2, as mentioned in the description of FIG. 3. This plaintext block of length N X is transmitted from an output unit of block of length N 302 to target 105. The succession of plaintext blocks of length N X results in the plaintext sequence $\underline{X}$ that corresponds to the supplied ciphertext sequence $\underline{Y}$.

Figure 5:
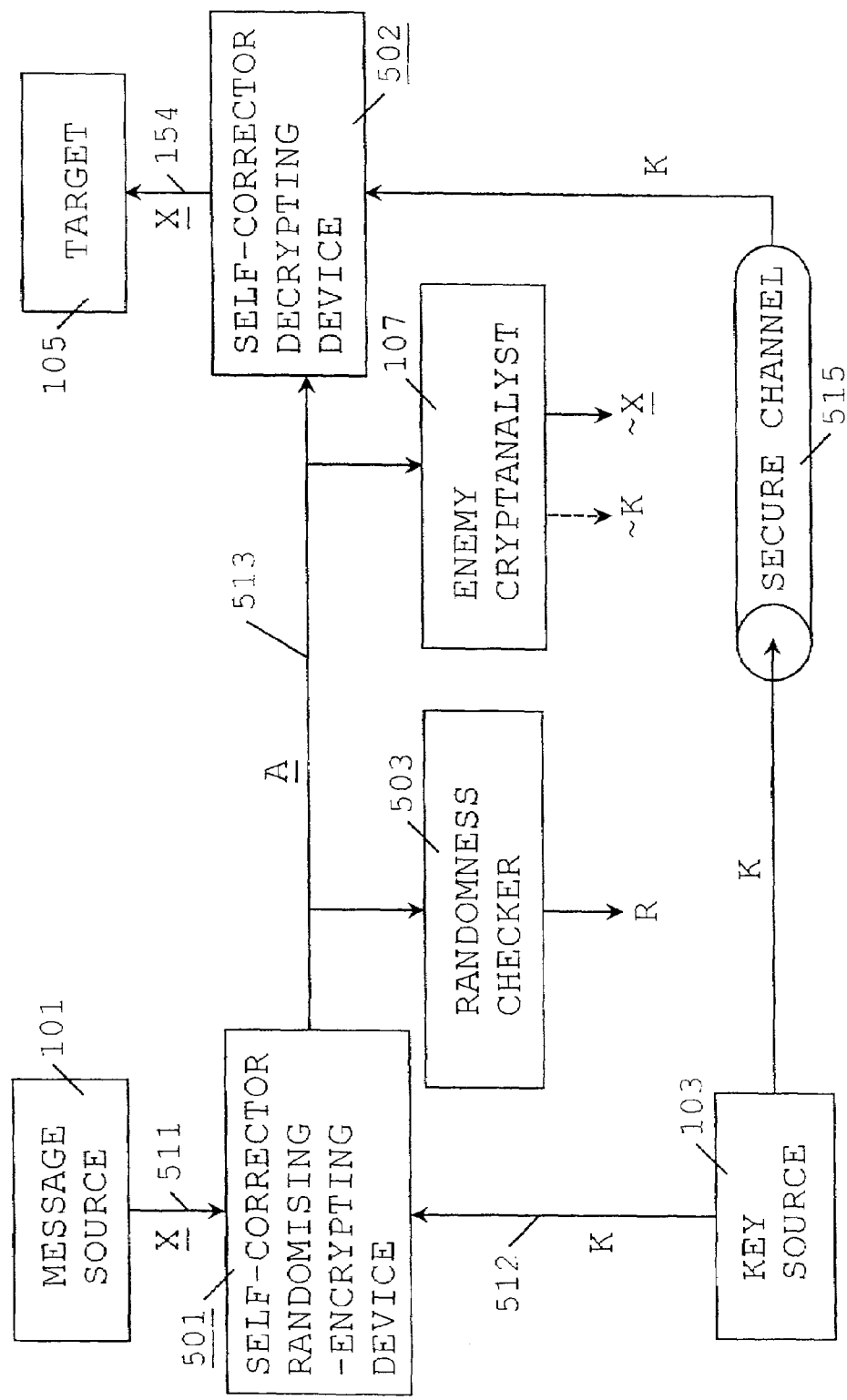
FIG. 5 shows basic block connection diagram of a system for the transmission of randomised-encrypted data by making use of the self-corrector randomising-encrypting device and the self-corrector decrypting device object of this invention.

FIG. 5 shows possible block connection basic diagram of the system for randomised-encrypted data transmission by making use of the self-corrector randomising-encrypting device and the self-corrector decrypting device object of this invention. In conjunction with FIG. 6, it shows the best way of implementating this invention. In FIG. 5, common parts corresponding to parts of FIG. 1 are designated by the same references. The plaintext sequence $\underline{X}$ to be transmitted is originated in a message source 101, a computer for instance, and, through the plaintext sequence supplying channel 511, arrives to the self-corrector randomising-encrypting device where it is randomised-encrypted by making use of the randomisation-encryption key or control block K, which is supplied from a key source 103 through the control block supplying channel 512, and results in a randomised-encrypted text sequence $\underline{A}$ that is transmitted through a communication transmission line or transmission channel 513.

Considering the at random sequence properties that the randomised-encrypted text sequence $\underline{A}$ presents, this sequence can be subjected to a randomness analysis in the randomness checker 503 in order to verify that the randomised-encrypted text sequence $\underline{A}$ complies with the at random number sequence properties and to check in an objective way the degree of diffusion and confusion of values that presents. The result of the application of the randomness tests in the randomness checker 503 to the randomised-encrypted text sequence $\underline{A}$ is designated as randomness external test result R.

Said randomness checker 503 can be a hardware or software implementation of a selection or totality of different existing randomness tests, like those mentioned before, an adaptation of the tests presented in "The Art of Computer Programming—$2^{nd}$ Edition" authored by Donald E. Knuth, or the compulsory tests described in FIPS PUB 140.1, or the test described in the article "A Universal Statistical Test for random Bit Generators" by Ueli M. Maurer among others. The specific randomness tests that are implemented in the randomness checker 503 can be the same ones or different from the ones integrated in the self-corrector randomising-encrypting device 501, which will be described below.

The randomised-encrypted text sequence $\underline{A}$ arrives to the self-corrector decrypting device 502, at the receiver's side, which feeds target 105, a second computer for instance, through a decrypted text sequence supplying channel 514 with the plaintext sequence $\underline{X}$. For the decryption of the randomised-encrypted text sequence $\underline{A}$, the self-corrector decrypting device 502 uses control block K that it is supplied from the key source 103 through the control block secure supplying channel 515, a sealed mail for instance.

The randomised-encrypted text sequence $\underline{A}$ in the transmission channel 513 is always exposed to the risk that an enemy cryptanalyst 107 will also read this randomised-encrypted text sequence $\underline{A}$ and try to obtain the corresponding plaintext sequence $\underline{X}$ or control block K (results of these attempts are designated by ~$\underline{X}$y~K).

FIG. 6 shows possible diagram of the first variation of the self-corrector randomising-encrypting device of FIG. 5, characterised by the determination by trial and error of the correction of the signed text sequence XF in order to obtain the randomised-encrypted text sequence $\underline{A}$, of the first type of implementation of the randomised-encrypted data transmission system object of this invention. In FIG. 6, common parts corresponding to parts of FIG. 1 and FIG. 5 make use of the same references.

The first way of carrying out it is characterised by the randomisation-encryption of a sequence that consists of the plaintext sequence $\underline{X}$ and a plaintext block, designated as signature, which is function of the plaintext sequence $\underline{X}$, so that the randomisation-encryption and the decryption are carried out by trial and error attempts; in randomisation-encryption in order to obtain the at random sequence and in decryption in order to obtain the correspondence between decrypted signature and the signature that has been computed by the self-corrector decrypting device.

The plaintext sequence $\underline{X}$ to be transmitted is originated in a message source 101, a computer for instance, and arrives to the self-corrector randomising-encrypting device 501v1 through the plaintext sequence supplying channel 511 to the signature generating-assembly device 601 that, with the plaintext sequence $\underline{X}$, generates the signature, MAC, summary or digest of the same. As examples of signature generators implemented in the signature generating-assembly device 601 it can be mentioned hash functions, as the above-mentioned MD5 and SHA1, the repeated plaintext sequence $\underline{X}$ or its reversal, or the complementary sequence; there exist many other options for the signature generation. Signature generating-assembly device 601 assembles the plaintext sequence $\underline{X}$ signature with the same plaintext sequence X in order to make up the signed plaintext sequence XF that is supplied to the by-trial sequence input corrector 602 through output 611. The by-trial sequence input corrector 602 supplies the modified signed plaintext sequence XM to the randomising-encrypting device 102 through input 111. In the first attempt of randomisation-encryption, the modified signed plaintext sequence XM can be the same signed plaintext sequence XF or the sequence that results from the operations, which will be described below, implemented over the signed plaintext sequence XF.

The self-corrector randomising-encrypting device 501v1 receives through control block supplying channel 512 the control block K that reaches the randomising-encrypting device 102 through input 112, which is an extension of the control block supplying channel 512.

The randomising-encrypting device 102 groups the modified signed plaintext sequence XM and control block K and generates the suggested randomised-encrypted text sequence AP, which is supplied through output 113 to the randomness verifying device 603. The function of this randomness verifying device 603 is to verify if the suggested randomised-encrypted text sequence AP complies with the at random number sequence properties, which are specified in the tests that implements such as the "Universal Statistical Test" by Ueli M. Maurer or the randomness tests, which are described in FIPS 140-1 of NIST, applied to 20000 bit subblocks such that the test is passed if all the subblocks pass it. The result of said tests is designed as randomness verification result T and within this description will be positive or negative whether the suggested randomised-encrypted text sequence AT complies with the at random number sequence properties, which are implemented by the randomness verifying device 603, or not respectively.

If the randomness verifying result T is positive, the randomness verifying device 603 transmit through transmission channel 513 the suggested randomised-encrypted text sequence AP as randomised-encrypted text sequence A.

If the randomness verifying result T is negative, the randomness verifying device 603 does not transmit through transmission channel 513 the suggested randomised-encrypted text sequence AP, but transmits a negative randomness verification result T through output 612 to the by-trial sequence input corrector 602 that, from the signed plaintext sequence XF or the previous modified signed plaintext sequence XM, generates a new different modified signed plaintext sequence XM; this new sequence is randomised-encrypted in the randomising-encrypting device 102 with control block K and results in a new suggested randomised-encrypted text sequence AP that is subjected to the randomness verifying device 603. This process is repeated until the randomness verification result T, resulting from its application to the generated suggested randomised-encrypted text sequence AP, is positive.

People with knowledge will agree in the fact that there can be other implementations that do not affect the essence of this invention such that if the randomness tests, which are implemented in the randomness verifying device 603, analyse predetermined or fixed length data sequences, as it happens in the abovementioned randomness tests in FIPS PUB 140-1 of 'NIST' that operate over 20000 bit data sequences, dividing means could be included in the self-corrector randomising-encrypting device as well as in the corresponding self-corrector decrypting device and in all their variations. These dividing means operate so that they assemble blocks or fixed length subsequencies from the plaintext sequence or the randomised-encrypted text sequence; so the way of operating over sequences described in this report operates individually over the different blocks or the assembled subsequences, being the plaintext sequence in decryption subsequently recovered by the union of the different blocks or individually decrypted subsequences. Many other specific implementations can be carried out. All the reported descriptions about different ways of implementing the self-corrector randomising-encrypting device 501 and the self-corrector decrypting device 502 are carried out according to the option of randomisation-encryption of the plaintext sequence in a single step, due to the fact that we consider this option clearer, without excluding other options.

There exist other implementations of the self-corrector randomising-encrypting device 501v1 such that the function carried out by the by-trial sequence input corrector 602 can be implemented in a modified randomising-encrypting device that includes means to carry out this function. In order to make the understanding of this invention easier we prefer to show it in this way, respecting the previous state of the art, without excluding of the essence of this invention other specific implementations. Similar considerations can be applied to the remaining variations of the self-corrector randomising-encrypting device as well as of the self-corrector decrypting device.

The by-trial sequence input corrector 602 generates modified signed plaintext sequence XM according to the following attempt of randomisation-encryption that is carried out. The by-trial sequence input corrector 602 can generate the modified signed plaintext sequence XM by means of any operation/function or operation/function sequence such that the corresponding self-corrector decrypting device includes a reverse operation/function or reverse operation/function sequence that allows to recover the original signed plaintext sequence XF. The by-trial sequence input corrector 602 can modify the signed plaintext sequence XF, among multiple implementations, by means of function $F^1$ such as the following ones, without limiting them, in which operations are carried out over the plaintext blocks of length L XL of the previous modified signed plaintext sequence XM or over the signed plaintext sequence XF:

$F^1$="complementary left shift", whereby being the block of the previous randomisation-encryption attempt $XL=b_{L-1}, b_{L-2}, \ldots, b_0$, left shift of a bit and insertion of the complementary of the shifted bit on the right, resulting block $XL=b_{L-2}, \ldots, b_0,$ ] $b_{L-1}$, designating the symbol ] the complementary operation, $F^1$="complementary right shift", whereby being the block of the previous randomisation-encryption attempt $XL=b_{L-1}, \ldots, b_1, b_0$, right shift of a bit and insertion of the complementary of the shifted bit on the left, resulting block $XL=$] $b_0, b_{L-1}, b_1$, or including a counter of the negative randomness verification results T, designed by CR, such as:

$F^1$ (XL, CR)=(XL oper+/−CR) mod $2^L$, where oper+/− can be the addition or subtraction for instance, without limiting other possible operations. The referred symbol oper+/− will be used in this report in order to make reference of the addition or subtraction operations, without limiting to these ones, General implementation, that we designate "subblock operation", being divided the block of length L XL into different subblocks XL1, ... XLS, such that XLj consisting of Qj bits being Qj less or equal to L for j=1, ..., S; $F^1$ (XL, CR)=union of ((XLj oper+/−CR) mod $2^{Qj}$) for j=1, ..., S.

Being defined the operation "mod" as the operation "module" as it is known in the art, such that "a=b mod c" where "a" is the remainder of the integer division of "b" by "c".

Other possible functions.

There exist modifying operations over particular plaintext sequences that have more possibilities than others for generating a suggested randomised-encrypted text sequence AP that complies with the tests implemented by the randomness verifying device 603 in FIG. 6. This can be also applied to the operations or modifications carried out in the elements 801, 1801, 2001, 2401, 2602, 3201 and 3401 in FIG. 8, FIG. 18, FIG. 20, FIG. 24, FIG. 26, FIG. 32 and FIG. 34 respectively, to the corresponding transformer block, control block or plaintext sequence.

The devices in FIG. 6, FIG. 26, FIG. 32 and FIG. 42 can have other different uses such as the generation of at random number sequences.

FIG. 7 shows possible diagram of variation of self-corrector decrypting device in FIG. 5, characterised by the determination by trial and error of the correction in the suggested plaintext sequence XP in order to obtain the plaintext sequence X and decipher the randomised-encrypted text sequences, which have been randomised-encrypted by the device in FIG. 6. In FIG. 7, common parts corresponding to parts in FIG. 1 and FIG. 5 use the same references.

The self-corrector decrypting device 502v1 receives through control block secure supplying channel 515 control block K that reaches through input 115, which is an extension of the input 515, the decrypting device 104.

The randomised-encrypted text sequence A arrives to the self-corrector decrypting device 502v1 through the transmission channel 513 and reaches through input 113, which is an extension of the abovementioned channel, the decrypting device 104 that deciphers the randomised-encrypted text sequence A by making use of control block K and results in the decrypted text sequence XD through output 114, and arrives to the by-trial sequence output corrector 701.

The by-trial sequence output corrector 701 supplies the decrypted text sequence XD as the suggested plaintext sequence XP to the signature verifying device 702 through channel 711. The by-trial sequence output corrector 701 can directly supply the decrypted text sequence XD as suggested plaintext sequence XP or transform it; this alternative will depend on the implementation of the by-trial sequence input corrector 602 in FIG. 6, with which the randomised-encrypted text sequence $\underline{A}$ was randomised-encrypted. The operations that the by-trial sequence output corrector 701 carries out are described below.

The signature verifying device 702 generates by means of the plaintext sequence segment withheld in the suggested plaintext sequence XP its signature by making use of the same signature generating function that the signature generating-assembly device 601 in FIG. 6, with which the plaintext sequence $\underline{X}$ was randomised-encrypted. Once it computes the signature that corresponds to the plaintext sequence segment, it verifies the correspondence between this computed signature and the one withheld in the suggested plaintext sequence XP that has been computed by the signature generating-assembly device 601 in FIG. 6.

If this comparison is positive, the signature verifying device 702 supplies through decrypted text sequence supplying channel 514 the plaintext sequence segment as plaintext sequence $\underline{X}$ to target 105.

If this comparison is negative, the signature verifying device 702 supplies through output 712 the negative signature correspondence notification E to the by-trial sequence output corrector 701 in order to carry out a new transformation of the same decrypted text sequence XD or the previous suggested plaintext sequence XP, this depends on the specific implementation that the by-trial sequence input corrector 602 in FIG. 6 and the corresponding by-trial sequence output corrector 701 have, in order to supply a new suggested plaintext sequence XF to the signature verifying device 702. This process is repeated until the signature correspondence is positive.

The by-trial sequence output corrector 701 modifies the decrypted text sequence X) or the previous suggested plaintext sequence XP according to the reverse operation to the one carried out in the respective attempt of randomisation-encryption of the signed plaintext sequence XF in the by-trial sequence input corrector 602 in FIG. 6. The modification process of the suggested plaintext sequence XP is repeated for every negative signature correspondence notification E according to the reverse operation to the respective one carried out in the by-trial sequence input corrector 602 in FIG. 6.

The by-trial sequence output corrector 701 can respectively modify the plaintext sequence with function $F^2$ for every function $F^1$, previously exposed for the by-trial sequence input corrector 602 in FIG. 6, by means of the following functions where the decrypted text sequence XD or the previous suggested plaintext sequence XP are divided into blocks of length L XG:

$F^2$=being the text block of the previous decryption attempt XG=$b_{L-1}, \ldots, b_1, b_0$, right shift of a bit and insertion of the complementary of the shifted bit on the left, resulting block XG=] $b_0, b_{L-1}, \ldots, b_1$, if the by-trial input corrector 602 in FIG. 6 modified the block by means of function "complementary left shift", $F^2$ being the block of the previous decryption attempt XG=$b_{L-1}, b_{L-2}, \ldots, b_0$, left shift of a bit and insertion of the complementary of the shifted bit on the right, resulting block XG=$b_{L-2}, \ldots, b_0,$ ] $b_{L-1}$ if the by-trial input corrector of sequence 602 in FIG. 6 modified the block by means of function "complementary right shift", or including a counter of the negative signature correspondence notifications E that we designate CD, for instance: to $F^2$ (XG, CD)=(XG oper–/+CD) mod $2^L$ if the by-trial input corrector of sequence 602 in FIG. 6 used function $F^1$ (XL, CR)=(XL oper+/–CR) mod $2^L$, and representing the operation operat–/+ the reverse operation to the operation oper+/– implemented in said by-trial input corrector of sequence 602.

$F^2$ similar to function "subblock operation", replacing the operation oper+/– by the reverse operation to the one implemented in the by-trial input corrector of sequence 602 in FIG. 6.

Other reverse functions to those implemented in the by-trial input corrector of sequence 602 in FIG. 6 for the randomisation-encryption of the randomised-encrypted text sequence $\underline{A}$.

Figure 8:
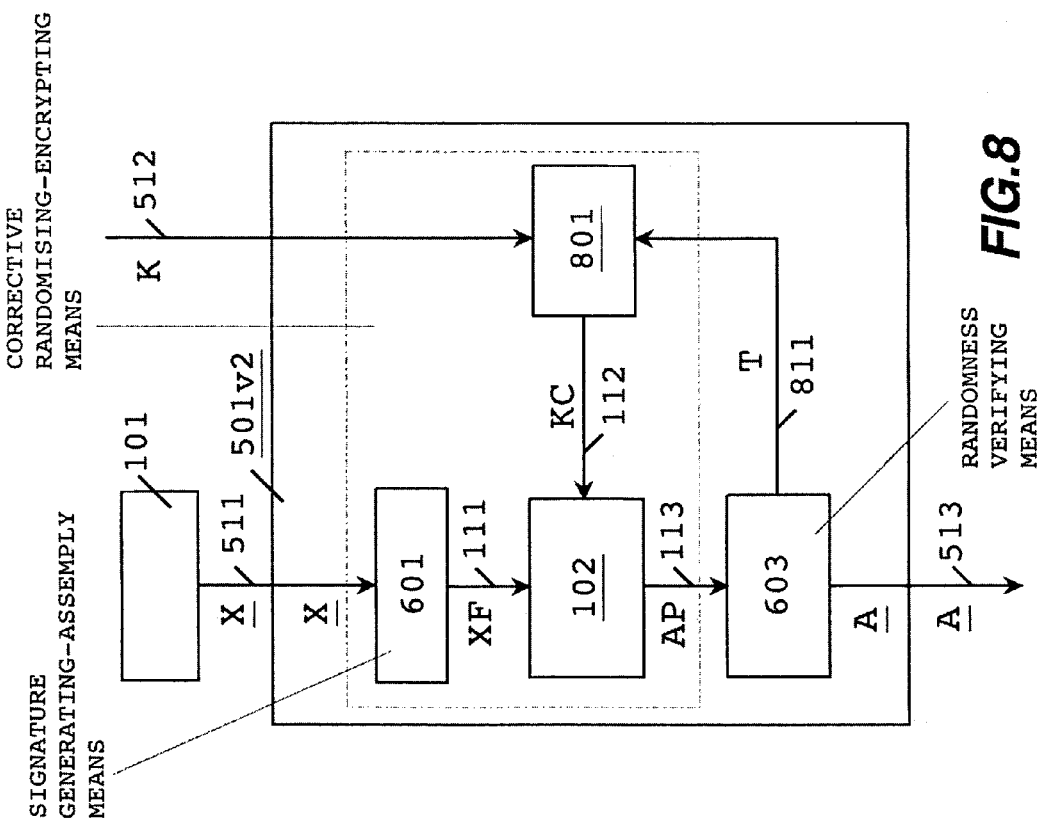
FIG. 8 shows block connection diagram of the second variation of the first type of implementation of the self-corrector randomising-encrypting device in FIG. 5.

FIG. 8 shows possible diagram of second variation of the self-corrector randomising-encrypting device of FIG. 5, characterised by the by-trial determination of candidate control block KC used to randomise the randomised-encrypted text sequence $\underline{A}$, of the first type of implementation of the randomised-encrypted data transmission system object of this invention. In FIG. 8, common parts corresponding to parts of FIG. 1, FIG. 5 and FIG. 6 make use of the same references.

Plaintext sequence $\underline{X}$ to be transmitted is originated in a message source 101 and arrives through plaintext sequence supplying channel 511 of the self-corrector randomising-encrypting device 501v2 to the signature generating-assembly device 601, which generates signed plaintext sequence XF supplied through output 111.

The self-corrector randomising-encrypting device 501v2 receives through control block supplying channel 512 control block K and arrives to the candidate control block generator 801; this generator will generate from said control block K the different candidate control blocks KC, which are supplied through output 112 to the randomising-encrypting device 102, for the different attempts of randomisation-encryption.

The randomising-encrypting device 102 randomise-ciphers the signed plaintext sequence XF supplied through input 111 by means of the first candidate control block KC, which can be the same control block K supplied through input 112 and generates a suggested randomised-encrypted text sequence AP that is supplied through output 113 to the randomness verifying device 603. In this device is subjected to the randomness tests that implements and this result is designed as randomness verification result T.

If this randomness verification result T is positive, the randomness verifying device 603 transmits through transmission channel 513 the suggested randomised-encrypted text sequence as randomised-encrypted text sequence $\underline{A}$.

If the randomness verification result T is negative, the randomness verifying device 603 does not transmit through transmission channel 513 the suggested randomised-encrypted text sequence AP and the candidate control block generator 801 receives the negative randomness verification result T through input 811 and generates a new alternative candidate control block KC that is supplied to the randomising-encrypting device 102 through output 112. A new randomisation-encryption of the signed plaintext sequence XF, whose previous randomisation-encryption has not generated an at random text sequence with the previously supplied candidate control block KC, is carried out and a new suggested randomised-encrypted text sequence AP is generated and supplied to the randomness verifying device 603. This process is repeated until a new suggested randomised-encrypted text sequence AP is generated so that the randomness verifying device 603 gives a positive randomness verification result T.

The candidate control block generator 801 generates the first candidate control block KC, which can be control block K for instance, and subsequently, for every negative randomness verification result T, it generates a new alternative candidate control block KC. The candidate control block generator 801 can be implemented in many different ways; some of these implementations are described: it can generate a new alternative candidate control block KC by means of function $KC=F^3$ (K)$=F^4$ (CR, K), where CR is a counter, initiated at 0 for instance, of the negative randomness verification results T. Some implementations of function $KC=F^3$ (K)$=F^4$ (CR, K) without limiting them could be:

In general $KC=F^4$ (CR, K)$=F^5_n$ (K) for CR=n, where $F^5_n$ (K) could be chosen in order to implement the following function:
$F^5_0$ (K)=K for CR=0.
$F^5_n$ (K)=$F^5$ ($F^5_{n-1}$ (K)) for CR=n, such that being divided control block K into different subblocks K1, ..., KS, such that Ki of length Qi bits, being Qi less or equal to LK, for i=1, ..., S, $F^5_n$ (K)=union of $F^6_n$ (Ki)=union of (($F^6_{n-1}$ (Ki) oper+/−B) mod $2^{Qi}$) for i=1, ..., S, where B is a value.

Other possible implementations of $F^5_n$ (K).

$KC=F^4$ (CR, K) can be, being divided block K into different subblocks K1, ..., KS, such that Ki of length Qi bits, being Qi less or equal to LK, for i=1, ..., S, $F^4$ (CR, K)=union of $F^7$ (CR, Ki)=union of ((Ki oper+/−CR) mod $2^{Qi}$) for i=1, ..., S.

Other possible implementations of $F^4$ (CR, K).

In the abovementioned implementations control block K will be of length LK according to the specific implementation of the randomising-encrypting device 102. Other implementations can be carried out without making use of a counter CR of negative randomness verification results T, such that with every negative randomness verification result T the alternative candidate control block KC results from a different operation to the previous ones applied to control block K.

For the particular randomisation-encryption of divided subsequences of the plaintext sequence, for each subsequence the first candidate control block KC corresponding to control block K can be generated in the first randomisation-encryption and an alternative candidate control block KC in each negative randomness verification result T; there can be another implementation in which for each subsequence the first candidate control block KC corresponds to the last generated candidate control block KC.

Figure 9:
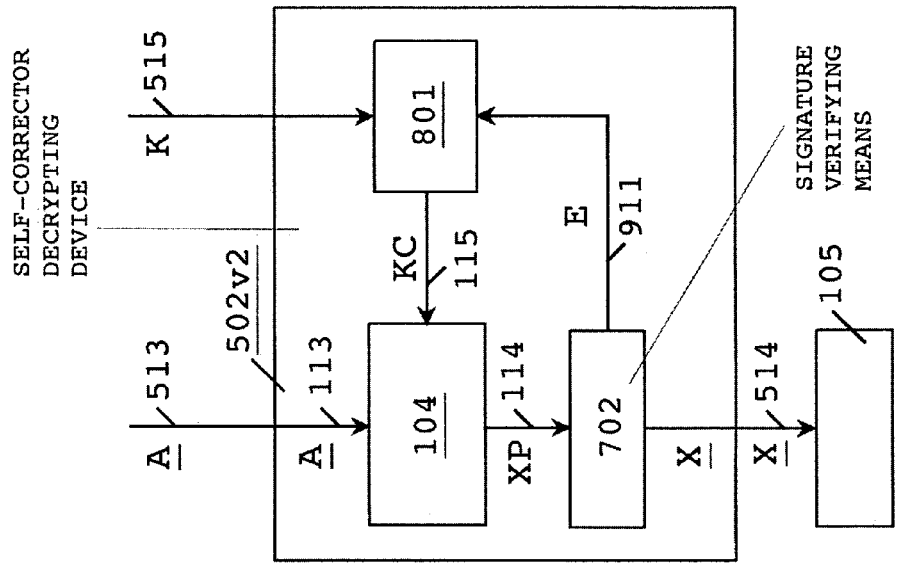
FIG. 9 shows block connection diagram of the self-corrector decrypting device in FIG. 5; self-corrector decrypting device for the decryption of randomised-encrypted text sequence, which has been generated with the self-corrector randomising-encrypting device in FIG. 8.

FIG. 9 shows possible diagram of variation of the self-corrector decrypting device of FIG. 5, characterised by the by trial and error determination of the candidate control block KC used to obtain the plaintext sequence X, for the decryption of randomised-encrypted text sequences with the device in FIG. 8. In FIG. 9, common parts corresponding to parts of FIG. 1, FIG. 5, FIG. 7 and FIG. 8 make use of the same references.

The self-corrector decrypting device 502v2 receives through control block secure supplying channel 515 control block K that arrives to the control block generator 801, which generates from said control block K the first candidate control block KC, which is supplied through output 115.

The randomised-encrypted text sequence A arrives to the self-corrector decrypting device 502v2 through transmission channel 513 and reaches the decrypting device 104 through input 113, which is an extension of the transmission channel 513, where it is deciphered by making use of the first candidate control block KC supplied by the candidate control block generator 801 and results in the suggested plaintext sequence XP supplied through output 114 to the signature verifying device 702.

The signature verifying device 702 computes the signature of the plaintext sequence segment withheld in the suggested plaintext sequence XP; after computing the signature, it verifies if this signature corresponds to the decrypted signature withheld in the suggested plaintext sequence XP. If the signature correspondence is positive, the signature verifying device 702 supplies the segment of the plaintext sequence withheld in the suggested plaintext sequence XP as plaintext sequence X through decrypted text sequence supplying channel 514 to the target 105.

If the signature correspondence is negative, the signature verifying device 702 supplies negative signature correspondence notification E through input 911 to the candidate control block generator 801. Therefore, this generator 801 generates and supplies through output 115 a new alternative candidate control block KC, with which the decrypting device 104 carries out a new and different decryption of the randomised-encrypted text sequence A and results in a new suggested plaintext sequence XP that is supplied to the signature verifying device 702. This process is repeated until the signature correspondence notification E is positive.

The candidate control block generator 801 receives through the control block secure supplying channel 515 control block K and through input 911 the particular signature correspondence notification E, which results from the comparison between the signature generated with the plaintext segment of the suggested plaintext sequence XP and the decrypted signature withheld in the suggested plaintext sequence XP, and presents as output candidate control block KC through output 115. The candidate control block generator 801 presents the same implementation as the candidate control block generator 801 in FIG. 8, with which the randomised-encrypted text sequence A was randomised-encrypted. There can be different implementations but always in all them the candidate control block KC generated from control block K and the number of times that a negative signature correspondence notification E is received is the candidate control block KC generated by the candidate control block generator 801 in FIG. 8 for the same number of negative randomness verification results T.

FIG. 10 shows possible diagram of variation of the third self-corrector randomising-encrypting device of FIG. 5, characterised by the by trial and error determination of the transformation carried out by the randomising-encrypting device, for the first type of implementation of the randomised-encrypted data transmission system object of this invention. In FIG. 10, common parts corresponding to parts of FIG. 1, FIG. 5 and FIG. 12 make use of the same references.

The plaintext sequence X to be transmitted is originated in a message source 101 and arrives to the self-corrector randomising-encrypting device 501v3 through plaintext sequence supplying channel 511 and reaches the signature generating-assembly device 601 that makes up together with the plaintext sequence X the signed plaintext sequence XF that is supplied to the corrector randomising-encrypting device of sequence 1001 through output 1011.

The self-corrector randomising-encrypting device 501v3 receives through control block supplying channel 512 control block K that reaches through input 1012, which is an extension of the control block supplying channel 512, the corrector randomising-encrypting device of sequence 1001.

The corrector randomising-encrypting device of sequence 1001 groups the signed plaintext sequence XF and control block K and generates the suggested randomised-encrypted text sequence AP that is supplied through output 1013 to the randomness verifying device 603, which verifies if the suggested randomised-encrypted text sequence AP is at random; the verification result is the randomness verification result T.

If the randomness verification result T is positive, the randomness verifying device 603 transmits through transmission channel 513 the suggested randomised-encrypted text sequence AP as the randomized-encrypted text sequence $\underline{A}$.

If the randomness verification result T is negative, the randomness verifying device 603 do not transmit through transmission channel 513 the suggested randomised-encrypted text sequence AP and transmits the negative randomness verification result T through output 1014 to the corrector randomising-encrypting device of sequence 1001; this corrector randomising-encrypting device of sequence 1001 carries out, by making use of the same control block K, a new corrected randomisation-encryption of the signed plaintext sequence XF with the transformations in the transformer block WT as will be described below within the breakdown of the corrector randomising-encrypting device of sequence 1001, and results in new suggested randomised-encrypted text sequence AP that is supplied to the randomnes verifying device 603. This process is repeated until the suggested randomised-encrypted text sequence AP supplied to the randomness verifying device 603 complies with the tests that this device implements.

FIG. 11 shows possible diagram of variation of the self-corrector decrypting device of FIG. 5, characterised by the by trial and error determination of the transformation carried out by the decrypting device in order to obtain the plaintext sequence $\underline{X}$, for the decryption of the randomised-encrypted text sequences with the device in FIG. 10. In FIG. 11, common parts corresponding to parts in FIG. 1, FIG. 5, FIG. 7 and FIG. 13 make use of the same references.

The self-corrector decrypting device 502v3 receives through control block supplying channel 515 control block K that reaches through input 1112, which is an extension of the control block secure supplying channel 515, the corrector decrypting device of sequence 1101.

The randomised-encrypted text sequence $\underline{A}$ arrives to the self-corrector decrypting device 502v3 through transmission channel 513 and reaches through input 1111, which is an extension of the transmission channel 513, the corrector decrypting device of sequence 1101 that deciphers the randomised-encrypted text sequence $\underline{A}$ by making use of control block K and results in the suggested plaintext sequence XP supplied through output 1113 to the signature verifying device 702. The signature verifying device 702 generates the signature with the segment of the plaintext sequence withheld in the suggested plaintext sequence XP and verifies the correspondence between this computed signature and the decrypted signature withheld in the suggested plaintext sequence XP computed by the signature generating-assembly device 601 in FIG. 10.

If the signature correspondence is positive, the signature verifying device 702 supplies the segment of the plaintext withheld in the suggested plaintext sequence XP as plaintext sequence $\underline{X}$ through decrypted text sequence supplying channel 514 to target 105.

If the signature correspondence is negative, the signature verifying device 702 supplies the negative signature correspondence notification E to the corrector decrypting device of sequence 1101 through output 1114. This corrector decrypting device of sequence 1101 carries out, by making use of the same control block K, a new different decryption of the same randomised-encrypted text sequence $\underline{A}$, with the transformations in the transformer block WT as will be described below with the breakdown of the corrector decrypting device of sequence 1101, and generates a new suggested plaintext sequence XP that is supplied to the signature verifying device 702. This process is repeated until the signature correspondence notification E is positive.

Figure 12:
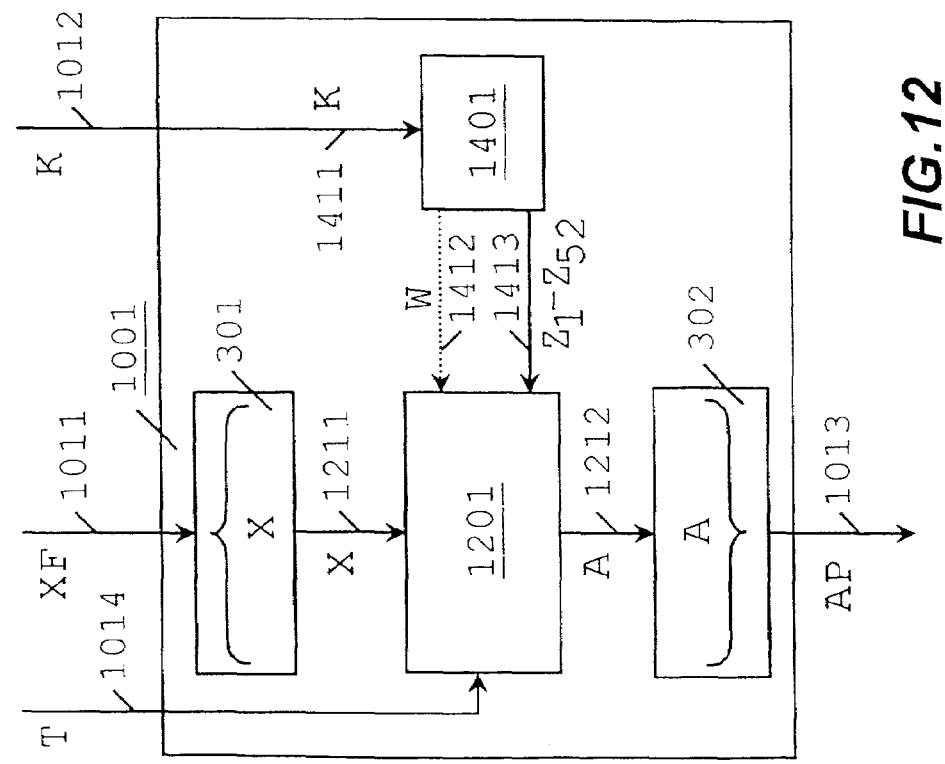
FIG. 12 shows block connection diagram of the sequence corrector randomising-encrypting device belonging to the self-corrector randomising-encrypting device in FIG. 10.

FIG. 12 shows possible diagram of the corrector randomising-encrypting device of sequence in FIG. 10. In FIG. 12, common parts corresponding to parts in FIG. 3, FIG. 10, FIG. 14, FIG. 16, FIG. 18 and FIG. 20 make use of the same references.

The corrector randomising-encrypting device of sequence 1001 receives through input 1011 the signed plaintext sequence XF, control block K through input 1012 and the randomness verifying result T through input 1014 and results in the suggested randomised-encrypted text sequence AP through output 1013.

In one of the possible implementations, the corrector randomising-encrypting device of sequence 1001 receives through input 1012 control block K that arrives to the randomisation-encryption control subblock generator 1401 through input 1411, which is an extension of input 1012. The randomisation-encryption control subblock generator 1401 generates from control block K the initiatory control subblock of length G W and the fifty-two encryption control subblocks $Z_1$ to $Z_{52}$, which are supplied to the corrector randomising-encrypting device of length N 1201 through outputs 1412 and 1413 respectively.

The corrector randomising-encrypting device of sequence 1001 receives through input 1011 the signed plaintext sequence XF and reaches the assembly input unit of block of length N 301, which assembles the signed plaintext sequence XF into the sequence of plaintext blocks of length N X. This sequence of plaintext blocks of length N X is supplied block by block to the corrector randomising-encrypting device of block of length N 1201 through input 1211, where they are grouped with the initiatory control subblock of length G W and the fifty-two encryption control subblocks $Z_1$ to $Z_{52}$, and result in a sequence of randomised-encrypted text blocks of length N A that through output 1212 reach the output unit of block of length N 302. This output unit of block of length N 302 with the sequence of randomised-encrypted text blocks of length N A makes tip the suggested randomised-encrypted text sequence AP that is supplied through output 1013. Although this output unit of block of length N 302 can be removed as well as in the elements of FIG. 13 and FIG. 30 and the blocks of length N can directly be supplied, it is included in order to make the understanding of the operations in the devices easier.

The suggested randomised-encrypted text sequence AP is subjected in the randomness verifying device 603 in FIG. 10 to the randomness tests that implements. If the randomness verification result T is negative, after its reception through input 1014, the corrector randomising-encrypting device of block of length N 1201 carries out by making use of the same control block K a new different randomisation-encryption of the sequence of plaintext blocks of length N X, as it will be reported in the description of the corrector randomising-encrypting device of block of length N 1201 below, and results in a new suggested randomised-encrypted text sequence AP through output 1013. This process is repeated until the randomness verification result T applied to the suggested randomised-encrypted text sequence AP, which has been supplied through input 1014, is positive.

The input/output 1412 is represented by a pointed line if it is used the randomisation-encryption of control subblock generator variation 1401ν in FIG. 16 together with the implementations of the corrector randomising-encrypting device of block of length N 1201 subsequently reported among other many different possibilities.

Figure 13:
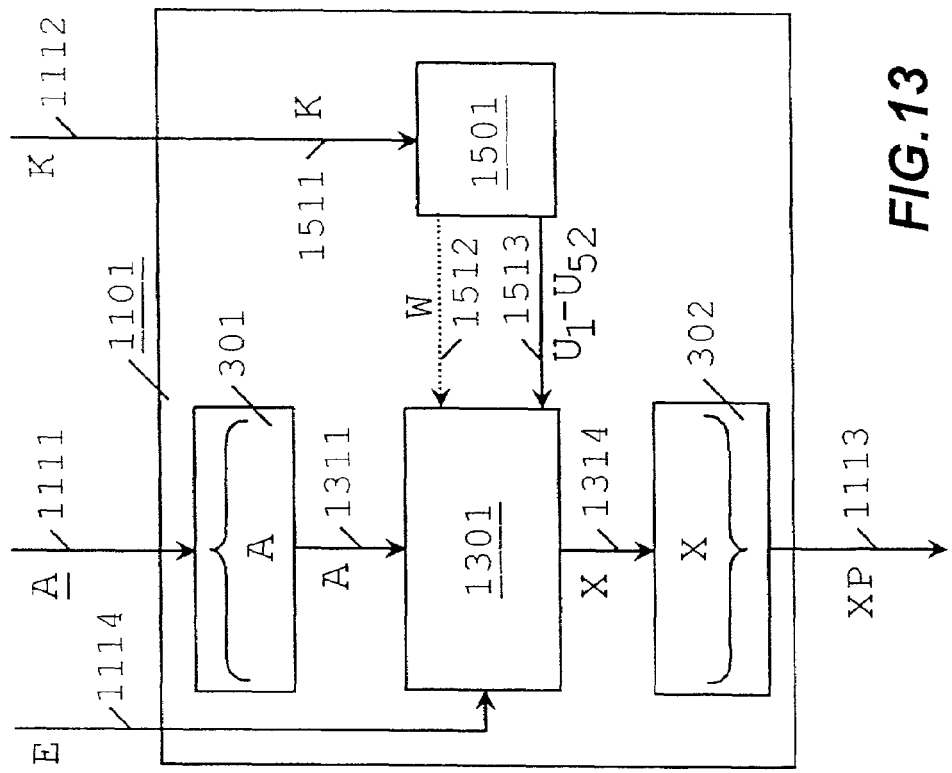
FIG. 13 shows block connection diagram of the sequence corrector decrypting device belonging to the self-corrector decrypting device in FIG. 11, for the decryption of randomised-encrypted text sequence, which has been generated with the sequence corrector randomising-encrypting device in FIG. 12.

FIG. 13 shows diagram of the corrector decrypting device of sequence that belongs to the device in FIG. 11 for the decryption of randomised-encrypted text sequences by making use of the device in FIG. 12. In FIG. 13, common parts corresponding to parts of FIG. 3, FIG. 11, FIG. 15, FIG. 17, FIG. 19 and FIG. 21 make use of the same references.

FIG. 13 shows possible implementation of the corrector decrypting device of sequence 1101 that receives through input 1111 the randomised-encrypted text sequence $\underline{A}$, through input 1112 control block K and through input 1114 the signature correspondence notification E after trying to decipher said randomised-encrypted text sequence $\underline{A}$, and results in the suggested plaintext sequence XP through output 1113.

The corrector decrypting device of sequence 1101 receives through input 1112 control block K and reaches the decryption control subblock generator 1501 through input 1511, which is an extension of input 1112. The decryption control subblock generator 1501 generates from control block K the initiatory control subblock of length G W and the fifty-two decryption control subblocks $U_1$ to $U_{52}$, which are supplied to the corrector decrypting device of block of length N 1301 through outputs 1512 and 1513 respectively.

The corrector decrypting device of sequence 1101 receives through input 1111 the randomised-encrypted text sequence $\underline{A}$ and reaches the assembly input unit of blocks of length N 301, which assembles the randomised-encrypted text sequence $\underline{A}$ into the sequence of randomised-encrypted text blocks of length N A that is supplied block by block to the corrector decrypting device of block of length N 1301 through input 1311, where they are grouped with the initiatory control subblock of length G W and the fifty-two decryption control subblocks $U_1$ a $U_{52}$, supplying through output 1314 the sequence of plaintext blocks of length N to the output unit of blocks of length N 302. The output unit of blocks of length N 302, with the plaintext blocks of length N X, assembles the suggested plaintext sequence XP supplied through output 1113.

The suggested plaintext sequence XP is supplied through output 1113 to the signature verifying device 702 in FIG. 11. If the signature correspondence notification E is negative, the corrector decrypting device of block of length N 1301, after receiving it through input 1114 and by making use of the same control block K, carries out a new different decryption of the sequence of randomised-encrypted text blocks of length N A, as it will be reported in the description of the corrector decrypting device of block of length N 1301, and results in a new suggested plaintext sequence XP through output 1113. This process is repeated until the signature verifying device 702 in FIG. 11 generates a signature correspondence notification E positive according to the suggested plaintext sequence XP supplied through output 1113.

The input/output 1512 is represented by a pointed line if it is used the decryption control subblock generator variation 1501ν in FIG. 17 together with the implementations of the corrector decrypting device of block of length N 1301, which are reported below, and preferably if randomisation-encryption implementations such as the randomisation-encryption control subblock generator variation 1401ν had been used.

Figure 30:
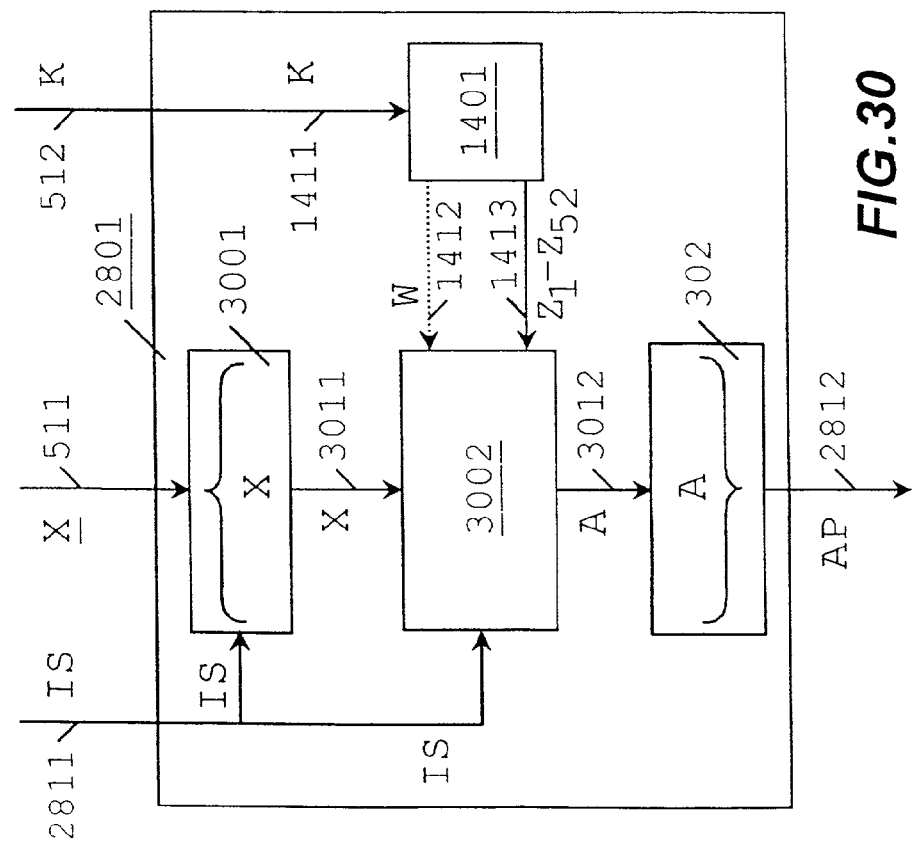
FIG. 30 shows block connection diagram of the by-index corrector randomising-encrypting device of sequence belonging to the self-corrector randomising-encrypting device in FIG. 28.

FIG. 14 shows possible diagram of the randomisation-encryption control subblock generator used in the devices of FIG. 12 and FIG. 30. In FIG. 14, common parts corresponding to parts of FIG. 3, FIG. 12, FIG. 18, FIG. 20, FIG. 30, FIG. 32 and FIG. 34 make use of the same references.

FIG. 14 shows possible implementation of the randomisation-encryption control subblock generator 1401, which receives through input 1411 control block K and results in initiatory control subblock of length G W through output 1412 and the fifty-two encryption control subblocks $Z_1$ to $Z_{52}$ through output 1413.

Control block K is supplied through input 1411 to the control block divider 1402 that divides control block K into control block Z and initiatory control subblock of length G W. Control block Z is supplied from said control block divider 1402 through output 1414 to the encryption control subblock generator 202 that generates from control block Z the fifty-two encryption control subblocks $Z_1$ to $Z_{52}$ that are supplied through output 1413. The initiatory control subblock of length G W is directly supplied from said control block divider 1402 through output 1412.

Figure 31:
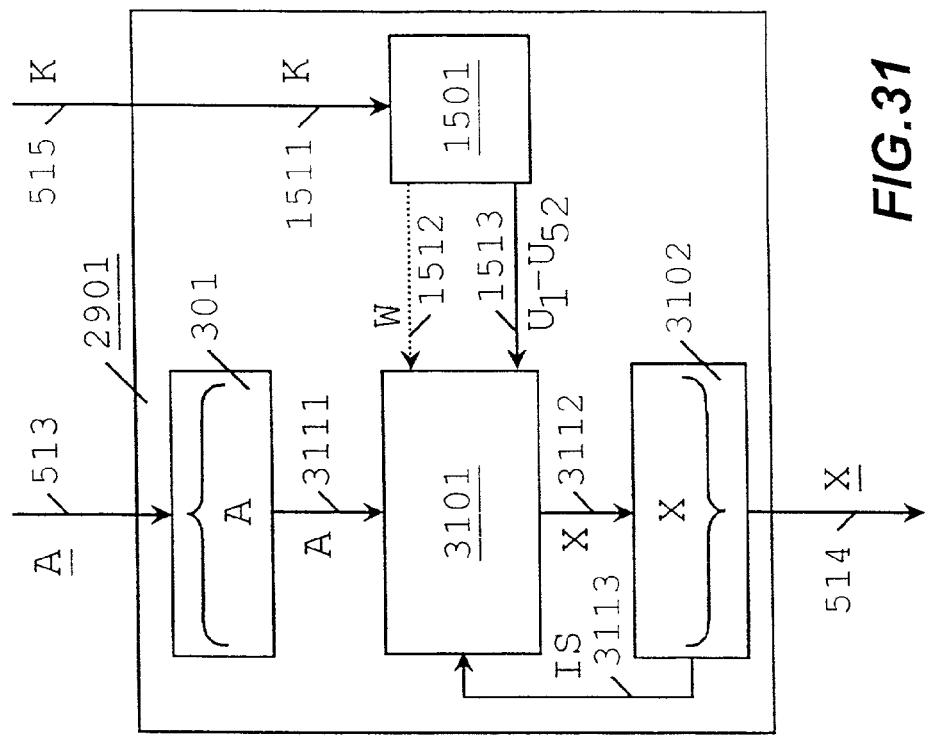
FIG. 31 shows block connection diagram of the by-index corrector decrypting device of sequence belonging to the self-corrector decrypting device in FIG. 29 for the decryption of the randomised-encrypted text sequence, which has been generated with the by-index corrector randomising-encrypting device of sequence in FIG. 30.

FIG. 15 shows possible diagram of decryption control subblock generator used in the devices of FIG. 13 and FIG. 31. In FIG. 15, common parts corresponding to parts of FIG. 4, FIG. 13, FIG. 19, FIG. 21, FIG. 31, FIG. 33 and FIG. 35 make use of the same references.

FIG. 15 shows possible implementation of the decryption control subblock generator 1501 that receives through input 1511 control block K and results in the initiatory control subblock of length G W through output 1512 and the fifty-two decryption control subblocks $U_1$ to $U_{52}$ through output 1513.

Control block K reaches, through input 1511, the control block divider 1402 that divides control block K into control block Z and the initiatory control subblock of length G W, preferably in the same way as the control block divider 1402 in FIG. 14 used in the corresponding self-corrector randomising-encrypting device. Control block Z is supplied from the control block divider 1402 through output 1514 to the decryption control subblock generator 402 that generates from the control block Z the fifty-two decryption control subblocks $U_1$ to $U_{52}$, which are supplied through output 1513. The initiatory control subblock of length G W is directly supplied from the control block divider 1402 through output 1512.

FIG. 16 shows possible diagram of variation of the randomisation-encryption control subblock generator of FIG. 14. In FIG. 16, common parts corresponding to parts of FIG. 3, FIG. 12, FIG. 18, FIG. 20, FIG. 30, FIG. 32 and FIG. 34 make use of the same references.

FIG. 16 shows randomisation-encryption control subblock generator variation 1401ν, which consists of the encryption control subblock generator 202. Control block K received through input 1411 is the control block Z that is supplied to the encryption control subblock generator 202, which generates the fifty-two encryption control subblocks $Z_1$ to $Z_{52}$ supplied through output 1413.

The purpose of the randomisation-encryption control subblock generator variation 1401ν is reported within the possible implementations of the elements in FIG. 18, FIG. 20, FIG. 32 and FIG. 34; the use of the randomisation-encryption control subblock generator 1401 or its variation is shown in the drawings of these figures through the input/output, represented as a dashed arrow, of initiatory control subblock of length G W; this dashed arrow represents the operative use according to specific implementations and makes the understanding of possible ways of carrying it out easier.

FIG. 17 shows possible diagram of variation of decryption control subblock generator of FIG. 15 when in randomisation-encryption it has preferably been used the element in FIG. 16. In FIG. 17, common parts corresponding to parts of FIG. 4, FIG. 13, FIG. 19, FIG. 21, FIG. 31, FIG. 33 and FIG. 35 make use of the same references.

FIG. 17 shows the decryption control subblock generator variation 1501v that consists of the decryption control subblock generator 402. Control block K received through input 1511 is the control block Z that is supplied to the decryption control subblock generator 402, which generates the fifty-two decryption control subblocks $U_1$ to $U_{52}$ supplied through output 1513.

The purpose of the decryption control subblock generator variation 1501v is reported within the possible implementations of the elements in FIG. 19, FIG. 21, FIG. 33 and FIG. 35; the use of the decryption control subblock generator 1501 or its variation is shown in the drawings of these figures through the input/output, represented as a dashed arrow, of initiatory control subblock of length G W; this dashed arrow represents the operative use according to specific implementations and makes the understanding of possible ways of carrying it out easier.

Figure 18:
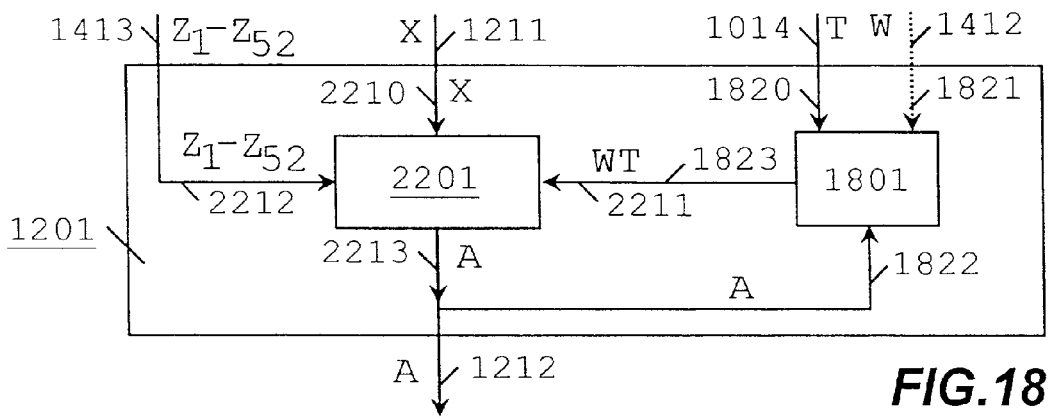
FIG. 18 shows block connection diagram of corrector randomising-encrypting device of block of length N belonging to the sequence corrector randomising-encrypting device in FIG. 12.

FIG. 18 shows possible diagram of the corrector randomising-encrypting device of block of length N that belongs to the device in FIG. 12. In FIG. 18, common parts corresponding to parts of FIG. 12 and FIG. 22 make use of the same references.

Figure 20:
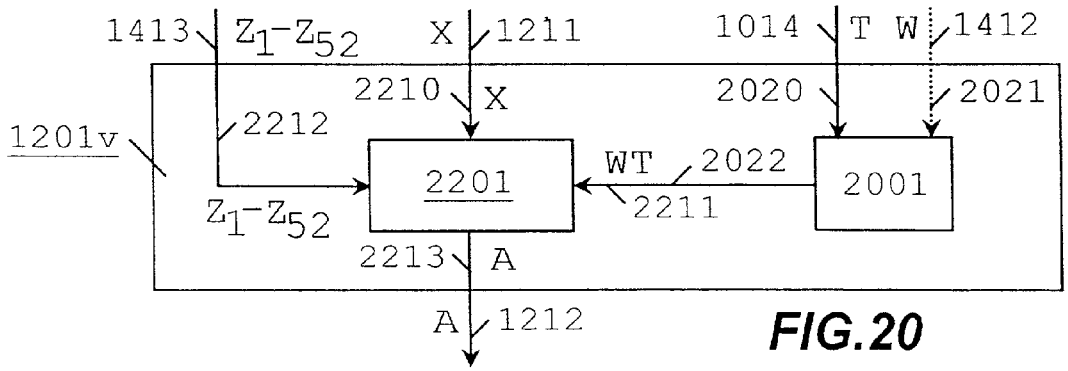
FIG. 20 shows block connection diagram of variation of corrector randomising-encrypting device of block of length N in FIG. 18.

FIG. 18 shows possible implementation of the corrector randomising-encrypting device of block of length N 1201 that, as well as its variation 1201v of FIG. 20, receives through input 1211 the plaintext block of length N X, through input 1413 the fifty-two encryption control subblocks $Z_1$ to $Z_{52}$, through input 1412 initiatory control subblock of length G W and through input 1014 the randomness verification result T, and results in a randomised-encrypted text block of length N A Tough output 1212.

The by-trial corrector refed generator of transformer block 1801 receives through input 1820, which is connected to input 1014, the randomness verification result T; through input 1821, which is connected to input 1412, the initiatory control subblock of length G W; and through input 1822, which is a derivation of output 2213, the corresponding randomised-encrypted text block of length N A, and results in the corresponding transformer block WT through output 1823.

The by-trial corrector refed generator of transformer block 1801 implements the function $F^8$, such that it generates the corresponding transformer block WT from the initiatory control subblock of length G W received through input 1821, the randomness verification result T received through input 1820 and the corresponding randomised-encrypted text block of length N A, which is the result from the randomisation-encryption of the previous plaintext block of length N X, received through input 1822. The purpose of the refed transformer block generator 1801, as well as of the different transformer block generators 2001, 3201 and 3401 in FIG. 20, FIG. 32 and FIG. 34 respectively, is to supply the corresponding transformer block WT that is given as input of the encrypting-grouping device 2201 through input 2211.

The transformer block WT takes the following values shown in TABLE 1 for the different consecutive plaintext blocks of length N X supplied to the corrector randomising-encrypting device of block of length N 1201; the randomised-encrypted text block of length N $A_1$ is the result of the randomisation-encryption of the first plaintext block of length N $X_1$, the randomised-encrypted text block $A_2$ is the result of the randomisation encryption of the second plaintext block of length N $X_2$ and so on. This arrangement of blocks of length N in sequence is also used in the description of the elements in FIG. 20, FIG. 32 and FIG. 34.

TABLE 1

| VALUES TAKEN BY WT | | |
|---|---|---|
| Order of the plaintext block that is randomised-encrypted | Plaintext block that is randomised-encrypted | Value of WT |
| First | $X_1$ | $F^8_1(W)$ |
| Second | $X_2$ | $F^8_2(A_1)$ |
| ... | ... | ... |
| N | $X_n$ | $F^8_n(A_{n-1})$ |

Function $F^8$ implemented in the by-trial corrector refed generator of transformer block 1801 can include a counter for instance, which we designate CR, of the attempts of randomisation-encryption of the signed plaintext sequence XF, so that from an initial value=0 for instance, it is being increased with each negative randomness verification result T that receives and can be defined in multiple ways without limiting them as:

$WT_1 = F^8(W) = F^9_1(CR, W, 0)$, for the first block WT $WT_n = F^8(A_{n-1}) = F^9_n(CR, W, A_{n-1})$, for the "nth" block WT that is generated for the randomisation-encryption of the "nth" plaintext block of length N X Where:

$WT_1 = F^9_1(CR, W, 0)$ can be:

$WT_1 = W$, the identity, or $WT_1 = W$ oper_01 CR, where oper_01 can be the operation XOR, or $WT_1 = (W$ oper$+/-$CR$)$ mod $2^N$, and $WT_n = F^9_n(CR, W, A_{n-1})$ can be:

$F^9_n(CR, W, A_{n-1}) = (A_{n-1}$ oper$+/-$CR$)$ mod $2^N$.

$F^9_n(CR, W, A_{n-1}) = F^{10}_n(CR, W)$ oper_02 $A_{n-1}$.

Where oper_02 can be the operation XOR o exclusive-OR.

And $F^{10}_n(CR, W)$ can be chosen to implement:

$F^{10}_n(CR, W) = (F^{10}_{n-1}(CR, W)$ oper$+/-$CR$)$ mod $2^N$.

General implementation, being block W divided into different subblocks W1, ..., WS, such that Wi made up by Qi bits, being Qi less or equal to 64 for i=1, ..., S, $F^{10}_n(CR, W)$=union of $F^{11}_n(CR, Wi)$=union of $((F^{11}_{n-1}(CR, Wi)$ oper$+/-$CR$)$ mod $2^{Qi})$ for i=1, ..., S.

In these specific implementations, which has been previously reported, the initiatory control subblock G W is preferably of length G=64 bits.

$F^{10}_n(CR, W)$ be the adaptation of the at random number generator such as the one originally appeared in "Toward a Universal Random Number Generator", authored by George Marsaglia and Arif Zaman, Florida State University of U.S.A., Report: FSU-SCRI-87-50 (1987), called hereinafter as PRNG by Marsaglia, which from the block that is supplied to it as the people with some knowledge in the art know as "seed", in this particular case of 32 bits, can generate 64 bit blocks of at random data to be used as the result of function $F^{10}_n$; this use can be made with the adequate specifications reported below, in the transformer block generators of FIG. 20, FIG. 32 and FIG. 34. In this particular case of the at random number generator, the "seed" can be the result from (W oper$+/-$CR) mod $2^{32}$, for instance; being the initiatory control subblock of length G W preferably of length G=32 bits.

$F^{10}_n$ (CR, W) make use of hash function, which from the block BLQ=(W oper+/−CR) mod $2^G$, which is supplied to it as initial data, can be used in order to generate 64 bit blocks so that $F^{10}_n$ (CR, W)=64 bits selected from $HASH_n$ (BLQ) and $HASH_n$ (BLQ)= HASH ($HASH_{n-1}$ (BLQ)), for instance. Because of the characteristics of hash functions, the initiatory control subblock of length G W can be of any length G.

Other possible implementation of $F^{10}_n$ (CR, W).
$F^9_n$ (CR, W, $A_{n-1}$)=W oper__03 $F^{12}_n$ (CR, $A_{n-1}$):
Where oper__03 can be the operation XOR or Exclusive-OR.
And $F^{12}_n$ (CR, $A_{n-1}$) can be:
$F^{12}_n$ (CR, $A_{n-1}$)=($A_{n-1}$ oper+/−CR) mod $2^N$.

General implementation for instance, being divided block A into different subblocks A1, . . . , AS, such that Ai consisting of Qi bits, being Qi less or equal to 64 for i=1, . . . , S, $F^{12}_n$ (CR, $A_{n-1}$)=union of $F^{13}_n$ (CR, $A_{n-1}$) union of (($Ai_{n-1}$ oper+/−CR) mod $2^{Qi}$) for i=1, . . . , S.

Make use of hash function, such that $F^{12}_n$ (CR, $A_{n-1}$)=64 bits selected from HASH ($A_{n-1}$ oper__04 CR), with oper__04 being the operation XOR for instance.

In this previously shown specific implementation the initiatory control subblock of length G W is preferably of length G=64 bits.

Other possible implementation of $F^{12}_n$ (CR, $A_{n-1}$).
Other possible implementation of $WT_n=F^8$ ($A_{n-1}$)= $F^9_n$ (CR, W, $A_{n-1}$).

There can be other implementations in which the by-trial corrector refed generator of transformer block 1801 do not use an attempt counter, but implement a different function in each attempt of randomisation-encryption of the signed plaintext sequence XF.

In the encrypting-grouping device 2201 the corresponding plaintext block of length N X that arrives through input 2210, which is an extension of input 1211, the corresponding transformer block WT that arrives through input 2211, which is an extension of output 1823, together with the fifty-two encryption control subblocks $Z_1$ to $Z_{52}$ received through input 2212, which is an extension of input 1413, are grouped and generate the corresponding randomised-encrypted text block of length N A of length N=64 bits through output 2213. This output 2213 is connected to output 1212 and through input 1822 to the by-trial corrector refed generator of transformer block 1801. Randomised-encrypted text block of length N A reaches through output 2213 the output 1212 and it is also supplied through input 1822 to the by-trial corrector refed generator of transformer block 1801 in order to be used in the generation of the corresponding transformer block WT to be used in the randomisation-encryption of the following plaintext block of length N X that is received through input 1211.

Input 1412 is represented by a pointed line because it can be implemented so that the initiatory control subblock of length G W is predetermined in the randomisation-encryption as well as in the decryption in the by-trial corrector refed generator of transformer block 1801 for every randomisation-encryption of the signed plaintext sequence XF, with which control block K can be made up by control block Z by making use of the randomisation-encryption control subblock generator variation 1401v1 in FIG. 16; in order to decipher the randomisation-encryption text sequence with this implementation the respective corrector decrypting device of sequence 1101 in FIG. 13 will make use of the related decryption control subblock generator variation 1501v in FIG. 17. In the following elements of FIG. 19, FIG. 20, FIG. 21, FIG. 30, FIG. 31, FIG. 32, FIG. 33, FIG. 34 and FIG. 35 in which the supplying input of the initiatory control subblock of length G W is represented by a pointed line it must be understood in the same way and with the same implications about the related elements.

Figure 19:
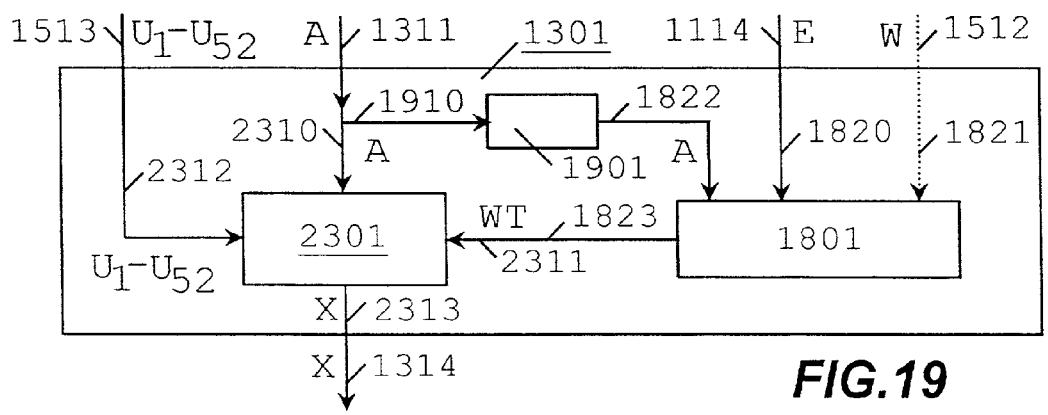
FIG. 19 shows block connection diagram of corrector decrypting device of block of length N belonging to the sequence corrector decrypting device in FIG. 13 for the decryption of the randomised-encrypted text blocks, which have been generated with the corrector randomising-encrypting device of block of length N in FIG. 18.

FIG. 19 shows possible diagram of the corrector decrypting device of block of length N in FIG. 13 for the decryption of randomised-encrypted text blocks by making use of the device in FIG. 18. In FIG. 19, common parts corresponding to parts in FIG. 13, FIG. 18 and FIG. 23 make use of the same references.

Figure 21:
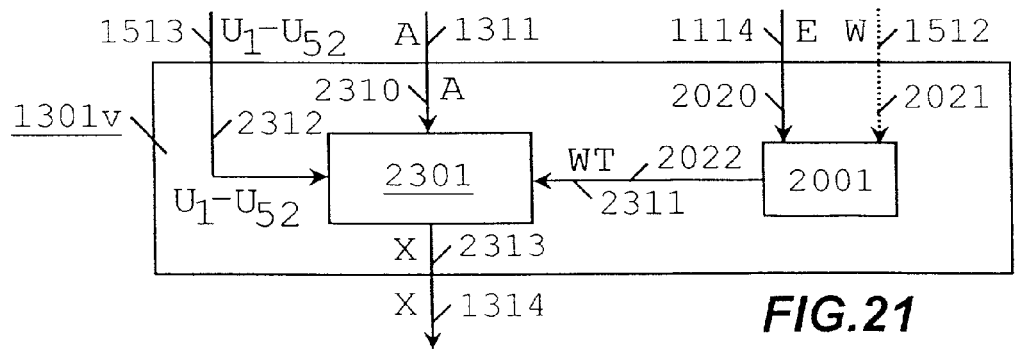
FIG. 21 shows block connection diagram of variation of corrector decrypting device of block of length N in FIG. 19 for the decryption of randomised-encrypted text blocks, which have been generated with the corrector randomising-encrypting device variation of block of length N in FIG. 20.

FIG. 19 shows possible implementation of the corrector decrypting device of block of length N 1301 that, as well as its variation 1301v of FIG. 21, receives through input 1311 the randomised-encrypted text block of length N A, through input 1513 the fifty-two decryption control subblocks $U_1$ to $U_{52}$, through input 1114 the signature correspondence notification E and through input 1512 the initiatory control subblock of length G W and results in plaintext block of length N X through output 1314.

The by-trial corrector refed generator of transformer block 1801 receives through input 1820, which is connected to input 1114, the signature correspondence notification E, through input 1821, which is connected to input 1512, the initiatory control subblock of length G W, and through input 1822, output of withholding unit of block of length N 1901, the corresponding randomised-encrypted text block of length N A, resulting in the corresponding transform lock through output 1823.

The by-trial corrector refed generator of transformer block 1801 shows the same specific implementation as the by-trial corrector refed generator of transformer block 1801 of the device in FIG. 18, with which the randomised-encrypted text sequence A object of the decryption was randomised-encrypted; operating in the same way according to the respective negative signature notifications E as it operated in the device in FIG. 18 according to the negative randomness verification results T. The purpose of the refed generator of transformer block 1801, as well as the different generators of transformer block 2001, 3201 and 3401 in FIG. 21, FIG. 33 and FIG. 35 respectively, is to be supplying the transformer block WT that is given as input of the decrypting-grouping device 2301 though input 2311. TABLE 2 shows the different values taken by the transformer block WT for the different consecutive randomised-encrypted text block of length N A assembled from the randomised-encrypted text sequence A. This arrangement of blocks of length N in sequence is also used in the description of the elements in FIG. 21, FIG. 33 and FIG. 35.

TABLE 2

| | VALUES TAKEN BY WT | |
|---|---|---|
| Order of the randomised-encrypted text block that is decrypted | Randomised-encrypted text block that is decrypted | Value of WT |
| First | $A_1$ | $F^8_1(W)$ |
| Second | $A_2$ | $F^8_2(A_1)$ |
| . . . | . . . | . . . |
| N | $A_n$ | $F^8_n(A_{n-1})$ |

The corresponding randomised-encrypted text block of length N A arrives through input 1311 and is supplied to the decrypting-grouping device 2301 through input 2310 and to the withholding unit of block of length N 1901 through input 1910, which can be a derivation of input 2310. The withholding unit of block of length N 1901 shows input 1910 and output 1822. The purpose of the withholding unit of block of length N 1901, as well as in FIG. 33 according to the respective generator of transformer block WT, is to keep a copy of the actual randomised-encrypted block text of length N A that is supplied as input of the decrypting-grouping device 2301 to be used by the corresponding corrector refed generator of transformer block in the decryption of the following plaintext block of length N X as it is shown in TABLE 2 according to the by-trial corrector refed generator of transformer block 1801.

The corresponding randomised-encrypted text block of length N A reaches the decrypting-grouping device 2301 through input 2310, in which it is grouped with the fifty-two decryption control subblocks $U_1$ to $U_{52}$ that arrive through input 2312, an extension of input 1513, and the corresponding transformer block WT that arrives through input 2311, which is an extension of output 1823, and generates the corresponding plaintext block of length N X of length N=64 bits through output 2313, which extends in output 1314.

Once having obtained the plaintext block of length N X, the actual randomised-encrypted text block of length N A, which is withheld in the withholding unit of block of length N 1901, is supplied through input 1822 to the by-trial corrector refed generator of transformer block 1801, so that in the decryption of the following randomised-encrypted text block of length N A that is received through input 1311, the by-trial corrector refed generator of transformer block 1801 generates the corresponding transformer block WT. It is also possible to remove the withholding unit of block of length N 1901 if the by-trial corrector refed generator of transformer block 1801 is implemented so that it can receive the actual randomised-encrypted text block of length N A and use it to generate the transformer block WT, which will be used in the decryption of the following randomised-encrypted text block of length N A. This will also lead to remove input/output 1910 and input 1822 be the connection from input 2310. Said way of operating and use of the withholding unit of block of length N 1901 is repeated in the element in FIG. 33; the withholding unit of block of length N 1901 is kept in FIG. 19 and FIG. 33 because it is considered that it clarifies the way of operating.

FIG. 20 shows possible diagram of variation of corrector randomising-encrypting device of block of length N in FIG. 18. In FIG. 20, common parts corresponding to parts of FIG. 12 and FIG. 22 make use of the same references.

The difference between the corrector randomising-encrypting device of block of length N 1201 and its variation is the replacement of the by-trial corrector refed generator of transformer block 1801 by the by-trial corrector autonomous generator of transformer block 2001.

The by-trial corrector autonomous generator of transformer block 2001 receives through input 2020, which is connected to input 1014, the randomness verification result T and through input 2021, which is connected to input 1412, the initiatory control subblock of length G W and results in the corresponding transformer block WT through output 2022.

The by-trial corrector autonomous generator of transformer block 2001 implements function $F^{14}$, so that it generates the corresponding transformer block WT from the initiatory control subblock of length G W, received through input 2021, and the randomness verification result T, received through input 2020. The transformer block WT takes the following values shown in TABLE 3 for the different consecutive plaintext block of length N X.

TABLE 3

VALUES TAKEN BY WT

| Order of the plaintext block that is randomised-encryted | Plaintext block that is randomised-encrypted | Value of WT |
| --- | --- | --- |
| First | $X_1$ | $F^{14}_1(W)$ |
| Second | $X_2$ | $F^{14}_2(W)$ |
| ... | ... | ... |
| N | $X_n$ | $F^{14}_n(W)$ |

Function $F^{14}$ implemented in the by-trial corrector autonomous generator of transformer block 2001 can be defined in multiple ways and, for instance, can include a counter of attempts of randomisation-encryption of the signed plaintext sequence XF that we designate CR, so that its initial value, equal to 0 for instance, is increased with every negative randomness verification result T that receives and can be defined in multiple ways without limiting them as:

$WT_1 = F^{14}_1(W) = F^{15}_1(CR, W)$, for the first block WT
$WT_n = F^{14}_n(W) = F^{15}_n(CR, W)$, for the "nth" block WT that is generated for the randomisation-encryption of the "nth" plaintext block of length N X.

Where:
$WT_1 = F^{15}_1(CR, W)$ can be:
$WT_1 = W$, the identity, or
$WT_1 = W$ oper_05 CR, where oper_05 can be the operation XOR, or
$WT_1 = (W \text{ oper}+/-CR) \mod 2^N$, and
$WT_n = F^{15}_n(CR, W)$ can be:
$F^{15}_n(CR, W) = (F^{15}_{n-1}(CR, W) \text{ oper}+/-CR) \mod 2^N$.

General implementation, being block W divided into different subblocks W1, ..., WS, such that Wi made up by Qi bits, being Qi less or equal to 64 for i=1, ..., S, $F^{15}_n(CR, W)$=union of $F^{16}_n(CR, Wi)$=union of $((F^{16}_{n-1}(CR, Wi) \text{ oper}+/-CR) \mod 2^{Qi})$ for i=1, ..., S.

In these previously shown specific implementations the initiatory control subblock of length G W is preferably of length G=64 bits.

$F^{15}_n(CR, W)$ be the adaptation of the at random number generator, as the PRNG by Marsaglia for instance, being the seed the result from (W oper+/-CR) mod $2^{32}$, for instance; so that the initiatory control subblock of length G W is preferably of length G-32 bits.

$F^{15}_n(CR, W)$ make use of function hash, which from block BLQ=(W oper_06 CR) mod $2^G$, being oper_06 the operation oper+/-o XOR for instance, which is supplied as initial data, can be used to generate 64 bit blocks so that $F^{15}_n(CR, W)$=64 bits selected from $HASH_n(BLQ)$ and $HASH_n(BLQ)$=HASH ($HASH_{n-1}(BLQ)$), for instance. Because of the characteristics of hash functions, the initiatory control subblock of length G W can be of any length G.

Other possible implementations.

There can be other implementations in which the by-trial corrector autonomous generator of transformer block 2001 do not use a counter of attempts, but that in each attempt of randomisation-encryption of the signed plaintext sequence XF the function that implements is different to the ones previously applied.

In the encrypting-grouping device 2201 the corresponding plaintext block of length N X that arrives through input 2210, an extension of input 1211, the corresponding transformer block WT that arrives through input 2211, an extension of output 2022, and the fifty-two encryption control subblocks $Z_1$ to $Z_{52}$ that arrive through input 2212, an extension of input 1413 are grouped and generate the corresponding randomised-encrypted text block of length N A of length N=64 bits through output 2213, which extends in output 1212.

FIG. 21 shows possible diagram of variation of corrector decrypting device of block of length N in FIG. 19 for the decryption of randomised-encrypted text blocks by making use of the device in FIG. 20. In FIG. 21, common parts corresponding to parts in FIG. 13, FIG. 20 and FIG. 23 make use of the same references.

The difference between the corrector decrypting device of block of length N 1301 and its variation is the replacement of the by-trial corrector refed generator of transformer block 1801 by the by-trial corrector autonomous generator of transformer block 2001.

The by-trial corrector autonomous generator of transformer block 2001 receives through input 2020, which is connected to input 1114, the signature correspondence notification E and through input 2021, which is connected to input 1512, the initiatory control subblock of length G W, and generates the corresponding transformer block WT through output 2022. The by-trial corrector autonomous generator of transformer block 2001 shows the same specific implementation, it implements the same function $F^{14}$, that the by-trial corrector autonomous generator of transformer block 2001 of the device in FIG. 20, with which the randomised-encrypted text sequence $\underline{A}$ object of the decryption was randomised-encrypted; and operates in the same way according to the negative signature correspondence notifications E, as it operated in the device of FIG. 20 according to the negative randomness verification results T.

TABLE 4 shows the different values taken by transformer block WT for the different consecutive randomised-encrypted text block of length N A that are assembled from the randomised-encrypted text sequence $\underline{A}$ that is decrypted.

TABLE 4

VALUES TAKEN BY WT

| Order of randomised-encrypted text block that is decrypted | Randomised-encrypted text block that is decrypted | Value of WT |
|---|---|---|
| First | $A_1$ | $F^{14}_1(W)$ |
| Second | $A_2$ | $F^{14}_2(W)$ |
| ... | ... | ... |
| N | $A_n$ | $F^{14}_n(W)$ |

The corresponding randomised-encrypted text block of length N A reaches the decrypting-grouping device 2301 through input 2310, which is an extension of input 1311, in which it is grouped together with the fifty-two decryption control subblocks $U_1$ to $U_{52}$ that arrive through input 2312, which is an extension of input 1513, and the corresponding transformer block WT that arrives through input 2311, which is an extension of output 2022, and results in the corresponding plaintext block of length N X of length N=64 bits through output 2313, which extends to output 1314.

Figure 22:
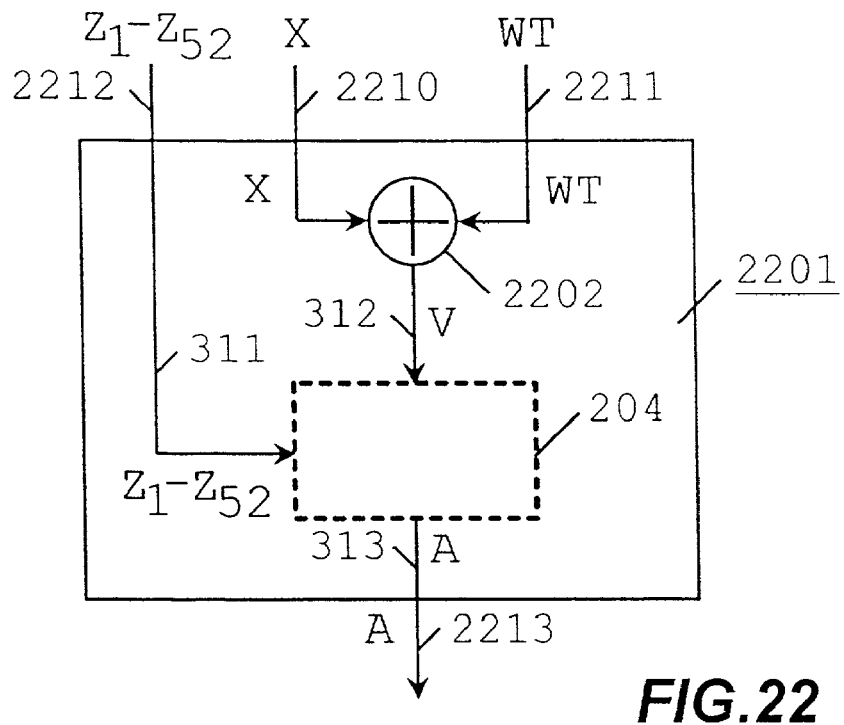
FIG. 22 shows block connection diagram of encrypting-grouping device belonging to the corrector randomising-encrypting device of block of length N in FIG. 18, also used in the elements of FIG. 20, FIG. 32 and FIG. 34.

FIG. 22 shows possible diagram of encrypting-grouping device used by the elements of FIG. 18, FIG. 20, FIG. 32 and FIG. 34. In FIG. 22, common parts corresponding to parts in FIG. 3, FIG. 18, FIG. 20, FIG. 32 and FIG. 34 make use of the same references.

FIG. 22 shows possible implementation of the encrypting-grouping device 2201 that receives through input 2210 the plaintext block of length N X, through input 2212 the fifty-two encryption control subblocks $Z_1$ to $Z_{52}$ and through input 2211 the transformer block WT, and results in the randomised-encrypted text block of length N A through output 2213.

The encrypting-grouping device 2201 receives the plaintext block of length N X and the transformer block WT through inputs 2210 and 2211 respectively and reaches the grouping device 2202. In the grouping device 2202 the plaintext block of length N X and the transformer block WT, both of length N=64 bits are grouped and generate the grouped interblock of length N V of length N=64 bits through output 312. The grouping operation that is carried out in the grouping device 2202 is the exclusive-OR or XOR bit by bit, so that $X \oplus WT \rightarrow V$.

The grouped interblock of length N V is supplied from the grouping device 2202 to the encrypting-decrypting device of block 204 through input 312, made up by 64 parallel lines, in which it is grouped together with the fifty-two encryption control subblocks $Z_1$ to $Z_{52}$ that arrive through input 311, which is an extension of input 2212, and results in the randomised-encrypted text block of length N A of length N=64 bits through output 313. Output 313, made up by 64 parallel lines, extends to output 2213.

Figure 23:
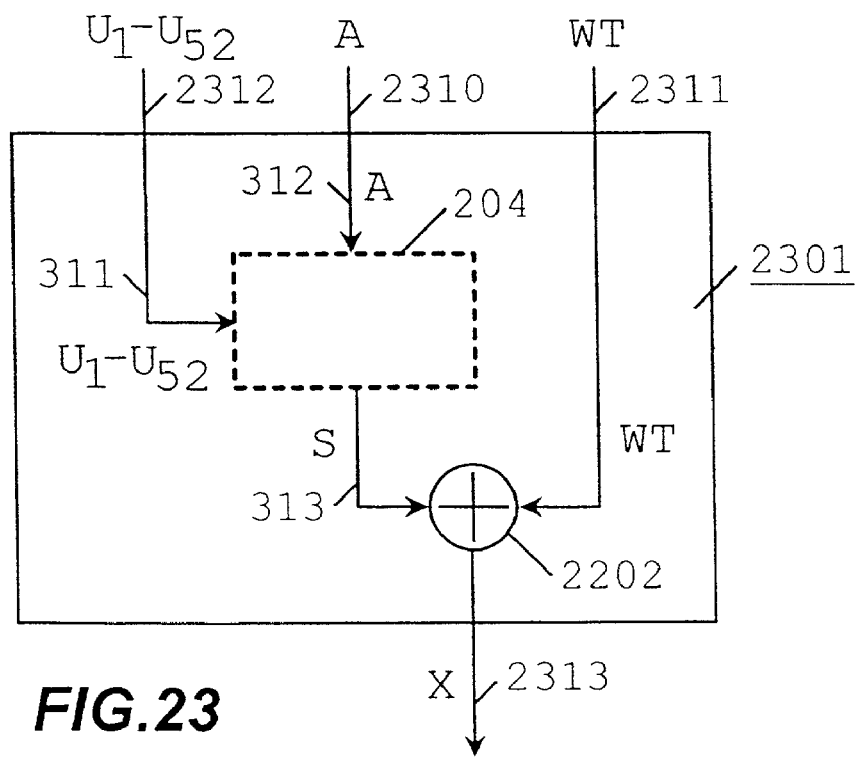
FIG. 23 shows block connection diagram of decrypting-grouping device belonging to the corrector decrypting device of block of length N in FIG. 19, also used in the elements of FIG. 21, FIG. 33 and FIG. 35.

FIG. 23 shows possible diagram of decrypting-grouping device used in the elements of FIG. 19, FIG. 21, FIG. 33 and FIG. 35. In FIG. 23, common parts corresponding to parts of FIG. 4, FIG. 19, FIG. 21, FIG. 33 and FIG. 35 make use of the same references.

FIG. 23 shows possible implementation of decrypting-grouping device 2301 that receives through input 2310 the randomised-encrypted text block of length N A, through input 2312 the fifty-two decryption control subblocks $U_1$ to $U_{52}$ and through input 2311 the transformer block WT, and results in the plaintext block of length N X through output 2313.

The randomised-encrypted text block of length N A arrives through input 312, which is made up by 64 parallel lines and is an extension of input 2310, to the encrypting-decrypting device of block 204, in which it is grouped together with the fifty-two decryption control subblocks $U_1$ to $U_{52}$ that arrive through input 311, which is an extension of input 2312, and results in the decrypted interblock of length N S of length N=64 bits that is supplied through output 313, whis is made up by 64 parallel lines, to the grouping device 2202.

In the grouping device 2202 the decrypted interblock of length N S and the transformer block WT, both of length N=64 bits, which arrive through inputs 313 and 2311 respectively, are grouped and result in the plaintext block of length N X of length N=64 bits through output 2313. The grouping operation that is carried out in the grouping device 2202 is the one known as exclusive-OR or XOR bit by bit so that $S \oplus WT \rightarrow X$.

Figure 24:
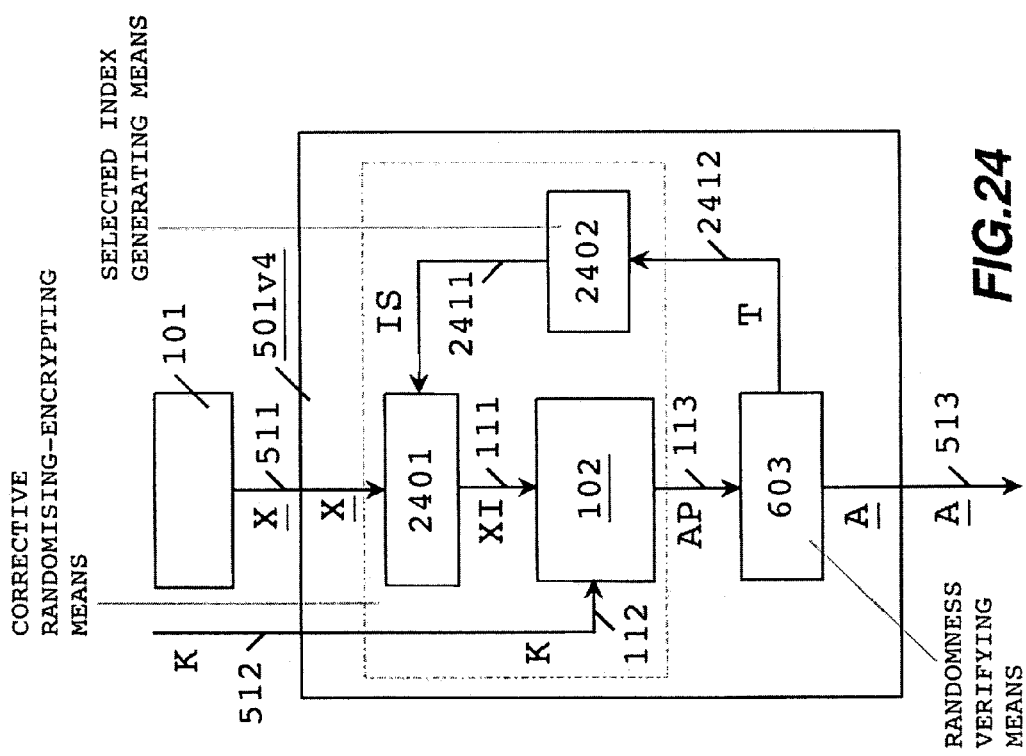
FIG. 24 shows block connection diagram of the first variation of the second type of implementation of the self-corrector randomising-encrypting device in FIG. 5.

FIG. 24 shows possible diagram of variation of the self-corrector randomising-encrypting device of FIG. 5, characterised by the determination by trial and error of the correction of the plaintext sequence $\underline{X}$ in order to obtain the randomised-encrypted text sequence $\underline{A}$, for the second type of implementation for the randomised-encrypted data transmission system object of this invention. In FIG. 24, common parts corresponding to parts in FIG. 1, FIG. 5 and FIG. 6 make use of the same references.

FIG. 24 shows the self-corrector randomising-encrypting device 501v4 of the second way for carrying out the system, which is characterised by the by trial and error randomisation-encryption and by index determined decryption; said by-index determination is included into the resulting randomised-encrypted text sequence $\underline{A}$ that is transmitted, and allows to carry out the subsequent direct self-corrected decryption of the randomised-encrypted text sequence $\underline{A}$.

The plaintext sequence $\underline{X}$ to be transmitted is originated in a message source 101 that, through the plaintext sequence supplying channel 511 arrives to the self-corrector randomising-encrypting device variation 501v4 and reaches the by-index input corrector of sequence 2401 that receives through input 2411 the initial selected index IS, supplied from the selected index generator 2402, and assembles the initial selected index IS and the plaintext sequence $\underline{X}$ in order to make up the by-index modified plaintext sequence XI that is supplied to the randomising-encrypting device 102 through output 111.

The self-corrector randomising-encrypting device variation 501v4 receives through control block supplying channel 512 control block K that reaches the randomising-encrypting device 102 through input 112, which is an extension of the control block supplying channel 512.

The randomising-encrypting device 102 groups the by-index modified plaintext sequence XI and control block K and results in the suggested randomised-encrypted text sequence AP that is supplied through output 113 to the randomness verifying device 603, which verifies if the suggested randomised-encrypted text sequence AP complies with the at random number sequence properties specified within the tests that implements, whose result is designated as randomness verification result T.

If the randomness verification result T is positive, the randomness verifying device 603 transmits through the transmission channel 513 the suggested randomised-encrypted text sequence AP as the randomised-encrypted text sequence $\underline{A}$.

If the randomness verification result T is negative, the randomness verifying device 603 do not transmit through the transmission channel 513 the suggested randomised-encrypted text sequence AP and transmits the negative randomness verification result T to the selected index generator 2402 through input 2412. The selected index generator 2402 generates a new alternative selected index IS that is supplied to the by-index input corrector of sequence 2401.

The alternative selected index IS can be the following element selected from a list withheld in the selected index generator 2402 or the previous selected index IS plus a predetermined quantity among many other possible implementations. The by-index input corrector of sequence 2401 assembles the new alternative selected index IS and the plaintext sequence $\underline{X}$, which has been modified according to the alternative selected index IS, and supplies a new by-index modified plaintext sequence XI to the randomising-encrypting device 102, in which it is randomised-encrypted by means of the same control block K, and so generates a new suggested randomised-encrypted text sequence AP that is supplied to the randomness verifying device 603. This process is repeated until the randomness verification result T, which is applied to the suggested randomised-encrypted text sequence AP, is positive.

Figure 25:
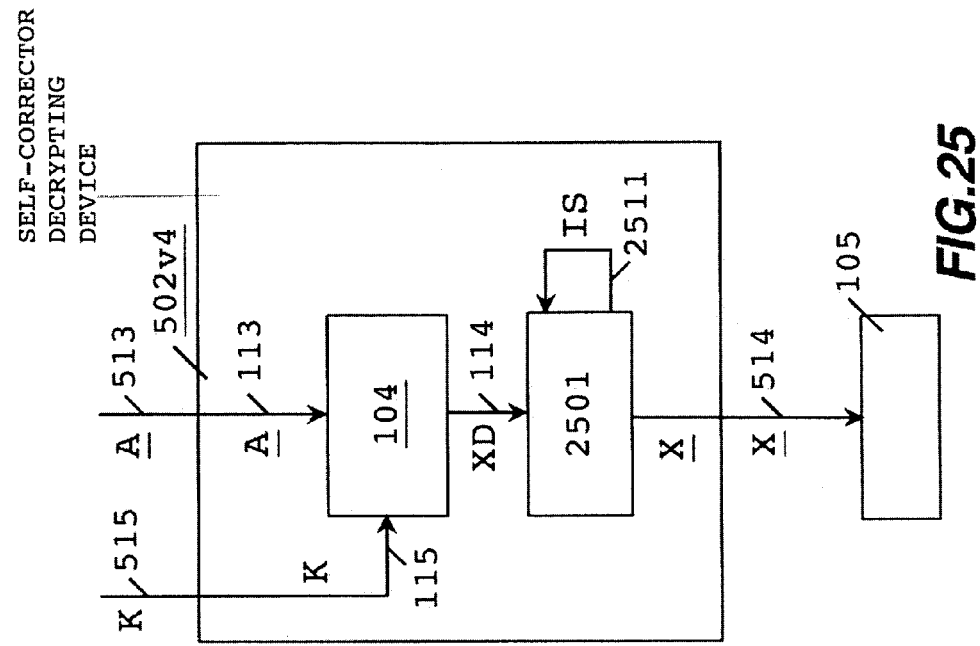
FIG. 25 shows block connection diagram of self-corrector decrypting device in FIG. 5; self-corrector decrypting device for the decryption of the randomised-encrypted text sequence, which has been generated with the self-corrector randomising-encrypting device in FIG. 24.

The by-index input corrector of sequence 2401 assembles the plaintext sequence $\underline{X}$ and modifies it according to the selected index IS that is supplied through input 2411, and includes in the by-index modified plaintext sequence XI the selected index IS, so that the by-index output corrector of sequence 2501 of the self-corrector decrypting device 502v4 in FIG. 25 can get the selected index IS to be applied in order to recover the original plaintext sequence $\underline{X}$.

The by-index input corrector of sequence 2401 can modify the plaintext sequence $\underline{X}$ by means of any operation or function such that there exist a reverse operation or function that allows to recover the original value. The by-index input corrector of sequence 2401 can modify the plaintext sequence $\underline{X}$ by multiple ways such as, without limiting them, dividing the plaintext sequence $\underline{X}$ into blocks of length L XL, modifying them by means of the functions XL=$F^{17}$ (IS, XL), where IS is the selected index, whose ways for carrying it out can be without limiting them:

$F^{17}$ (IS, XL)=(XL oper+/−IS) mod $2^L$.

$F^{17}$ (IS, XL)=XL oper__07 IS, where oper__07 can be the operation XOR.

General implementation, being divided the plaintext block of length L XL into different subblocks XL1, . . . , XLS, such that XLj of length Qj bits, being Qj less or equal to L for j=1, . . . , S, $F^{17}$ (IS, XL=union of $F^{18}$ (IS, XLj)= union of ((XLj oper+/−IS mod $2^{Qj}$) for j=1, . . . , S.

Other implementations of $F^{17}$ (IS, XL).

FIG. 25 shows possible diagram of variation of the self-corrector decrypting device of FIG. 5, characterised by the indexed determination of the correction of the decrypted text sequence XD in order to obtain the plaintext sequence $\underline{X}$, for the decryption of the text sequences randomised-encrypted with the device in FIG. 24. In FIG. 25, common parts corresponding to parts in FIG. 1 and FIG. 5 make use of the same references.

The self-corrector decrypting device 502v4 receives through control block secure supplying channel 515 control block K that reaches the randomising-encrypting device 104 through input 115, which is an extension of the control block secure supplying channel 515.

The randomised-encrypted text sequence $\underline{A}$ reaches the self-corrector decrypting device 502v4 through transmission channel 513 and arrives to the decrypting device 104 through input 113, which is an extension of the transmission channel 513, that decrypts the randomised-encrypted text sequence $\underline{A}$ with control block K and results in the decrypted text sequence XD that reaches through output 114 the by-index output corrector of sequence 2501.

The by-index output corrector of sequence 2501 extracts from the decrypted text sequence XD the selected index IS that withholds, graphic representation of the operation carried out by means of the self-supply through input 2511. According to said extracted selected index IS the by-index output corrector of sequence 2501 modifies the segment of plaintext sequence withheld in the decrypted text sequence XD and results in the plaintext sequence $\underline{X}$. The modification operation or function of the segment of the plaintext sequence is the reverse function to the one implementated in the by-index input corrector of sequence 2401 in FIG. 24, with which the randomised-encrypted text sequence $\underline{A}$ was randomised-encrypted. According to the previous examples reported in the description of the self-corrector randomising-encrypting device 501v4 in FIG. 24, relating to the by-index input corrector of sequence 2401, being divided the segment of plaintext sequence into blocks of length L XG in the same way as the by-index input corrector of sequence 2401, the by-index output corrector of sequence 2501 can modify the plaintext blocks of length L XG by means of the function $F^{19}$ (IS, XG), where IS is the selected index IS extracted from the decrypted text sequence XD, which can adopt the following implementations:

XG=$F^{19}$ (IS, XG)=(XG oper−/+IS) mod $2^L$, if the by-index input corrector of sequence 2401 in FIG. 24 made use of the function $F^{17}$ (IS, XL)=(XL oper+/−IS) mod $2^L$.

$F^{19}$ (IS, XG)=XG oper__08 IS, where oper__08 can be the operation XOR, if the by-index input corrector of sequence 2401 in FIG. 24 made use of the function $F^{17}$ (IS, XL)=XL oper__07 IS.

General implementation, being divided the plaintext block of length L XG into different subblocks XG1, ... XGS, such that XGj made up by Qj bits, being Qj less or equal to L, for j=1, ..., S, $F^{19}$ (IS, XG)=union of $F^{20}$ (IS, XGj)=union of ((XGj oper−/+IS) mod $2^{Qj}$) for j=1, ..., S, if the by-index input corrector of sequence 2401 in FIG. 24 made use of the function $F^{17}$ (IS, XL)=union of ((XLj oper+/−IS) mod $2^{Qj}$).

Other implementations of $F^{19}$ (IS, XG) reversal of $F^{17}$ (IS, XL).

The by-index output corrector of sequence 2501 together with the selected index IS extracted from the decrypted text sequence XD and the own decrypted text sequence XD results in the original plaintext sequence X̲ that reaches target 105 through the decrypted text sequence supplying channel 514.

FIG. 26 shows possible diagram of variation of the self-corrector randomising-encrypting device in FIG. 5, characterised by the indexed determination of the by-index control block KI used for the randomisation-encryption of the plaintext sequence X, for the second way of carrying out the transmission system for randomised-encrypted data object of this invention. In FIG. 26, common parts corresponding to parts in FIG. 1, FIG. 5, FIG. 6 and FIG. 24 make use of the same references.

The plaintext sequence X̲ to be transmitted is originated in a message source 101 and arrives to the self-corrector randomising-encrypting device variation 501v5 through the plaintext sequence supplying channel 511 and reaches the index and plaintext sequence input supplying device 2601. The index and plaintext sequence input supplying device 2601 supplies the initial selected index IS and the plaintext sequence X̲ received through input 2613 to the randomising-encrypting device 102. The initial selected index IS can be directly introduced in the index and plaintext sequence input supplying device 2601 or can be supplied by the selected index generator 2402 through input 2613; both options do not affect the essence of the idea.

The self-corrector randomising-encrypting device variation 501v5 receives through the control block supplying channel 512 control block K that reaches the by-index control block generator 2602 through input 2611, which is an extension of the control block supplying channel 512, and generates from said control block K and the different selected indexes IS received through input 2613 the different by-index control blocks KI that are supplied through output 112. The initial by-index control block KI corresponding to the initial selected index IS can be the same control block K and can be supplied without receiving the initial selected index IS from the selected index generator 2602; this is a sample of the many different specific implementations that can be carried out.

The randomising-encrypting device 102 groups the initial selected index IS and the plaintext sequence X̲, both supplied through input 111, with the initial by-index control block KI received through input 112 and generates the suggested randomised-encrypted text sequence AP that is supplied through output 113 to the randomness verifying device 603. The randomness verifying device 603 subjects the suggested randomised-encrypted text sequence AP to the randomness test that implements and results in the randomness verification result T.

If the randomness verification result T is positive, the randomness verifying device 603 transmits through the transmission channel 513 the suggested randomised-encrypted text sequence AP as the randomised-encrypted text sequence A.

If the randomness verification result T is negative, the randomnes verifying device 603 does not transmit through the transmission channel 513 the suggested randomised-encrypted text sequence AP and the selected index generator 2402 receives the negative randomness verification result T through input 2612 and generates a new alternative selected index IS that is supplied to the index and plaintext sequence input supplier 2601 and to the by-index control block generator 2602 through output 2613 in order to carry out a new randomisation-encryption of the new alternative selected index IS and the plaintext sequence X, whose randomisation-encryption has not generated an at random text sequence with the by-index control block KI corresponding to the previous selected index IS. The index and plaintext sequence input supplier 2601 supplies the new alternative selected index IS and the plaintext sequence X̲ to the randomising-encrypting device 102 through output 111. The by-index control block generator 2602, with control block K or the previous by-index control block KI and the new alternative selected index IS, generates a new alternative by-index control block KI; it supplies the initial by-index control block KI, which can be control block K as it is shown in FIG. 26 to make its understanding easier, to the randomising-encrypting device 102 for the randomisation-encryption of the new alternative selected index IS followed by the new alternative by-index control block KI for the randomisation-encryption of the plaintext sequence X̲. The randomising-encrypting device 102 randomises-encrypts the new alternative selected index IS with the initial by-index control block KI and the plaintext sequence X̲ with the new alternative by-index control block KI and generates a new suggested randomised-encrypted text sequence AP that arrives to the randomness verifying device 603 through output 113. This process is repeated until the suggested randomised-encrypted text sequence AP complies with the randomness tests that the randomness verifying device 603 implements.

The by-index control block generator 2602 can be carried out in different ways. For example, the initial by-index control block KI, which corresponds to the initial selected index IS whose value can be 0 (zero), is the same control block K supplied through the control block supplying channel 512. The by-index control block generator 2602 generates a new alternative by-index control block KI by means of function KI=$F^{21}$ (IS, K), that among many other ways of carrying it out it can be:

In general KI=$F^{21}$ (IS, K)=$F^{22}_n$ (K) for IS=n, for instance, where:

$F^{22}_0$ (K)=K for IS=0.

$F^{22}_n$ (K)=$F^{22}$ ($F^{22}_{n-1}$ (K)) for IS=n, where $F^{22}$ can be:

In general, being divided control block K into different subblocks K1, ..., KS, such that Kj of length Qj bits, being Qj less or equal to LK for j=1, ..., S, $F^{22}_n$ (K)=union of $F^{23}_n$ (Kj)=union of (($F^{23}_{n-1}$ (Kj) oper+/− B) mod $2^{Qj}$) for j=1, ..., S, where B is a value.

$F^{22}_n$ (K) make use of function hash that from control block K, which has been supplied as initial data, can be used in order to generate bit blocks to be used as function $F^{22}_n$ such that $F^{22}_n$ (K)=bits selected from $HASH_n$ (K) and $HASH_n$ (K)=HASH ($HASH_{n-1}$ (K)) for instance. Control block K can be of any length G.

Other possible implementations of $F^{22}_n$ (K).

In general KI=$F^{21}$ (IS, K) so that being divided block K into different subblocks K1, ..., KS, such that Kj of length Qj bits, being Qj less or equal to LK for j=1, ..., S, $F^{21}$ (IS, K)=union of $F^{24}$ (IS, Kj)=union of ((Kj oper+/−IS) mod $2^{Qj}$) for j=1, ..., S.

Where LK is the length of control block K and depends on the specific implementation of the randomising-encrypting device 102.

The index and plaintext sequence input supplier 2601 is not necessary but it is included in order to make the understanding of the self-corrector randomising-encrypting device variation 501v5 easier.

FIG. 27 shows possible diagram of variation of the self-corrector decrypting device in FIG. 5, characterised by the indexed determination of the by-index control block KI used to get the plaintext sequence X, for the decryption of the text sequences, which has been randomised-encrypted with the device of FIG. 26. In FIG. 27, common parts corresponding to parts of FIG. 1, FIG. 5 and FIG. 26 make use of the same references.

The self-corrector decrypting device 502v5 receives through control block secure supplying channel 515 control block K that reaches the by-index control block generator 2602, which generates from control block K the initial by-index control block KI; this initial by-index control block KI can be the same control block K as it is shown in FIG. 27, corresponding to the initial selected index IS, and is supplied to the decrypting device 104 through output 115. The by-index control block generator 2602 generates the by-index control blocks KI by means of the same function as the by-index control block generator 2602 of the self-corrector randomising-encrypting device 501v5 in FIG. 26, with which the randomised-encrypted text sequence A was generated.

The randomised-encrypted text sequence A arrives to the self-corrector decrypting device 502v5 through the transmission channel 513 and reaches the decrypting device 104 through input 113, which is an extension of the transmission channel 513. The decrypting device 104 deciphers the beginning of the randomised-encrypted text sequence A with the initial by-index control block KI, which has been supplied by the by-index control block generator 2602 through input 115, and generates the selected index IS that is supplied through output 114 to the index and plaintext sequence output supplier 2701. The extracted selected index IS is supplied from the index and plaintext sequence output supplier 2701 through output 2711 to the by-index control block generator 2602, which generates the alternative by-index control block KI corresponding to said extracted selected index IS and it is supplied through output 115 to the decrypting device 104. The decrypting device 104 deciphers the remaining randomised-encrypted text sequence A with the alternative by-index control block KI and generates the plaintext sequence X that is supplied through output 114 to the index and plaintext sequence output supplier 2701. The index and plaintext sequence output supplier 2701 feeds the target 105 with the plaintext sequence X through the decrypted text sequence supplying channel 514.

The index and plaintext sequence output supplier 2701 can be eliminated if channel 2711 is used as a connection of channel 114, but it is included in order to make the understanding of the operating way of the device easier.

Figures 28, 29:
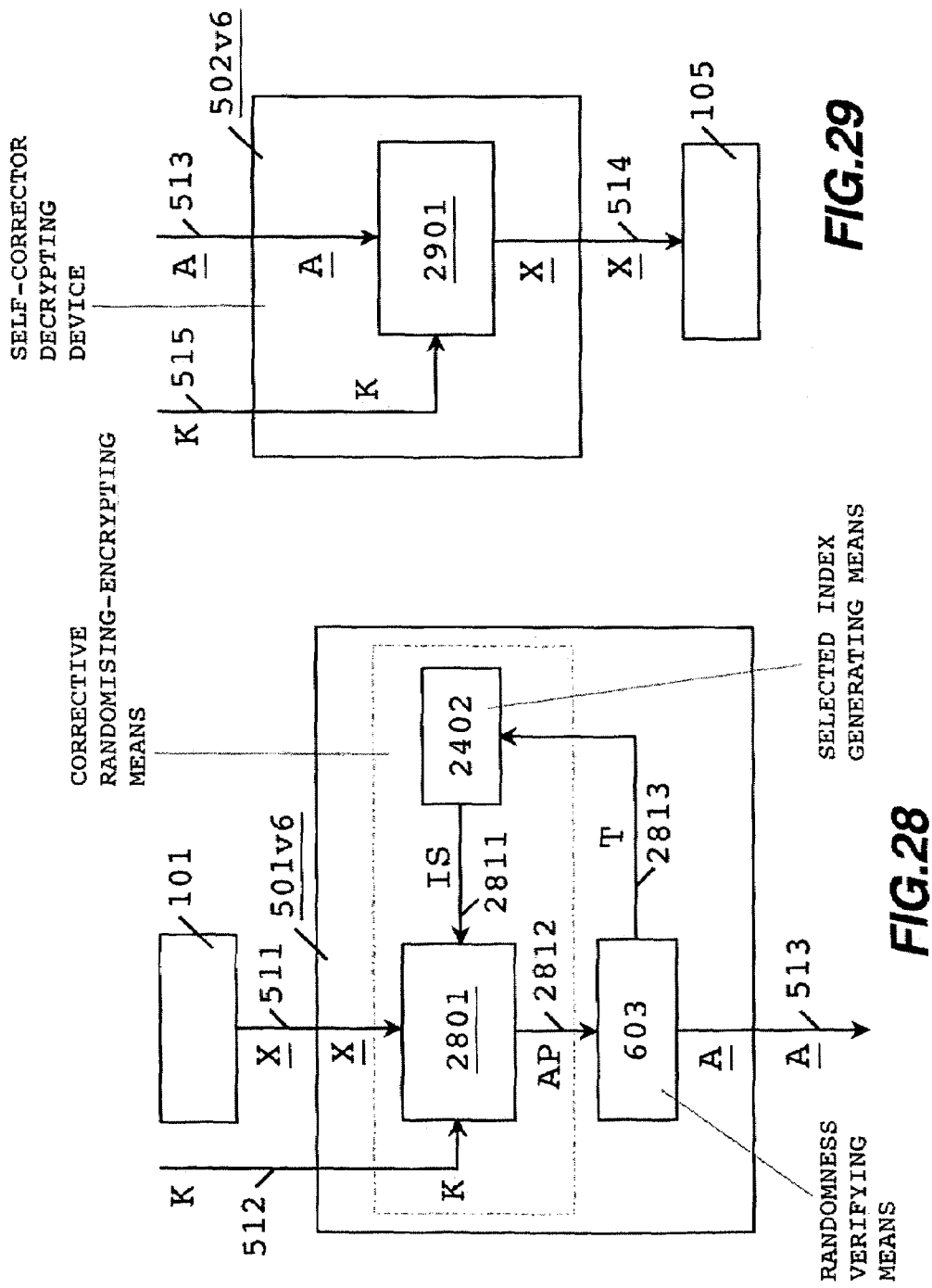
FIG. 28 shows block connection diagram of the third variation of the second type of implementation of the self-corrector randomising-encrypting device in FIG. 5.
FIG. 29 shows block connection diagram of the self-corrector decrypting device in FIG. 5; self-corrector decrypting device for the decryption of the randomised-encrypted text sequence, which has been generated with the self-corrector randomising-encrypting device in FIG. 28.

FIG. 28 shows possible diagram of variation of the self-corrector randomising-encrypting device in FIG. 5, characterised by the indexed determination of the transformation carried out by the randomising-encrypting device for the second way of carrying out the transmission system of randomised-encrypted data object of this invention. In FIG. 28, common parts corresponding to parts of FIG. 1, FIG. 5, FIG. 6, FIG. 24 and FIG. 30 make use of the same references.

The self-corrector randomising-encrypting device variation 501v6 receives through control block supplying channel 512 control block K that reaches the by-index corrector randomising-encrypting device of sequence 2801.

The plaintext sequence X to be transmitted is originated in a message source 101 and arrives to the self-corrector randomising-encrypting device variation 501v6 through the plaintext sequence supplying channel 511 reaching the by-index corrector randomising-encrypting device of sequence 2801. The by-index corrector randomising-encrypting device of sequence 2801 receives from the selected index generator 2402 the initial selected index IS through input 2811.

The by-index corrector randomising-encrypting device of sequence 2801 randomises-encrypts the initial selected index IS and the plaintext sequence X, which is corrected according to said initial selected index IS, with control block K and results in the suggested randomised-encrypted text sequence AP that is supplied through output 2812 to the randomness verifying device 603, which verifies if the suggested randomised-encrypted text sequence AP complies with the at random number sequence properties, which are determined in the tests that implements, and results in the randomness verification result T.

If the randomness verification result T is positive, the randomness verifying device 603 transmits through the transmission channel 513 the suggested randomised-encrypted text sequence AP as the randomised-encrypted text sequence A.

If the randomness verification result T is negative, the randomness verifying device 603 does not transmit through the transmission channel 513 the suggested randomised-encrypted text sequence AP and the negative randomness verification result T is transmitted through output 2813 to the selected index generator 2402, which generates a new alternative selected index IS that is supplied through output 2811 to the by-index corrector randomising-encrypting device of sequence 2801. The by-index corrector randomising-encrypting device of sequence 2801 carries out a new randomisation-encryption, which is corrected according to the new alternative selected index IS of the own alternative selected index IS and the plaintext sequence X, with the changes or transformations in the transformer block WT as it will be described below in the breakdown of the by-index corrector randomising-encrypting device of sequence 2801, and results in a new suggested randomised-encrypted text sequence AP that is supplied 15 to the randomness verifying device 603 through output 2812. This process is repeated until a suggested randomised-encrypted text sequence AP, which verifies the randomness tests that the randomness verifying device 603 implements, is generated.

FIG. 29 shows possible diagram of variation of the self-corrector decrypting device in FIG. 5, characterised by the indexed determination of the transformation carried out by the decrypting device in order to get the original plaintext sequence X, for the decryption of the text sequences randomised-encrypted with the device in FIG. 28. In FIG. 29, common parts corresponding to parts of FIG. 1, FIG. 5 and FIG. 31 make use of the same references.

The self-corrector decrypting device 502v6 receives through control block supplying channel 515 control block K that reaches the by-index corrector decrypting device of sequence 2901.

The randomised-encrypted text sequence A arrives to the self-corrector decrypting device 502v6 through the transmission channel 513 and reaches the by-index corrector decrypting device 2901, which deciphers with control block K, which has been receives through input 515, the randomised-encrypted text sequence A, and results in the plaintext sequence X that is supplied through the decrypted text sequence supplying channel 514 to target 105. The by-index corrector decrypting device of sequence 2901 deciphers, in a corrected way, the plaintext sequence X, according to the selected index IS that the same by-index corrector decrypting device 2901 internally extracts from the randomised-encrypted text sequence A.

Although FIG. 29 could be directly replaced by FIG. 31, it is included in this report in order to make the understanding of the differences and particularities of the several self-corrector randomising-encrypting and decrypting device variations easier by presenting them in a coherent way and to make the understanding of the operation between even randomisation-encryption and decryption of the elements broken down at the same level.

FIG. 30 shows possible diagram of the by-index corrector randomising-encrypting device of sequence in FIG. 28. In FIG. 30, common parts corresponding to parts of FIG. 3, FIG. 14, FIG. 28, FIG. 32 and FIG. 34 make use of the same references.

The by-index corrector randomising-encrypting device of sequence 2801 receives through the plaintext supplying channel 511 the plaintext sequence X, through the control block supplying channel 512 control block K and through input 2811 the selected index IS, and results in the suggested randomised-encrypted text sequence AP through output 2812.

In one way of carrying it out, the by-index corrector randomising-encrypting device 2801 receives through control block supplying channel 512 control block K that arrives to the randomisation-encryption control subblock generator 1401 through input 1411, which is an extension of the control block supplying channel 512. The randomisation-encryption control subblock generator 1401 generates from control block K the initiatory control subblock of length G W and the fifty-two encryption control subblocks $Z_1$ to $Z_{52}$, which are supplied to the by-index corrector randomising-encrypting device of block of length N 3002 through output 1412 and 1413 respectively.

The by-index corrector randomising-encrypting device of sequence 2801 receives through the plaintext sequence supplying channel 511 the plaintext sequence X, which arrives to the index and block of length N input assembly device 3001, and through 2811 the selected index IS, which is supplied to the index and block of length N input assembly device 3001 and to the by-index corrector randomising-encrypting device of block of length N 3002. The index and block of length N input assembly device 3001 assembles the sequence of plaintext blocks of length N X of the plaintext, sequence X including the selected index IS; the sequence of plaintext blocks of length N X is supplied block by block to the by-index corrector randomising-encrypting device of length N 3002 through output 3011. The index and block of length N input assembly device 3001 includes the selected index IS preferably in the first plaintext block of length N X supplied to the by-index corrector randomising-encrypting device of block of length N 3002.

The by-index corrector randomising-encrypting device of block of length N 3002 randomises-encrypts according to the selected index IS the sequence of plaintext blocks of length N X supplied block by block through input 3011 with the initiatory control subblock of length G W and the fifty-two encryption control subblocks $Z_1$ to $Z_{52}$, and results in the sequence of randomised-encrypted text blocks of length N A that reaches through output 3012 the output unit of blocks of length N 302. The output unit of blocks of length N 302 makes up together with the randomised-encrypted text blocks of length N A the suggested randomised-encrypted text sequence AP that is supplied through output 2812.

The suggested randomised-encrypted text sequence AP is subjected in the randomness verifying device 603 in FIG. 28 to the randomness tests that it implements. If the randomness verifying result T is negative, the selected index generator 2402 of FIG. 28 generates the new alternative selected index IS that is supplied to the index and block of length N input assembly device 3001 and to the by-index corrector randomising-encrypting device of block of length N through input 2811. The by-index and block of length N input assembly device 3001 assembles the plaintext sequence X again by inserting the new alternative selected index IS, and results in the new sequence of plaintext blocks of length N X, which differentiates from the supplied sequence in the previous attempt of randomisation in the new alternative selected index IS that is supplied to the by-index corrector randomising-encrypting device of block of length N 3002 through output 3011. The by-index corrector randomising-encrypting device of block of length N 3002 carries out a new different randomisation-encryption of the sequence of plaintext blocks of length N X according to the new alternative selected index IS that is received, and results in a new sequence of randomised-encrypted text blocks of length N A that reaches through output 3012 the output unit of blocks of length N 302 that makes up a new suggested randomised-encrypted text sequence AP, which is supplied through output 2812 to the randomness verifying device 603. This process is repeated until the randomness tests implemented by the randomness verifying device 603, which are applied to the suggested randomised-encrypted text sequence AP, are positive.

The input/output 1412 is shown as a dashed line if the randomisation-encryption control subblock generator variation 1401v in FIG. 16 is used together with the ways of carrying out the by-index corrector randomising-encrypting device of block of length N 3002 that are reported below.

FIG. 31 shows possible diagram of the by-index corrector decrypting device of sequence in FIG. 29 for the decryption of randomised-encrypted text sequences by making use of the device in FIG. 30. In FIG. 31, common parts corresponding to parts of FIG. 3, FIG. 15, FIG. 17, FIG. 33 and FIG. 35 make use of the same references.

FIG. 31 shows possible way of carrying out the by-index corrector decrypting device of sequence 2901 that receives through the transmission channel 513 the randomised-encrypted text sequence A and through the control block secure supplying channel 515 control block K, and results in the plaintext sequence X through the decrypted text sequence supplying channel 514.

The by-index corrector decrypting device of sequence 2901 receives through control block secure supplying channel 515 control block K and reaches the decryption control subblock generator 1501 through input 1511, which is an extension of the control block secure supplying channel 515. The decryption control subblock generator 1501 generates from control block K the initiatory control subblock of length G W and the fifty-two decryption control subblock $U_1$ to $U_{52}$, which are supplied to the by-index corrector decrypting device of block of length N 3101 through output 1512 and 1513 respectively.

The by-index corrector decrypting device of sequence 2901 receives through the transmission channel 513 the randomised-encrypted text sequence A that reaches the assembly input unit of block of length N 301, which assembles the randomised-encrypted text sequence A into the sequence of randomised-encrypted text blocks of length N A that is supplied block by block to the by-index corrector decrypting device of block of length N 3101 through input 3111, where it is grouped with the initiatory control subblock of length G W and the fifty-two decryption control subblocks $U_1$ to $U_{52}$, and results in the sequence of plaintext blocks of length N X supplied through output 3112 to the index and block of length N output assembly device 3102.

According to the length of the selected index IS and the specific way of operating adopted by the index and block of length N input assembly device 3001 in FIG. 30 with which the randomised-encrypted text sequence $\underline{A}$ has been randomised-encrypted, the by-index corrector decrypting device of block of length N 3101 preferably decrypts the first randomised-encrypted text block of length N A that is supplied to the index and block of length N output assembly device 3102, which extracts from the plaintext block of length N X the selected index IS that is supplied through output 3113 to the by-index corrector decrypting device of block of length N 3101 to make this one to adopt its way of operating according to said extracted selected index IS. The by index corrector decrypting device of block of length N 3101 decrypts the remaining randomised-encrypted text blocks of length N A by making use of said extracted selected index IS, and results in the respective plaintext blocks of length N X that arrive through output 1112 to the index and block of length N output assembly device 3102. The index and block of length N output assembly device 3102 makes up together with the corresponding plaintext block of length N X the plaintext sequence $\underline{X}$ that is supplied through the decrypted text supplying channel 514.

Figure 32:
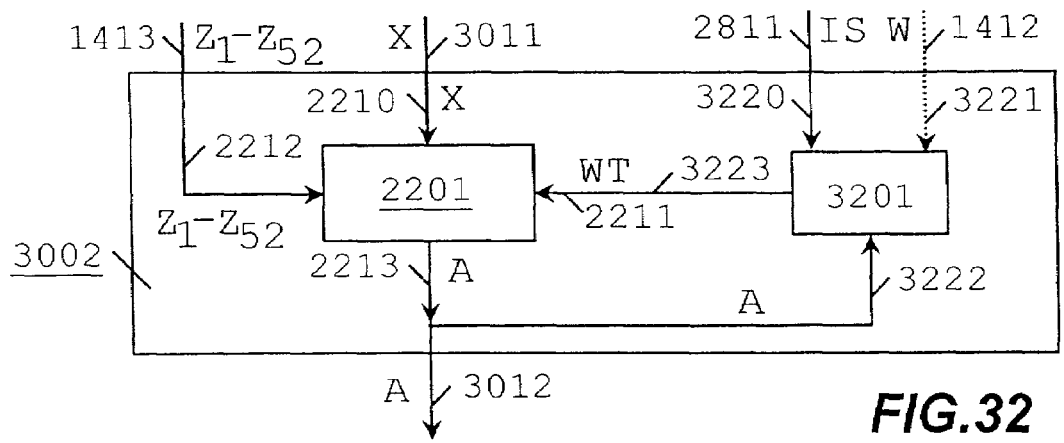
FIG. 32 shows block connection diagram of the by-index corrector randomising-encrypting device of block of length N belonging to the by-index corrector randomising-encrypting device of sequence in FIG. 30.

FIG. 32 shows possible diagram of the by-index corrector randomising-encrypting device of block of length N used in FIG. 30. In FIG. 32, common parts corresponding to parts of FIG. 22 and FIG. 30 make use of the same references.

Figure 34:
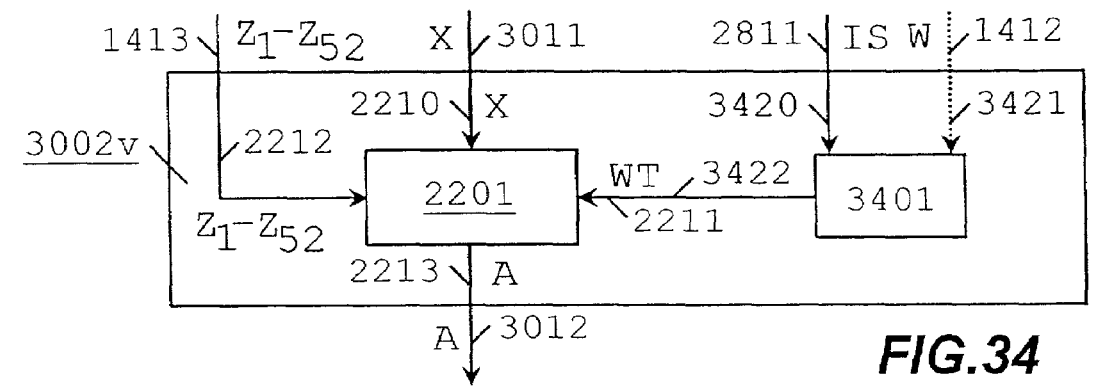
FIG. 34 shows block connection diagram of the by-index corrector randomising-encrypting device variation of block of length N in FIG. 32.

FIG. 32 shows possible way of carrying out the by-index corrector randomising-encrypting device of block of length N 3002 that receives, as well as its variation 3002v in FIG. 34, through input 3011 the plaintext block of length N X, through input 1413 the fifty-two encryption control subblocks $Z_1$ to $Z_{52}$, through input 1412 the initiatory control subblock of length G W and through input 2811 the selected index IS, and results in the randomised-encrypting text block of length N A through output 3012.

The by-index corrector refed generator of transformer block 3201 receives through input 3220, which is connected to input 2811, the selected index IS; through input 3221, which is connected to input 1412, the initiatory control subblock of length G W; and through input 3222, which is a derivation of output 2213, the corresponding randomised-encrypted text block of length N A that results from the randomisation-encryption of the previous plaintext block of length N X, and results in the corresponding transformer block WT through output 3223.

The by-index corrector refed generator of transformer block 3201 can implement function $F^{25}$ such that the transformer block WT takes the following values shown in TABLE 5 for the consecutive different plaintext block of length N X.

TABLE 5

VALUES TAKEN BY WT

| Order of the plaintext block that is randomised-encrypted | Plaintext block that is randomised-encrypted | Value of WT |
|---|---|---|
| First | $X_1$ | $F^{25}_1$(initial IS, W) |
| Second | $X_2$ | $F^{25}_2$(alternative IS, $A_1$) |
| ... | ... | ... |
| N | $X_n$ | $F^{25}_n$(alternative IS, $A_{n-1}$) |

Function $F^{25}$, which is implemented in the by-index corrector refed generator of transformer block 3201 can be defined among multiple ways and without limiting them as:

$WT_1 = F^{25}_1$ (initial IS, W), for the first block WT, $WT_n = F^{25}_n$ (IS, $A_{n-1}$) = $F^{26}_n$ (IS, W, $A_{n-1}$), for the "nth" block WT for the randomisation-encryption of the "nth" plaintext block of length N X.

Where:
$WT_1 = F^{25}_1$ (initial IS, W) can be:
$WT_1 = W$, the identity, or
$WT_1 =$ operations carried out with block W and optionally the initial selected index IS, and
$WT_n = F^{26}_n$ (IS, W, $A_{n-1}$) can be:
$F^{26}_n$ (IS, W, $A_{n-1}$) = $F^{27}_n$ (IS, W) oper__09 $A_{n-1}$:
   Where oper__09 can be the operation XOR or exclusive-OR.
   And $F^{27}_n$ (IS, W) can be chosen in order to implement:
      $F^{27}_n$ (IS, W) = ($F^{27}_{n-1}$ (IS, W oper+/−IS) mod $2^N$.
         General implementation, being divided the block W into different subblocks W1, ..., WS, such that Wi consisting of Qi bits, being Qi les or equal to 64 for i=1, ..., S,
         $F^{27}_n$ (IS, W) = union of $F^{28}_n$ (IS, Wi) = union of (($F^{28}_{n-1}$ (IS, Wi) oper+/−IS) mod $2^{Qi}$) for i=1, ..., S.
      In this previously shown specific implementations the initiatory control subblock of length G W is preferably of length G=64 bits.
      $F^{27}_n$ (IS, W) be the adaptation of the at random number generator such as the PRNG by Marsaglia, being the seed the result from (W oper+/−IS) mod $2^{32}$, for instance, where the initiatory control subblock of length G W is preferably of length G=32 bits.
      $F^{27}_n$ (IS, W) make use of the hash function, such that from the block BLOCK=(W oper+/−IS), for instance, it can be used to generate 64 bit blocks so that
      $F^{27}_n$ (IS, W)=64 bits selected from $HASH_n$ (BLOCK) and $HASH_n$(BLOCK)=HASH($HASH_{n-1}$ (BLOCK)) for instance. Because of the characteristics of hash function, the intitiatory control subblock of length G W can be of any length G.
   Other possible implementations of $F^{27}_n$ (IS, W).
$F^{26}_n$ (IS, W, $A_{n-1}$) = W oper__10 $F^{29}_n$ (IS, $A_{n-1}$):
   Where oper__10 can be the operation XOR or exclusive-OR.
   And $F^{29}_n$ (IS, $A_{n-1}$) can be:
      $F^{29}_n$ (IS, $A_{n-1}$) = ($A_{n-1}$ oper+/−IS) mod $2^N$
         General implementations, being divided the block $A_{n-1}$ into different subblocks A1, ..., AS, such that Ai consisting of Qi bits, being Qi less or equal to 64 for i=1, ..., S, $F^{29}_n$ (IS, $A_{n-1}$)=union of $F^{30}_n$ (IS, $Ai_{n-1}$)=union of (($Ai_{n-1}$ oper+/−IS) mod $2^{Qi}$) for i=1, ..., S.
      Make use of hash function, so that $F^{29}_n$ (IS, $A_{n-1}$)=64 bits selected from HASH ($A_{n-1}$ oper+/−IS).
   In these previously shown specific implementations the initiatory control subblock of length G W is preferably of length G=64 bits.
   Other possible implementations of $F^{29}_n$ (IS, $A_{n-1}$)

In the encrypting-grouping device 2201 the corresponding plaintext block of length N X that arrives through input 2210, which is an extension of input 3011, the corresponding transformer block WT that arrives through input 2211, which is an extension of output 3223, and the fifty-two encryption control subblocks $Z_1$ to $Z_{52}$ that arrive through input 2212, which is an extension of input 1413, are grouped and result in the corresponding randomised-encrypted text block of length N A of length N=64 bits through output 2213.

The output 2213 is connected to output 3012 and to the by-index corrector refed generator of transformer block 3201 through input 3222, which can be implemented, among multiple ways, as a derivation of output 3012. The randomised-encrypted text block of length N A reaches output 3012 through output 2213 and it is supplied to the by-index corrector refed generator of transformer block 3201 through input 3222 in order to be used in the generation of the corresponding transformer block to be used in the randomisation-encryption of the following plaintext block of length N X that is received through input 3011.

Figure 33:
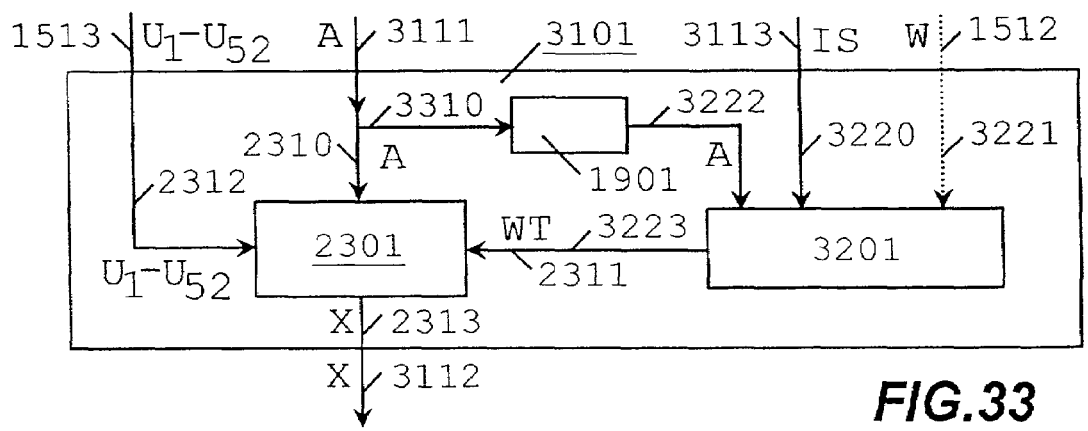
FIG. 33 shows block connection diagram of the by-index corrector decrypting device of block of length N belonging to the by-index corrector decrypting device of sequence in FIG. 31 for the decryption of the randomised-encrypted text blocks, which have been generated with the by-index corrector randomising-encrypting device of block of length N in FIG. 32.

FIG. 33 shows possible diagram of the by-index corrector decrypting device of block of length N used in FIG. 31 for the decryption of the randomised-encrypted text blocks by making use of the device in FIG. 32. In FIG. 33, common parts corresponding to parts of FIG. 19, FIG. 23 and FIG. 31 make use of the same references.

FIG. 33 shows possible way of carrying out the by-index corrector decrypting device of block of length N 3101, as well as its variation 3101v in FIG. 41, that receives through input 3111 the randomised-encrypted text block of length N A, through input 1513 the fifty-two decryption control subblocks $U_1$ to $U_{52}$, through input 3113 the selected index IS, and through input 1512 the initiatory control subblock of length G W, resulting in the plaintext block of length N X through output 3112.

The by-index corrector refed generator of transformer block 3201 receives through input 3220, which is connected to input 3113, the selected index IS, through input 3221, which is connected to input 1512, the initiatory control subblock of length G W, and through input 3222, which is output of the withholding unit of block of length N 1901, the corresponding randomised-encrypted text block N A, and results in the corresponding transformer block WT through output 3223.

The by-index corrector refed generator of transformer block 3201 carries out the same implementation, that is, the function $F^{25}$, as the by-index corrector refed generator of transformer block 3201 of the device in FIG. 32, with which the randomised-encrypted text sequence $\underline{A}$ was randomised-encrypted. TABLE 6 shows the different values taken by transformer block WT for the different consecutive randomised-encrypted text block of length N A that are assembled from the randomised-encrypted text sequence $\underline{A}$ that is decrypted.

TABLE 6

VALUES TAKEN BY WT

| Order of the randomised-encrypted text block that is decrypted | Randomised-encrypted text block that is randomised-encrypted | Value of WT |
|---|---|---|
| First | $A_1$ | $F^{25}_1$(initial IS, W) |
| Second | $A_2$ | $F^{25}_2$(extracted IS, $A_1$) |
| ... | ... | ... |
| N | $A_n$ | $F^{25}_n$(extracted IS, $A_{n-1}$) |

The corresponding randomised-encrypted text block of length N A arrives through input 3111 and is supplied to the decrypting-grouping, device 2301 through input 2310, and to the withholding unit of block of length N 1901 through input 3310, which can be a derivation of input 2310. In the decrypting-grouping device 2301, the corresponding randomised-encrypted text block N A, the fifty-two decryption control subblocks $U_1$ to $U_{52}$ that arrive through input 2312, which is an extension of input 1513, and the corresponding transformer block WT that arrives through input 2311, which is an extension of output 3223, are grouped and result in the corresponding plaintext block of length N X of length N=64 bits through output 2313 which extends to output 3112.

FIG. 34 shows possible diagram of the by-index corrector randomising-encrypting, device variation of block of length N in FIG. 32. In FIG. 34, common parts corresponding to parts in FIG. 22 and FIG. 30 make use of the same references.

The difference between the by-index corrector randomising-encrypting device of block of length N 3002 and its variation is the replacement of the by-index corrector refed generator of transformer block 3201 by the by-index corrector autonomous generator of transformer block 3401.

The by-index corrector autonomous generator of transformer block 3401 receives through input 3420, which is connected to input 2811, the selected index IS, and through input 3421, which is connected to input 1412, the initiatory control subblock of length G W, and results in the corresponding transformer block WT through output 3422.

The by-index corrector autonomous generator of transformer block 3401 implements function $F^{31}$, so that it generates the corresponding transformer block WT from the initiatory control subblock of length G W and the selected index IS. TABLE 7 shows the values taken by transformer block WT for the different consecutive plaintext blocks of length N X.

TABLE 7

VALUES TAKEN BY WT

| Order of the plaintext block that is randomised-encrypted | Plaintext block that is randomised-encrypted | Value of WT |
|---|---|---|
| First | $X_1$ | $F^{31}_1$(initial IS, W) |
| Second | $X_2$ | $F^{31}_2$(alternative IS, W) |
| ... | ... | ... |
| N | $X_n$ | $F^{31}_n$(alternative IS, W) |

Function $F^{31}$, which is implemented by the by-index corrector autonomous generator of transformer block 3401, can be defined among multiple ways and without limiting them as:

$WT_1 = F^{31}_1$ (initial IS, W), for the First transformer block WT, $WT_n = F^{31}_n$ (IS, W for the "nth" transformer block WT that is generated for the randomisation-encryption of the "nth" plaintext block of length N X.

Where:
  $WT_1 = F^{31}_1$ (initial IS, W) can be:
    $WT_1 = W$, the identity, Or
    $WT_1 =$ operations resulting from calculations carried out with the initiatory control subblock of length G W and optionally the initial selected index IS, for instance, and
  $WT_n = F^{31}_n$ (IS, W) can be:
    $F^{31}_n$ (IS, W) = ($F^{31}_{n-1}$ (IS, W) oper+/−IS) mod $2^N$.
    General implementation, being divided the block W into different subblocks W1, . . . , WS, such that Wi consisting of Qi bits, being Qi less or equal to 64 for i=1, . . . , S, $F^{31}_n$ (IS, W) = union of $F^{32}_n$ (IS, Wi) = union of (($F^{32}_{n-1}$ (IS, Wi) oper+/−IS) mod $2^{Qi}$) for i=1, . . . , S.

In these previously shown specific implementation the initiatory control subblock of length G W is preferably of length G=64 bits.

$F^{31}{}_n$ (IS, W) be adaptation of at random number generator such as the PRNG by Marsaglia, being the seed the result from (W oper+/−IS) mod $2^{32}$, for instance, where the initiatory control subblock of length G W is preferably of length G=32 bits.

$F^{31}{}_n$ (IS, W) make use of hash function, so that from the block BLOCK=(W oper+/−IS), for instance, it can be used in order to generate 64 bit blocks so that $F^{31}{}_n$ (IS, W) 64 bits selected from $HASH_n$ (BLOCK) and $HASH_n$ (BLOCK)=HASH ($HASH_{n-1}$ (BLOCK)) for instance. Because of the characteristics of hash functions, the initiatory control subblock of length G W can be of any length G.

Other possible implementation of $F^{31}{}_n$ (IS, W).

In the encrypting-grouping device 2201 the corresponding plaintext block of length N X that arrives through input 2210, which is an extension of input 3011, the corresponding transformer block WT that arrives through input 2211, which is an extension of output 3422, and the fifty-two encryption control subblocks $Z_1$ to $Z_{52}$ that arrive through input 2212, which is an extension of input 1413, are grouped and generate the corresponding randomised-encrypted text block of length N A of length N=64 bits through output 2213, which extends to output 3012.

Figure 35:
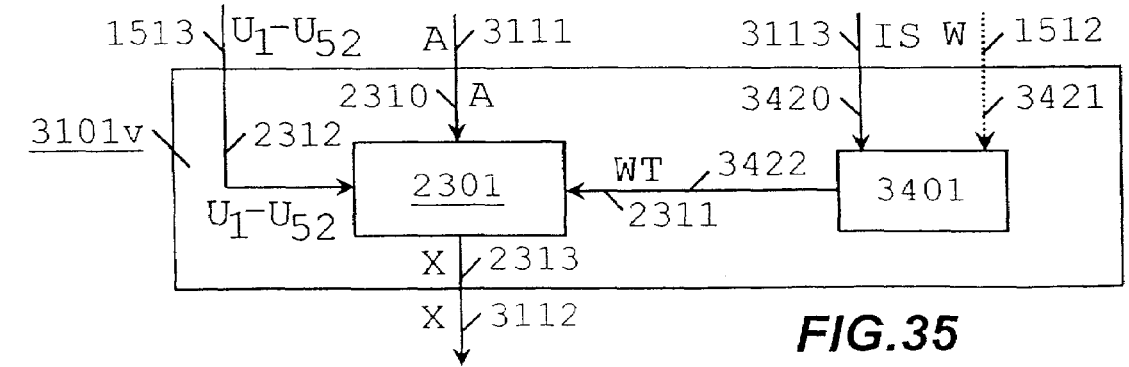
FIG. 35 shows block connection diagram of the by-index corrector decrypting device variation of block of length N in FIG. 33 for the decryption of the randomised-encrypted text blocks, which have been generated with the by-index corrector randomising-encrypting device variation of block of length N in FIG. 34.

FIG. 35 shows possible diagram of variation of the by-index corrector decrypting device of block of length N in FIG. 33 for the decryption of randomised-encrypted text blocks by making use of the device in FIG. 34. In FIG. 35, common parts corresponding to parts of FIG. 23, FIG. 31 and FIG. 34 make use of the same references.

The difference between the by-index corrector decrypting device of block of length N 3101 and its variation is the replacement of the by-index corrector refed generator of transformer block 3201 by the by-index corrector autonomous generator of transformer block 3401.

The by-index corrector autonomous generator of transformer block 3401 receives through input 3420, which is connected to input 3113, the selected index IS, and through input 3421, which is connected to input 1512, the initiator control subblock of length G W, and results in the corresponding transformer block WT through output 3422. The by-index corrector autonomous generator of transformer block 3401 carries out the same implementation, that is same function $F^{31}$, as the by-index corrector autonomous generator of transformer block 3401 of the device in FIG. 34, with which the randomised-encrypted text sequence $\underline{A}$ object of the decryption was randomised-encrypted.

TABLE 8 shows the different values taken by transformer block WT for the different consecutive randomised-encrypted text blocks of length N A that are assembled from the randomised-encrypted text sequence $\underline{A}$.

TABLE 8

VALUES TAKEN BY WT

| Order of the randomised-encrypted text block that is decrypted | Randomised-encrypted text block that is decrypted | Value of WT |
|---|---|---|
| First | $A_1$ | $F^{31}{}_1$(initial IS, W) |
| Second | $A_2$ | $F^{31}{}_2$(extracted IS, W) |
| ... | ... | ... |
| N | $A_n$ | $F^{31}{}_n$(extracted IS, W) |

The corresponding randomised-encrypted text block of length N A reaches the decrypting-grouping device 2301 through input 2310, which is an extension of input 3111, in which it is grouped together with the fifty-two decryption control subblocks $U_1$ to $U_{52}$ received through input 2312, which is an extension of input 1513, and the corresponding transformer block WT received through input 2311, which is an extension of output 3422, and results in the corresponding plaintext block of length N X of length N=64 bits through output 2313, which extends to output 3112.

INDUSTRIAL APPLICATIONS

This invention is specially applicable in secret communication, maintenance of confidentiality of information, electronic commerce transactions, electronic mail communications and alike.

The specific implementation of the invention can be performed in many different ways and can depend on several factors like their application, the environment, the available and used technology, etcetera. A software implementation executed on electronic computers is possible. On the other hand, a hardware implementation can be possible where the elemental logic functions are in form of independent circuit units that can be built using discrete ship elements of preferably of several module of very large scale integration (VLSI); microprocessors using "Read Only Memory" (ROM), or "Programmable Read Only Memory" (PROM), or "Electronically Erasable Read Only Memory" (EEROM) among many possible implementations. The hardware implementation has the advantage over the software implementation than can work substantially faster.

As a complement to the previous description of the figures of this memory, and with the aim of facilitating its understanding and preferred implementations reading, it is included the enumeration of figure relevant elements in join with its designated name used in the memory:

$\underline{A}$ Randomised-encrypted text sequence
A Randomised-encrypted text block of length N
AP Suggested randomised-encrypted text sequence
E Signature correspondence notification
IS Selected index
~K Control block K discovering attempt
K Control block or encryption key
KC Candidate control block
KI By index control block
R Randomness external test result
S Decrypted interblock of length N
T Randomness verification result
$U_1$-$U_{52}$, Fifty-two decryption control subblocks $U_1$-$U_{52}$
V Grouped interblock of length N
W Initiatory control subblock of length G
WT Transformer block
$\underline{X}$ Plaintext sequence
~$\underline{X}$ Plaintext sequence discovering attempt
X Plaintext block of length N
X1,X2,X3,X4 Plaintext subblocks of length M
XD Decrypted text sequence
XI By index modified plaintext sequence
XF Signed plaintext sequence
XM Modified signed plaintext sequence
XP Suggested plaintext sequence
$\underline{Y}$ Ciphertext sequence
Y Ciphertext block of length N
Y1,Y2,Y3,Y4 Ciphertext subblocks of length M
Z Control block or encryption key
$Z_1$-$Z_{52}$ Fifty-two encryption control subblocks $Z_1$-$Z_{52}$ 101 Message source
102 Randomising-encrypting device
103 Key source
104 Decrypting device
105 Target
106 Randomness analyzer
107 Enemy cryptanalyst
111 Plaintext sequence supplying channel
112 Control block supplying channel
113 Transmission channel
114 Decrypted text sequence supplying channel
115 Control block secure supplying channel
201 Block encrypting device
202 Encryption control subblock generator
204 Block encrypting-decrypting device
301 Input assembly device of block of length N
302 Output unit of block of length N
401 Block decrypting device
402 Decryption control subblock generator
501 Self-corrector randomising-encrypting device
501v1 Self-corrector randomising-encrypting device variation
501v2 Self-corrector randomising-encrypting device variation
501v3 Self-corrector randomising-encrypting device variation
501v4 Self-corrector randomising-encrypting device variation
501v5 Self-corrector randomising-encrypting device variation
501v6 Self-corrector randomising-encrypting device variation
502 Self-corrector decrypting device
502v1 Self-corrector decrypting device variation
502v2 Self-corrector decrypting device variation
502v3 Self-corrector decrypting device variation
502v4 Self-corrector decrypting device variation
502v5 Self-corrector decrypting device variation
502v6 Self-corrector decrypting device variation
503 Randomness checker
511 Plaintext sequence supplying channel
512 Control block supplying channel
513 Transmission channel
514 Decrypted text sequence supplying channel
515 Control block secure supplying channel
601 Signature generating-assembly device
602 By-trial sequence input corrector
603 Randomness verifier
701 By-trial sequence output corrector
702 Signature verifier
801 Candidate control block generator
1001 Corrector randomising-encrypting device of sequence
1101 Corrector decrypting device of sequence
1201 Corrector randomising-encrypting device of block of length N
1201v Corrector randomising-encrypting device of block of length N variation
1301 Corrector decrypting device of block of length N
1301v Corrector decrypting device of block of length N variation
1401 Randomisation-encryption control subblock generator
1401v Randomisation-encryption control subblock generator variation
1402 Control block divider
1501 Decryption control subblock generator
1501v Decryption control subblock generator variation
1801 By-trial corrector refed generator of transformer block
1901 Withholding unit of block of length N
2001 By-trial corrector autonomous generator of transformer block
2201 Encrypting-grouping device
2202 Grouping device
2301 Decrypting-grouping device
2401 By-index sequence input corrector
2402 Selected index generator
2501 By-index sequence output corrector
2601 Index and plaintext sequence input supplier
2602 By-index control block generator
2701 Index and plaintext sequence output supplier
2801 By-index corrector randomising-encrypting device of sequence
2901 By-index corrector decrypting device of sequence
3001 Index and block of length N input assembly device
3002 By-index corrector randomising-encrypting device of block of length N
3002v By-index corrector randomising-encrypting device of block of length N variation
3101 By-index corrector decrypting device of block of length N
3101v By-index corrector decrypting device of block of length N variation
3102 Index and block of length N output assembly device
3201 By-index corrector refed generator of transformer block
3401 By-index corrector autonomous generator of transformer block

The invention claimed is:

1. Data sequence self-corrector randomisation-encryption system (501) for generating an encrypted and random sequence from a plaintext sequence ($\underline{X}$) by the use of a freely selectable encryption key (K) comprising:

first input means (511) for receiving said plaintext sequence ($\underline{X}$), second input means (512) for receiving said encryption key (K), corrective randomising-encrypting means for correctively randomising-encrypting said plaintext sequence ($\underline{X}$) with said encryption key (K) generating a candidate randomised-encrypted text sequence (AP), and for generating on the basis of a randomness verification result (T) a new candidate randomised-encrypted text sequence (AP), randomness verifying means (603) for verifying randomness of said candidate randomised-encrypted text sequence (AP) based on a predetermined randomness test and supplying said randomness verification result (T) in order to generate said new candidate randomised-encrypted text sequence (AP), and supplying said candidate randomised-encrypted text sequence (AP) as randomised-encrypted text sequence ($\underline{A}$) if said randomness test indicates that said candidate randomised-encrypted text sequence (AP) is random, transmission means (513) for transmitting said randomised-encrypted text sequence ($\underline{A}$), whereby said randomised-encrypted text sequence ($\underline{A}$) corresponds to said plaintext sequence ($\underline{X}$) received by said first input means (511), whereby said randomized-encrypted text sequence (A) is encrypted, and whereby the confusion and diffusion of values of said randomised-encrypted text sequence ($\underline{A}$) is ensured.

2. The system of claim 1 wherein said corrective randomising-encrypting means include signature generating-assembly means (601) for generating with said plaintext sequence ($\underline{X}$) signature from said plaintext sequence (X) and assembling said signature to said plaintext sequence (X), making up signed plaintext sequence (XF), by-trial input corrector means of sequence (602) for correcting said signed plaintext sequence (XF) resulting in modified signed plaintext sequence (XM), and generating new said modified signed plaintext sequence (XM) with said randomness verification result (T), randomising-encrypting means (102) for randomising-encrypting with said encryption key (K) said modified signed plaintext sequence (XM) generating said candidate randomised-encrypted text sequence (AP), whereby the system is arranged to adapt said plaintext sequence (X) in order to maximise confusion and diffusion of values in said randomised-encrypted text sequence (A).

3. The system of claim 2, further including self-corrector decrypting device (502) that by making use of said encryption key (K) with said randomised-encrypted text sequence (A) generates said plaintext sequence (X) comprising:

first input means of self-corrector decrypting device (513) for receiving said randomised-encrypted text sequence (A), second input means of self-corrector decrypting device (515) for receiving said control block (K), decrypting means (104) for decrypting with said encryption key (K) said randomised-encrypted text sequence (A) generating decrypted text sequence (XD), by-trial output corrector means of sequence (701) for correcting said decrypted text sequence (XD) resulting in suggested plaintext sequence (XP), and generating with signature correspondence notification (E) new said suggested plaintext sequence (XP), signature verifying means (702) for generating generated signature with included plaintext sequence segment in said suggested plaintext sequence (XP) and verifying correspondence of said generated signature with included signature in said suggested plaintext sequence (XP) supplying said signature correspondence notification (E), and for supplying said included plaintext sequence segment in said suggested plaintext sequence (XP) as said plaintext sequence (X) if said generated signature corresponds to said included signature, whereby said plaintext sequence (X) corresponds to said randomised-encrypted text sequence (A) received by said first input means of self-corrector decrypting device (513).

4. The system of claim 3 wherein said by-trial input corrector means of sequence (602) are implemented in order to correct said signed plaintext sequence (XF) by means of function $F^1$ (said signed plaintext sequence (XF)), said by-trial output corrector means of sequence (701) are implemented in order to correct said decrypted text sequence (XD) by means of function $F^2$ (said decrypted text sequence (XD)), and said by-trial input corrector means of sequence (602) implement said function $F^1$ (said signed plaintext sequence (XF)) as $F^{1'}(XL) = b_{L-2}, \ldots, b_0, \square\, b_{L-1}$, wherein said XL subblock $b_{L-1}, b_{L-2}, \ldots, b_0$ of length L of sequence selected from the group consisting of said signed plaintext sequence (XF) and previous said modified signed plaintext sequence (XM), said L value preferably smaller than length selected from the group consisting of length of said modified signed plaintext sequence (XM) and length of said signed plaintext sequence (XF), said by-trial output corrector means of sequence (701) implement said function $F^2$ (said decrypted text sequence (XD)) as $F^{2'}(XG) = \square\, b_0, b_{L-1}, \ldots, b_1$, wherein said XG subblock $b_{L-1}, \ldots, b_1, b_0$ of length said L of sequence selected from the group consisting of said decrypted text sequence (XD) and previous said suggested plaintext sequence (XP), said complementary bit operation, said $b_i$, wherein said I takes the values from 0 to L−1, is bit of order said I of respective said subblocks of length said L.

5. The system of claim 1 wherein said corrective randomising-encrypting means include candidate encryption key generating means (801) for generating with said encryption key (K) candidate encryption key (KC), and for generating with said randomness verification result (T) new said candidate encryption key (KC), signature generating-assembly means (601) for generating with said plaintext sequence (X)

signature from said plaintext sequence (X) and assembling said signature to said plaintext sequence (X), making up signed plaintext sequence (XF), randomising-encrypting means (102) for randomising-encrypting with said candidate encryption key (KC) said signed plaintext sequence (XF) generating said candidate randomised-encrypted text sequence (AP), whereby the system is arranged to adapt said candidate encryption key (KC) in order to maximise confusion and diffusion of values in said randomised-encrypted text sequence (A).

6. The system of claim 5, further including self-corrector decrypting device (502) that by making use of said encryption key (K) with said randomised-encrypted text sequence (A) generates said plaintext sequence (X) comprising:

first input means of self-corrector decrypting device (513) for receiving said randomised-encrypted text sequence (A), second input means of self-corrector decrypting device (515) for receiving said control block (K), said candidate encryption key generating means (801) for generating with said control block (K) said candidate encryption key (KC), and for generating with signature correspondence notification (E) new said candidate encryption key (KC), decrypting means (104) for decrypting with said candidate encryption key (KC) said randomised-encrypted text sequence (A) generating suggested plaintext sequence (XP), signature verifying means (702) for generating generated signature with included plaintext sequence segment in said suggested plaintext sequence (XP) and verifying correspondence of said generated signature with included signature in said suggested plaintext sequence (XP) supplying said signature correspondence notification (E), and for supplying said included plaintext sequence segment in said suggested plaintext sequence (XP) as said plaintext sequence (X) if said generated signature corresponds to said included signature, whereby said plaintext sequence (X) corresponds to said randomised-encrypted text sequence (A) received by said first input means of self-corrector decrypting device (513).

7. The system of claim 6 wherein said candidate encryption key generating means (801) are implemented in order to generate said candidate encryption key (KC) by means of function $F^3$ (said encryption key (K)), and said candidate encryption key generating means (801) implement said function $F^3$ (said encryption key (K)) as function $F^4$ (CR, said encryption key (K))=$F^5{}_n$ (said encryption key (K)) for said n of value said CR, wherein said CR selected from the group consisting of counter of said randomness verification result (T) and counter of said signature correspondence notification (E), and said $F^5{}_n$ (said encryption key (K)) implemented as said encryption key (K) for said CR of initial value, and as $F^5$ ($F^5{}_{n-1}$ (said encryption key (K))), wherein said $F^5{}_n$ (said encryption key (K))=union of $F^6{}_n$ (Ki)=union of (($F^6{}_{n-1}$ (Ki) oper+/−B) mod $2^{Qi}$), wherein said Qi value preferably smaller than length of said encryption key (K), said Ki subblock of order said I of said encryption key (K) and of length said Qi, said B value, and said oper+/− arithmetic operation.

8. The system of claim 1 wherein said corrective randomising-encrypting means include randomisation-encryption control subblock generating means (1401) for generating with said encryption key (K) plurality of encryption control subblocks ($Z_1$-$Z_{52}$) and, optionally, initiatory control subblock of length G (W), signature generating-assembly means (601) for generating with said plaintext sequence (X) signature from said plaintext sequence (X) and assembling said signature to said plaintext sequence (X), making up signed plaintext sequence (XF), input assembly means of block of length N (301) for assembling from said signed plaintext sequence (XF) multitude of plaintext blocks of length N (X), by-trial corrector generating means of transformer block (1801; 2001) for generating optionally with said initiatory control subblock of length G (W) multitude of transformer blocks (WT), and for generating with said randomness verification result (T) new said multitude of transformer blocks (WT), grouping means (2202) for grouping said plaintext block of length N (X) with said transformer block (WT) generating grouped interblock of length N (V), encrypting-decrypting means (204) for encrypting with said plurality of encryption control subblocks ($Z_1$-$Z_{52}$) said grouped interblock of length N (V) and resulting in randomised-encrypted text block of length N (A), multitude of said randomised-encrypted text block of length N (A) make up said candidate randomised-encrypted text sequence (AP), whereby the system is arranged to self-adapt in order to maximise confusion and diffusion of values in said randomised-encrypted text sequence (A).

9. The system of claim 8, further including self-corrector decrypting device (502) that by making use of said encryption key (K) with said randomised-encrypted text sequence (A) generates said plaintext sequence (X) comprising:

first input means of self-corrector decrypting device (513) for receiving said randomised-encrypted text sequence (A), second input means of self-corrector decrypting device (515) for receiving said encryption key (K), decryption control subblock generating means (1501) for generating with said encryption key (K) plurality of decryption control subblocks ($U_1$-$U_{52}$) and, optionally, said initiatory control subblock of length G (W), said by-trial corrector generating means of transformer block (1801; 2001) for generating optionally with said initiatory control subblock of length G (W) said multitude of transformer blocks (WT), and for generating with signature correspondence notification (E) said new said multitude of transformer blocks (WT), said input assembly means of block of length N (301) for assembling from said randomised-encrypted text sequence (A) multitude of randomised-encrypted text blocks of length N (A), said encrypting-decrypting means (204) for decrypting with said plurality of decryption control subblocks ($U_1$-$U_{52}$) said randomised-encrypted text block of length N (A) resulting in decrypted interblock of length N (S), said grouping means (2202) for grouping said decrypted interblock of length N (S) with said transformer block (WT) generating plaintext block of length N (X), multitude of said plaintext block of length N (X) make up suggested plaintext sequence (XP), signature verifying means (702) for generating generated signature with included plaintext sequence segment in said suggested plaintext sequence (XP) and verifying correspondence of said generated signature with included signature in said suggested plaintext sequence (XP) supplying said signature correspondence notification (E); and for supplying said included plaintext sequence segment in said suggested plaintext sequence (XP) as said plaintext sequence (X) if said generated signature corresponds to said included signature, whereby said plaintext sequence (X) corresponds to said randomised-encrypted text sequence (A) received by said first input means of self-corrector decrypting device (513).

10. The system of claim 9 wherein said by-trial corrector generating means of transformer block (1801; 2001) are implemented in order to generate nth said transformer block (WT) of said multitude of transformer blocks (WT) by means of function $F^8$ (said initiatory control subblock of length G (W), nth minus one said randomised-encrypted text block of length N (A)), and said grouping means (2202) include exclusive-OR operation, and said by-trial corrector generating means of transformer block (1801; 2001) implement said function $F^8$ (said initiatory control subblock of length G (W), nth minus one said randomised-encrypted text block of length N (A)) as for first said transformer block (WT) equal to said initiatory control subblock of length G (W), and for said nth said transformer block (WT) as (said nth minus one said randomised-encrypted text block of length N (A) oper+/−CR) mod $2^N$, wherein said CR selected from the group consisting of counter of said randomness verification result (T) and counter of said signature correspondence notification (E), said oper+/− arithmetic operation.

11. The system of claim 9 wherein said by-trial corrector generating means of transformer block (1801; 2001) are implemented in order to generate said multitude of transformer blocks (WT) by means of function $F^{14}$ (said initiatory control subblock of length G (W)), and said grouping means (2202) include exclusive-OR operation, and said by-trial corrector generating means of transformer block (1801; 2001) implement said function $F^{14}$ (said initiatory control subblock of length G (W)) for nth said transformer block (WT) as $F^{15}{}_n$ (CR, said initiatory control subblock of length G (W)), wherein said CR selected from the group consisting of counter of said randomness verification result (T) and counter of said signature correspondence notification (E), and said n takes the value of nth, and said by-trial corrector generating means of transformer block (1801; 2001) implement said function $F^{15}{}_n$ (CR, said initiatory control subblock of length G (W)) as union of $F^{16}{}_n$ (said CR, Wi)=union of (($F^{16}{}_{n-1}$ (said CR, Wi) oper+/− said CR) mod $2^{Qi}$), wherein said Qi value preferably smaller than length of said initiatory control subblock of length G (W), said Wi subblock of order said I of said initiatory control subblock of length G (W) and of length said Qi, and said oper+/− arithmetic operation.

12. The system of claim 1 wherein said corrective randomising-encrypting means include selected index generating means (2402) for generating selected index (IS) and for generating with said randomness verification result (T) new said selected index (IS), by-index input corrector means of sequence (2401) for correcting said plaintext sequence (X) according to said selected index (IS) supplying by-index modified plaintext sequence (XI), randomising-encrypting means (102) for randomising-encrypting with said encryption key (K) said selected index (IS) and said by-index modified plaintext sequence (XI), generating said candidate randomised-encrypted text sequence (AP), whereby the system is arranged to adapt said plaintext sequence (X) in order to maximise confusion and diffusion of values in said randomised-encrypted text sequence (A).

13. The system of claim 12, further including self-corrector decrypting device (502) that by making use of said encryption key (K) with said randomised-encrypted text sequence (A) generates said plaintext sequence (X) comprising:

first input means of self-corrector decrypting device (513) for receiving said randomised-encrypted text sequence (A), second input means of self-corrector decrypting device (515) for receiving said control block (K), decrypting means (104) for decrypting with said encryption key (K) said randomised-encrypted text sequence (A) generating extracted selected index (IS) and decrypted plaintext sequence (XD), by-index output corrector means of sequence (2501) for correcting said decrypted plaintext sequence (XD) according to said extracted selected index (IS), resulting in said plaintext sequence (X), whereby said plaintext sequence (X) corresponds to said randomised-encrypted text sequence (A) received by said first input means of self-corrector decrypting device (513).

14. The system of claim 13 wherein said by-index input corrector means of sequence (2401) are implemented in order to correct said plaintext sequence (X) by means of function $F^{17}$ (said selected index (IS), said plaintext sequence (X)), and said by-index output corrector means of sequence (2501) are implemented in order to correct said decrypted plaintext sequence (XD) by means of function $F^{19}$ (said extracted selected index (IS), said decrypted plaintext sequence (XD)), and said by-index input corrector means of sequence (2401) implement said function $F^{17}$ (said selected index (IS), said plaintext sequence (X)) as $F^{17'}$ (said selected index (IS), XL)=(XL XOR said selected index (IS)), wherein said XL subblock of length L of sequence selected from the group consisting of said plaintext sequence (X) and previous said by-index modified plaintext sequence (XI), said L value preferably smaller than length selected from the group consisting of length of said plaintext sequence (X) and length of said by-index modified plaintext sequence (XI), and said by-index output corrector means of sequence (2501) implement said function $F^{19}$ (said extracted selected index (IS), said decrypted plaintext sequence (XD)) as $F^{19'}$ (said extracted selected index (IS), XG)=(XG XOR said extracted selected index (IS)), wherein said XG subblock of length said L of said decrypted plaintext sequence (XD).

15. The system of claim 1 wherein said corrective randomising-encrypting means include selected index generating means (2402) for generating initial selected index (IS) and for generating with said randomness verification result (T) alternative selected index (IS), by-index encryption key generating means (2602) for generating with said encryption key (K) and said initial selected index (IS) initial by-index control block (KI), and for generating alternative by-index control block (KI) according to said alternative selected index (IS), randomising-encrypting means (102) for randomising-encrypting said alternative selected index (IS) with said initial by-index control block (KI) and said plaintext sequence (IX) with said alternative by-index control block (KI) generating said candidate randomised-encrypted text sequence (AP), whereby the system is arranged to adapt said alternative by-index control block (KI) in order to maximise confusion and diffusion of values in said randomised-encrypted text sequence (A).

16. The system of claim 15, further including self-corrector decrypting device (502) that by making use of said encryption key (K) with said randomised-encrypted text sequence (A) generates said plaintext sequence (X) comprising:

first input means of self-corrector decrypting device (513) for receiving said randomised-encrypted text sequence (A), second input means of self-corrector decrypting device (515) for receiving said control block (K), said by-index control block generating means (2602) for generating with said control block (K) said initial by-index control block (KI) and for generating with extracted alternative selected index (IS) said alternative by-index control block (KI), decrypting means (104) for decrypting said randomised-encrypted text sequence (A) and, with said initial by-index control block (KI) resulting in said extracted alternative selected index (IS) and, with said alternative by-index control block (KI) resulting in said plaintext sequence (X), whereby said plaintext sequence (X) corresponds to said randomised-encrypted text sequence (A) received by said first input means of self-corrector decrypting device (513).

17. The system of claim 16 wherein said by-index control block generating means (2602) are implemented in order to generate said initial by-index control block (KI) and said alternative by-index control block (KI) by means of function $F^{21}$ (IS, said encryption key (K)), wherein said IS is index selected from the group consisting of said initial selected index (IS) and said alternative selected index (IS) and said extracted alternative selected index (IS), and said by-index control block generating means (2602) implement said function $F^{21}$ (IS, said encryption key (K)) as union of $F^{24}$ (said IS, Kj)=union of ((Kj oper+/− said IS) mod $2^{Qj}$), wherein said Qj value preferably smaller than length of said encryption key (K), said Kj subblock of order said j of said encryption key (K) and of length said Qj, and said oper+/− arithmetic operation.

18. The system of claim 1 wherein said corrective randomising-encrypting means include
   randomisation-encryption control subblock generating means (1401) for generating with said encryption key (K) plurality of encryption control subblocks ($Z_1$-$Z_{52}$) and, optionally, generate initiatory control subblock of length G (W),
      selected index generating means (2402) for generating selected index (IS), and for generating with said randomness verification result (T) new said selected index (IS),
      input assembly means of block of length N (301) for assembling from said plaintext sequence (X) multitude of plaintext blocks of length N (X),
      by-index corrector generating means of transformer block (3201; 3401) for generating with said selected index (IS) and optionally with said initiatory control subblock of length G (W) multitude of transformer blocks (WT), and for generating with said new said selected index (IS) new said multitude of transformer blocks (WT),
      grouping means (2202) for grouping said plaintext block of length N (X) with said transformer block (WT) generating grouped interblock of length N (V),
      encrypting-decrypting means (204) for encrypting with said plurality of encryption control subblocks ($Z_1$-$Z_{52}$) said grouped interblock of length N (V) and resulting in randomised-encrypted text block of length N (A), multitude of said randomised-encrypted text block of length N (A) make up said candidate randomised-encrypted text sequence (AP),
      whereby the system is arranged to self-adapt in order to maximise confusion and diffusion of values in said randomised-encrypted text sequence (A).

19. The system of claim 18, further including self-corrector decrypting device (502) that by making use of said encryption key (K) with said randomised-encrypted text sequence (A) generates said plaintext sequence (X) comprising:
   first input means of self-corrector decrypting device (513) for receiving said randomised-encrypted text sequence (A),
   second input means of self-corrector decrypting device (515) for receiving said encryption key (K),
   decryption control subblock generating means (1501) for generating with said encryption key (K) plurality of decryption control subblocks ($U_1$-$U_{52}$) and, optionally, said initiatory control subblock of length G (W),
   said by-index corrector generating means of transformer block (3201; 3401) for generating optionally with said initiatory control subblock of length G (W) first multitude of transformer blocks (WT), and for generating with extracted selected index (IS) second multitude of transformer blocks (WT),
   said input assembly means of block of length N (301) for assembling from said randomised-encrypted text sequence (A) multitude of randomised-encrypted text blocks of length N (A),
   said encrypting-decrypting means (204) for decrypting with said plurality of decryption control subblocks ($U_1$-$U_{52}$) said randomised-encrypted text block of length N (A) resulting in decrypted interblock of length N (S),
   said grouping means (2202) for grouping first multitude of said decrypted interblock of length N (S) with said first multitude of transformer blocks (WT) generating said extracted selected index (IS), and for grouping second multitude of transformer blocks (WT) with second multitude of said decrypted interblocks of length N (S) generating multitude of plaintext blocks of length N (X), said multitude of plaintext blocks of length N (X) make up said plaintext sequence (X),
   whereby said plaintext sequence (X) corresponds to said randomised-encrypted text sequence (A) received by said first input means of self-corrector decrypting device (513).

20. The system of claim 19 wherein said by-index corrector generating means of transformer block (3201; 3401) are implemented in order to generate from said multitude of transformer blocks (WT) nth transformer block (WT) by means of function $F^{25}$ (IS, said initiatory control subblock of length G (W), nth minus one said randomised-encrypted text block of length N (A)), wherein said IS index selected from the group consisting of said initial selected index (IS) and said alternative selected index (IS) and said extracted selected index (IS), and
   said grouping means (2202) include exclusive-OR operation, and
   said by-index corrector generating means of transformer block (3201; 3401) implement said function $F^{25}$ (IS, said initiatory control subblock of length G (W), nth minus one said randomised-encrypted text block of length N (A)) as $F^{27}_n$ (said IS, said initiatory control subblock of length G (W)) XOR said nth minus one said randomised-encrypted text block of length N (A), wherein said n acquires the value of nth, and
   said by-index corrector generating means of transformer block (3201; 3401) implement said function $F^{27}_n$ (said IS, said initiatory control subblock of length G (W)) including hash function.

21. The system of claim 19 wherein said by-index corrector generating means of transformer block (3201; 3401) are implemented in order to generate said multitude of transformer blocks (WT) by means of function $F^{31}$ (IS, said initiatory control subblock of length G (W)), wherein said IS index selected from the group consisting of said initial selected index (IS) and said alternative selected index (IS) and said extracted selected index (IS), and
   said grouping means (2202) include exclusive-OR operation, and
   said by-index corrector generating means of transformer block (3201; 3401) implement said function $F^{31}$ (IS, said initiatory control subblock of length G (W)) in order to generate nth said transformer block (WT) as union of $F^{32}_n$ (said IS, Wi)=union of (($F^{32}_{n-1}$ (said IS, Wi) oper+/− said IS) mod $2^{Qi}$), wherein said Qi value preferably smaller than length of said initiatory control subblock of length G (W), said Wi subblock of order said I of said initiatory control subblock of length G (W) and of length said Qi, said oper+/− arithmetic operation, and said n takes the value of nth.

22. The system of claim 3, further including
   predetermined first length sequence dividing means for dividing said plaintext sequence (X) into multitude of plaintext subsequences of predetermined first length supplying each said plaintext subsequence to said self-corrector randomisation-encryption system (501), and
   randomised-encrypted text sequence dividing means of predetermined second length for dividing said randomised-encrypted text sequence (A) into multitude of randomised-encrypted text subsequences of predetermined second length supplying each said randomised-encrypted text subsequence to said self-corrector decrypting device (502).

23. The system of claim 22 wherein said randomness verifying means (603) verify randomness of said candidate randomised-encrypted text sequence (AP) implementing randomness test wherein said randomness test includes dividing said candidate randomised-encrypted text sequence (AP) into 20000 bit subblocks and checking monobit test, poker test, runs test and long run test with each said 20000 bit subblock, wherein said monobit test includes verifying that 9.654<number of value 1 bits<10.346, wherein said poker test includes dividing said 20000 bit subblock into 5000 4 bit segments, and calculating $X=(16/5000)*(\Sigma[f(I)^2])-5000$, wherein said I value from 0 to 15 and said f(I) number of value I segments, and verifying that 1.03<X<57.4, wherein said runs test includes counting the number of runs of bits 0s and 1s of said 20000 bit subblock, wherein said runs number of consecutive bits of the same value, and verifying that 2.267<=runs of 1<=2.733, 1079 runs of 2<=1421, 502<=runs of 3<=748, 223<=runs of 4<=402, 90<=runs of 5<=223, 90<=runs of 6<=223, wherein said long run test includes verifying that there is no said runs of length 34 or more.

24. Data sequence self-corrector randomisation-encryption method (501) for generating an encrypted and random sequence from a plaintext sequence (X) by the use of a freely selectable encryption key (K) comprising the steps of:

(a) correctively randomising-encrypting said plaintext sequence (X) with said encryption key (K) and generating candidate randomised-encrypted text sequence (AP), (b) verifying randomness of said candidate randomised-encrypted text sequence (AP) based on a predetermined randomness test and repeating said step (a) as many times as necessary until said candidate randomised-encrypted text sequence (AP) is at random, being supplied said candidate randomised-encrypted text sequence (AP) as randomised-encrypted text sequence (A) when said randomness test indicates that said candidate randomised-encrypted text sequence (AP) is random, (c) transmitting said randomised-encrypted text sequence (A) via a transmission channel (513), whereby said randomised-encrypted text sequence (A) corresponds to said plaintext sequence (X), whereby said randomized-encrypted text sequence (A) is encrypted, whereby the confusion and diffusion of values of said randomised-encrypted text sequence (A) is ensured.

25. The method of claim 24 wherein said step (a) of correctively randomising-encrypting said plaintext sequence (X) with said encryption key (K) includes the steps of:

(d) generating signature from said plaintext sequence (X) and assembling said signature to said plaintext sequence (X) and making up signed plaintext sequence (XF), (e) correcting said signed plaintext sequence (XF) resulting in modified signed plaintext sequence (XM), (f) providing randomising-encrypting means (102) that with said encryption key (K) randomise-encrypt said modified signed plaintext sequence (XM) and generate said candidate randomised-encrypted text sequence (AP), whereby the method is arranged to adapt said plaintext sequence (X) in order to maximise confusion and diffusion of values in said randomised-encrypted text sequence (A).

26. The method of claim 25, further including self-correcting decrypting steps that by making use of said encryption key (K) with said randomised-encrypted text sequence (A) generate said plaintext sequence (X) comprising:

(g) providing decrypting means (104) that with said encryption key (K) decrypt said randomised-encrypted text sequence (A) and generate decrypted text sequence (XD), (h) correcting said decrypted text sequence (XD) and resulting in suggested plaintext sequence (XP), (I) generating generated signature of included plaintext sequence segment in said suggested plaintext sequence (XP) and repeating said step (h) as many times as necessary until said generated signature corresponds to included signature in said suggested plaintext sequence (XP), and supplying said included plaintext sequence segment in said suggested plaintext sequence (XP) as said plaintext sequence (X) when said generated signature corresponds to said included signature, whereby said plaintext sequence (X) corresponds to said randomised-encrypted text sequence (A).

27. The method of claim 26 wherein said step (e) in order to correct said signed plaintext sequence (XF) makes use of function $F^1$ (said signed plaintext sequence (XF)), said step (h) in order to correct said decrypted text sequence (XD) makes use of function $F^2$ (said decrypted text sequence (XD)), and said step (e) implements said function $F^1$ (said signed plaintext sequence (XF)) as $F^{1'}$ (XL,CR)=union of ((XLj oper+/−CR) mod 2%), wherein said XL subblock of length L of sequence selected from the group consisting of said signed plaintext sequence (XF) and previous said modified signed plaintext sequence (XM), said L value preferably smaller than length selected from the group consisting of length of said modified signed plaintext sequence (XM) and length of said signed plaintext sequence (XF), said CR number of repetitions of said steps (e) and (f), said oper+/− arithmetic operation, and said XLj subblock of order said j of said XL and of length said Qj, said step (h) implements said function $F^2$ (said decrypted text sequence (XD)) as $F^{2'}$ (XG,CD)=union of ((XGk oper−/+ CD) mod $2^{Qi}$), wherein said XG subblock of length said L of sequence selected from the group consisting of said decrypted text sequence (XD) and previous said suggested plaintext sequence (XP), said CD number of repetitions of said step (h), said oper−/+ reverse arithmetic operation to said oper+/−, said XGk subblock of order said k of said XG and of length said Qj, said Qj value preferably smaller than said L.

28. The method of claim 24 wherein said step (a) of correctively randomising-encrypting said plaintext sequence (X) with said encryption key (K) includes the steps of:

(d) generating signature from said plaintext sequence (X) and assembling said signature to said plaintext sequence (X) and resulting in signed plaintext sequence (XF), (e) generating with said encryption key (K) candidate control block (KC), (f) providing randomising-encrypting means (102) that with said candidate control block (KC) randomise-encrypt said signed plaintext sequence (XF) and generate said candidate randomised-encrypted text sequence (AP), whereby the method is arranged to adapt said candidate control block (KC) in order to maximise confusion and diffusion of values in said randomised-encrypted text sequence (A).

29. The method of claim 28, further including self-correcting decrypting steps that by making use of said encryption key (K) with said randomised-encrypted text sequence (A) generate said plaintext sequence (X) comprising:

(g) said step (e) of generating with said encryption key (K) said candidate control block (KC), (h) providing decrypting means (104) that with said candidate control block (KC) decrypt said randomised-encrypted text sequence (A) and generate suggested plaintext sequence (XP), (I) generating generated signature of included plaintext sequence segment in said suggested plaintext sequence (XP) and repeating said steps (g) and (h) as many times as necessary until said generated signature corresponds to included signature in said suggested plaintext sequence (XP), and supplying said included plaintext sequence segment in said suggested plaintext sequence (XP) as said plaintext sequence (X) when said generated signature corresponds to said included signature, whereby said plaintext sequence (X) corresponds to said randomised-encrypted text sequence (A).

30. The method of claim 29 wherein said step (e) in order to generate said candidate control block (KC) makes use of function $F^3$ (said encryption key (K)), and said step (e) implements said function $F^3$ (said encryption key (K)) as function $F^4$(CR, said control block encryption key (K)), wherein said CR selected from the group consisting of number of repetitions of said steps (e) and (f) and number of repetitions of said steps (g) and (h), and said function $F^4$(CR, said encryption key (K))= union of $F^7$ (said CR, Ki)=union of ((Ki oper+/− said CR) mod $2^{Qi}$), wherein said Qi value preferably smaller than length of said encryption key (K), said Ki subblock of order said I of said encryption key (K) and of length said Qi, and said oper+/− arithmetic operation.

31. The method of claim 24 wherein said step (a) of correctively randomising-encrypting said plaintext sequence (X) with said encryption key (K) includes the steps of:

(d) generating signature from said plaintext sequence (X) and assembling said signature to said plaintext sequence (X) making up signed plaintext sequence (XF), (e) generating with said encryption key (K) plurality of encryption control subblocks ($Z_1$-$Z_{52}$)

and, optionally, initiatory control subblock of length G (W), (f) assembling said signed plaintext sequence (XF) into multitude of plaintext blocks of length N (X), (g) correctly generating multitude of transformer blocks (WT) optionally with said initiatory control subblock of length G (W), (h) grouping each said plaintext block of length N (X) with corresponding said transformer block (WT) and generating grouped interblock of length N (V), (I) providing encrypting-decrypting means (204) that with said plurality of encryption control subblocks ($Z_1$-$Z_{52}$) encrypt said grouped interblock of length N (V) and result in randomised-encrypted text block of length N (A), multitude of said randomised-encrypted text block of length N (A) make up said candidate randomised-encrypted text sequence (AP), whereby the method is arranged to self-adapt in order to maximise confusion and diffusion of values in said randomised-encrypted text sequence (A).

32. The method of claim 31, further including self-correcting decrypting steps that by making use of said encryption key (K) with said randomised-encrypted text sequence (A) generate said plaintext sequence (X) comprising:

(j) generating with said encryption key (K) plurality of decryption control subblocks ($U_1$-$U_{52}$)

and, optionally, said initiatory control subblock of length G (W), (k) assembling said randomised-encrypted text sequence (A) into multitude of said randomised-encrypted text block of length N (A), (l) said step (g) of correctingly generating said multitude of transformer blocks (WT) optionally with said initiatory control subblock of length G (W), (m) providing said encrypting-decrypting means (204) that with said plurality of decryption control subblocks ($U_1$-$U_{52}$) decrypt said randomised-encrypted text block of length N (A) and result in decrypted interblock of length N (S), (n) grouping said decrypted interblock of length N (S) with corresponding said transformer block (WT) and generating said plaintext block of length N (X), multitude of said plaintext block of length N (X) make up suggested plaintext sequence (XP), (o) generating generated signature of included plaintext sequence segment in said suggested plaintext sequence (XP) and repeating said steps (l), (m) and (n) as many times as necessary until said generated signature corresponds to included signature in said suggested plaintext sequence (XP), and supplying said included plaintext sequence segment in said suggested plaintext sequence (XP) as said plaintext sequence (X) when said generated signature corresponds to said included signature, whereby said plaintext sequence (X) corresponds to said randomised-encrypted text sequence (A).

33. The method of claim 32 wherein said steps (g) and (l) of correctingly generating multitude of transformer blocks (WT) in order to generate nth said transformer block (WT) of said multitude of transformer blocks (WT) make use of function $F^8$ (said initiatory control subblock of length G (W), nth minus one said randomised-encrypted text block of length N (A)), and said steps (h) and (n) of grouping make use of exclusive-OR operation, and said steps (g) and (l) implement said function $F^8$ (said initiatory control subblock of length G (W), nth minus one said randomised-encrypted text block of length N (A)) as $F^{10}{}_n$(CR, said initiatory control subblock of length G (W)) XOR said nth minus one said randomised-encrypted text block of length N (A), wherein said n takes the value of nth, and said CR selected from the group consisting of number of repetitions of said steps (g), (h) and (I), and number of repetitions of said steps (l), (m) and (n), and said steps (g) and (l) implement said function $F^{10}{}_n$ (CR, said initiatory control subblock of length G (W)) including at random number generator.

34. The method of claim 32 wherein said steps (g) and (l) of correctingly generating multitude of transformer blocks (WT) in order to generate said multitude of transformer blocks (WT) make use of function $F^{14}$ (said initiatory control subblock of length G (W)), and said steps (h) and (n) of grouping make use of exclusive-OR operation, and said steps (g) and (l) implement said function $F^{14}$ (said initiatory control subblock of length G (W)) for nth said transformer block (WT) as $F^{15}_n$ (CR, said initiatory control subblock of length G (W)), wherein said CR selected from the group consisting of number of repetitions of said steps (g), (h) and (I), and number of repetitions of said steps (l), (m) and (n), and said steps (g) and (l) implement said function $F^{15}_5$ (CR, said initiatory control subblock of length G (W)) including hash function.

35. The method of claim 24 wherein said step (a) of correctively randomising-encrypting said plaintext sequence (X) with said encryption key (K) includes the steps of:
(d) generating selected index (IS),
(e) correcting said plaintext sequence (X) according to said selected index (IS) and resulting
in by-index modified plaintext sequence (XI),
(f) providing randomising-encrypting means (102) that with said encryption key (K) randomise-encrypt said selected index (IS) and said by-index modified plaintext sequence (XI) and generate said candidate randomised-encrypted text sequence (AP),
whereby the method is arranged to adapt said plaintext sequence (X) in order to maximise confusion and diffusion of values in said randomised-encrypted text sequence (A).

36. The method of claim 35, further including self-correcting decrypting steps that by making use of said encryption key (K) with said randomised-encrypted text sequence (A) generate said plaintext sequence (X) comprising:
(g) providing decrypting means (104) that with said encryption key (K) decrypt said randomised-encrypted text sequence (A) and generate extracted selected index (IS) and decrypted plaintext sequence (XD),
(h) correcting according to said extracted selected index (IS) said decrypted plaintext sequence (XD) and resulting in said plaintext sequence (X),
whereby said plaintext sequence (X) corresponds to said randomised-encrypted text sequence (A).

37. The method of claim 36 wherein said step (e) for correcting said plaintext sequence (X) makes use of function $F^{17}$ (said selected index (IS), said plaintext sequence (X)), and said step (h) for correcting said decrypted plaintext sequence (XD) makes use of function $F^{19}$ (said extracted selected index (IS), said decrypted plaintext sequence (XD)), and said step (e) implements said function $F^{17}$ (said selected index (IS), said plaintext sequence (X)) as $F^{17'}$ (said selected index (IS), XL)=union of $F^{18}$ (said selected index (IS), XLj)=union of ((XLj oper+/− said selected index (IS)) mod $2^{Qi}$), wherein said XL subblock of length L of sequence selected from the group consisting of said plaintext sequence (X) and previous said by-index modified plaintext sequence (XI), said L value preferably smaller than length selected from the group consisting of length of said plaintext sequence (X) and length of said by-index modified plaintext sequence (XI), said oper+/− arithmetic operation, and said XLj subblock of order said j of said XL and of length said Qj, and said step (h) implements said function $F^{19}$ (said extracted selected index (IS), said decrypted plaintext sequence (XD)) as $F^{19'}$ (said extracted selected index (IS), XG)=union of $F^{20}$ (said extracted selected index (IS), XGk)=union of ((XGk oper−/+ said extracted selected index (IS)) mod 2%), wherein said XG subblock of length said L of said decrypted plaintext sequence (XD), said oper−/+reverse arithmetic operation to said oper+/−, said XGk subblock of order said k of said XG and of length said Qj, and said Qj value smaller than said L.

38. The method of claim 24 wherein said step (a) of correctively randomising-encrypting said plaintext sequence (X) with said encryption key (K) includes the steps of:
(d) generating initial selected index (IS) and alternative selected index (IS),
(e) generating with said control block encryption key (K) and said initial selected index (IS), initial by-index control block (KI), and according to said alternative selected index (IS), alternative by-index control block (KI),
(f) providing randomising-encrypting means (102) that randomise-encrypt said alternative selected index (IS) with said initial by-index control block (KI), and said plaintext sequence (X) with said alternative by-index control block (KI), and generate said candidate randomised-encrypted text sequence (AP),
whereby the method is arranged to adapt said alternative by-index control block (KI) in order to maximise confusion and diffusion of values in said randomised-encrypted text sequence (A).

39. The method of claim 38, further including self-correcting decrypting steps that by making use of said encryption key (K) with said randomised-encrypted text sequence (A) generate said plaintext sequence (X) comprising:
(g) said step (e) of generating with said encryption key (K) and said initial selected index (IS), said initial by-index control block (KI), and according to extracted alternative selected index (IS), said alternative by-index control block (KI),
(h) providing decrypting means (104) that decrypt said randomised-encrypted text sequence (A) and with said initial by-index control block (KI) result in said extracted alternative selected index (IS), and with said alternative by-index control block (KI) extracted result in said plaintext sequence (X),
whereby said plaintext sequence (X) corresponds to said randomised-encrypted text sequence (A).

40. The method of claim 39 wherein said steps (e) and (g) for generating said initial by-index control block (KI) and said alternative by-index control block (KI) make use of function $F^{21}$ (IS, said encryption key (K)), wherein said IS index selected from the group consisting of said initial selected index (IS) and said alternative selected index (IS) and said extracted alternative selected index (IS), and said steps (e) and (g) implement said function $F^{21}$ (IS, block encryption key (K)) as union of $F^{24}$ (said IS, Kj)=union of ((Kj oper+/− said IS) mod $2^{Qj}$), wherein said Qj value preferably smaller than length of said encryption key (K), said Kj subblock of order said j of said encryption key (K) and of length said Qj, and said oper+/− arithmetic operation.

41. The method of claim 24 wherein said step (a) of correctively randomising-encrypting said plaintext sequence (X) with said encryption key (K) includes the steps of:
(d) generating with said encryption key (K) plurality of encryption control subblocks ($Z_1$-$Z_{52}$) and, optionally, initiatory control subblock of length G (W),
(e) assembling said plaintext sequence (X) in multitude of plaintext blocks of length N (X),
(f) generating selected index (IS),
(g) by-index correctingly generating, optionally with said initiatory control subblock of length G (W), first multitude of transformer blocks (WT) and, with said selected index (IS), second multitude of transformer blocks (WT), (h) grouping said selected index (IS) with said first multitude of transformer blocks (WT) and said multitude of plaintext blocks of length N (X) with said second multitude of transformer blocks (WT), generating multitude of grouped interblocks of length N (V), (I) providing encrypting-decrypting means (204) that with said plurality of encryption control subblocks ($Z_1$-$Z_{52}$) encrypt said grouped interblock of length N (V) and result in randomised-encrypted text block of length N (A), multitude of said randomised-encrypted text block of length N (A) make up said candidate randomised-encrypted text sequence (AP), whereby the method is arranged to self-adapt in order to maximise confusion and diffusion of values in said randomised-encrypted text sequence ($\underline{A}$).

42. The method of claim 41, further including self-correcting decrypting steps that by making use of said encryption key (K) with said randomised-encrypted text sequence ($\underline{A}$) generate said plaintext sequence ($\underline{X}$) comprising:

(j) generating with said encryption key (K) plurality of decryption control subblocks ($U_1$-$U_{52}$) and, optionally, said initiatory control subblock of length G (W), (k) assembling said randomised-encrypted text sequence ($\underline{A}$) in multitude of said randomised-encrypted text block of length N (A), (l) said step (g) of by-index correctingly generating, optionally with said initiatory control subblock of length G (W), said first multitude of transformer blocks (WT) and, with extracted selected index (IS), said second multitude of transformer blocks (WT), (m) providing said encrypting-decrypting means (204) that with said plurality of decryption control subblocks ($U_1$-$U_{52}$) decrypt said randomised-encrypted text block of length N (A) and result in decrypted interblock of length N (S), (n) grouping first multitude of said decrypted interblock of length N (S) with said first multitude of transformer blocks (WT) and resulting in said extracted selected index (IS), and grouping second multitude of transformer blocks (WT) with second multitude of said decrypted interblock of length N (S) and generating multitude of said plaintext block of length N (X), said multitude of plaintext block of length N (X) make up said plaintext sequence ($\underline{X}$), whereby said plaintext sequence ($\underline{X}$) corresponds to said randomised-encrypted text sequence ($\underline{A}$).

43. The method of claim 42 wherein said steps (g) and (l) for generating nth said transformer block (WT) make use of function $F^{25}$ (IS, said initiatory control subblock of length G (W), nth minus one said randomised-encrypted text block of length N (A)), wherein said IS index selected from the group consisting of said selected index (IS) and said extracted selected index (IS), and said steps (h) and (n) of grouping make use of exclusive-OR operation, and said steps (g) and (l) implement said function $F^{25}$ (IS, said initiatory control subblock of length G (W), nth minus one said randomised-encrypted text block of length N (A)) as said initiatory control subblock of length G (W) XOR $F^{29}_n$ (said IS, said nth minus one said randomised-encrypted text block of length N (A)), wherein said n takes the value of nth, and said steps (g) and (l) implement said function $F^{29}_n$ (said IS, said nth minus one said randomised-encrypted text block of length N (A)) as union of $F^{30}_N$ (said IS, $Ai_{n-1}$)= union of (($Ai_{n-1}$ oper+/− said IS) mod $2^{Qi}$), wherein said Qi value preferably smaller than length of said nth minus one said randomised-encrypted text block of length N (A), said $Ai_{n-1}$ subblock of order said I of said nth minus one said randomised-encrypted text block of length N (A) and of length said Qi, and said oper+/− arithmetic operation.

44. The method of claim 42 wherein said steps (g) and (l) for generating transformer block (WT) make use of function $F^{31}$ (IS, said initiatory control subblock of length G (W)), wherein said IS index selected from the group consisting of said selected index (IS) and said extracted selected index (IS), and said steps (h) and (n) of grouping make use of exclusive-OR operation, and said steps (g) and (l) implement said function $F^{31}$ (IS, said initiatory control subblock of length G (W)) including hash function.

45. The method of claim 26, further including the steps (p) dividing said plaintext sequence ($\underline{X}$) into multitude of plaintext subsequences of predetermined first length and supplying each said plaintext subsequence as said plaintext sequence ($\underline{X}$) to said self-correcting randomising-encrypting steps, and (q) dividing said randomised-encrypted text sequence ($\underline{A}$) into multitude of randomised-encrypted text subsequences of predetermined second length and supplying each said randomised-encrypted text subsequence as said randomised-encrypted text sequence ($\underline{A}$) to said self-correcting decrypting steps.

46. The method of claim 45 wherein said step of verifying randomness verifies randomness of said candidate randomised-encrypted text sequence (AP) by making use of randomness test wherein said randomness test includes dividing said candidate randomised-encrypted text sequence (AP) into 20000 bit subblocks and checking monobit test, poker test, runs test and long run test with each said 20000 bit subblock, wherein said monobit test includes verifying that 9.654<number of value 1 bits<10.346, wherein said poker test includes dividing said 20000 bit subblock into 5000 4 bit segments, and calculating X=(16/5000)*($\Sigma[f(i)^2]$)−5000, wherein said i value from 0 to 15 and said f(i) number of value i segments, and verifying that 1.03<X<57.4, wherein said runs test includes counting the number of runs of bits 0s and 1s of said 20000 bit subblock, wherein said runs number of consecutive bits of the same value, and verifying that 2.267<=runs of 1<=2.733, 1079 runs of 2<=1421, 502<=runs of 3<=748, 223<=runs of 4<=402, 90<=runs of 5<=223, 90<=runs of 6<=223, wherein said long run test includes verifying that there is no said runs of length 34 or more.

* * * * *